US012621354B2

(12) United States Patent
Sheppard et al.

(10) Patent No.: US 12,621,354 B2
(45) Date of Patent: May 5, 2026

(54) SYSTEM AND METHOD FOR COMMUNICATION VALIDATION AND MULTI-ATTRIBUTE TRUST SCORING THROUGH CROSS-NETWORK INTELLIGENCE CORRELATION

(71) Applicant: ICA AI, Inc., Boca Raton, FL (US)

(72) Inventors: Raymond J. Sheppard, Spring Hill, FL (US); Alan W. McCord, Forney, TX (US); Gustavo Manuel Damil Marin, Point Roberts, WA (US)

(73) Assignee: ICA AI, Inc., Boca Raton, FL (US)

( * ) Notice: Subject to any disclaimer, the term of this patent is extended or adjusted under 35 U.S.C. 154(b) by 0 days.

(21) Appl. No.: 19/350,012

(22) Filed: Oct. 5, 2025

(65) Prior Publication Data

US 2026/0032161 A1 Jan. 29, 2026

Related U.S. Application Data

(63) Continuation-in-part of application No. 19/298,256, filed on Aug. 13, 2025, which is a
(Continued)

(51) Int. Cl.
*H04L 65/1076* (2022.01)
*H04L 51/02* (2022.01)
*H04L 65/1096* (2022.01)

(52) U.S. Cl.
CPC .......... *H04L 65/1076* (2013.01); *H04L 51/02* (2013.01); *H04L 65/1096* (2013.01)

(58) Field of Classification Search
None
See application file for complete search history.

(56) References Cited

U.S. PATENT DOCUMENTS

2012/0216272 A1* 8/2012 Hunyady .............. H04L 63/029
726/11
2014/0101749 A1* 4/2014 Yuan ................... H04L 63/0236
726/12

(Continued)

*Primary Examiner* — Raqiul A Choudhury
(74) *Attorney, Agent, or Firm* — Marin Patents, LLC; Gustavo Marin

(57) ABSTRACT

A system and method for privacy-preserving communication validation and multi-attribute trust scoring is disclosed. The system analyzes communication metadata to determine pattern legitimacy by comparing current communication patterns against relationship fingerprints without accessing communication content. The system validates relationship context between communicating parties using interaction graph analysis and historical communication data. Cross-network intelligence correlation compares current patterns against aggregated patterns across voice, email, and messaging services, creating a self-strengthening security framework that recognizes emerging threat patterns while validating legitimate communication behaviors. The system generates comprehensive multi-attribute trust assessments comprising individual trust attribute scores including engagement rate, reliability index, channel preference, temporal pattern, and behavioral pattern, combined into overall trust levels. Trust context is displayed through a user interface presenting simplified, intuitive, and actionable information with progressive disclosure capabilities, enabling informed user decisions while preserving privacy. Communication processing actions provide users with appropriate engagement options tailored to specific trust assessment results.

10 Claims, 29 Drawing Sheets

Related U.S. Application Data continuation-in-part of application No. 19/224,748, filed on May 31, 2025, now Pat. No. 12,457,255, which is a continuation-in-part of application No. 19/066,192, filed on Feb. 28, 2025, now Pat. No. 12,388,880, which is a continuation-in-part of application No. 18/921,443, filed on Oct. 21, 2024, now Pat. No. 12,261,893, which is a continuation of application No. 18/751,905, filed on Jun. 24, 2024, now Pat. No. 12,155,700.

(60) Provisional application No. 63/601,645, filed on Nov. 21, 2023.

(56) References Cited

U.S. PATENT DOCUMENTS

| | | | | |
|---|---|---|---|---|
| 2014/0348031 | A1* | 11/2014 | Ying | H04L 65/1104 |
| | | | | 370/259 |
| 2021/0306294 | A1* | 9/2021 | Daga | H04L 51/56 |
| 2021/0321002 | A1* | 10/2021 | DiMaria | H04L 65/4015 |
| 2023/0012008 | A1* | 1/2023 | Li | H04L 65/1104 |

* cited by examiner

2600

2618

2602 - Trust Level
2604 - Engagement rate
2606 - Reliability Index
2608 - Channel Preference
2610 - Temporal Pattern
2612 - Behavioural Pattern Trust Assesment 2614

Controls 2616
(Approve, Reject, Redirect,
Automated response)

SYSTEM AND METHOD FOR COMMUNICATION VALIDATION AND MULTI-ATTRIBUTE TRUST SCORING THROUGH CROSS-NETWORK INTELLIGENCE CORRELATION

CROSS-REFERENCE TO RELATED APPLICATIONS

This application is a continuation-in-part of U.S. patent application Ser. No. 19/298,256, titled, SYSTEM AND METHOD FOR AUTOMATED AFFINITY-BASED NETWORK EXPANSION THROUGH INTELLIGENT RELATIONSHIP DISCOVERY AND COMPATIBILITY MATCHING" filed on Aug. 13, 2025 which claims the benefit of, and priority to, U.S. patent application Ser. No. 18/751,905, titled, U.S. patent application Ser. No. 19/224, 748, titled, "SYSTEM AND METHOD FOR MANAGING COMMUNICATION THROUGH SEAMLESS TRANSITIONS BETWEEN SYNCHRONOUS AND ASYNCHRONOUS COMMUNICATIONS" which claims the benefit and priority to U.S. patent application Ser. No. 19/006,192, titled, "SECURITY VALIDATION SYSTEM USING DYNAMIC RELATIONSHIP FINGERPRINTS" filed on Feb. 28, 2025, which claims the benefit, and priority to U.S. patent application Ser. No. 18/921,443, titled, "ADAPTIVE COMMUNICATION MANAGEMENT SYSTEM USING MODEL-BASED AND MODEL FREE REINFORCEMENT LEARNING" filed on Oct. 21, 2024 which claims the benefit of, and priority to, U.S. patent application Ser. No. 18/751,905, titled, "SYSTEMS AND METHOD FOR OPTIMIZING PERSONAL COMMUNICATIONS THROUGH OBJECTIVE ALIGNMENT" which claims the benefit of, and priority to, U.S. Provisional Application No. 63/601,645, titled, "SYSTEM AND METHOD FOR OPTIMIZING PERSONAL COMMUNICATIONS THROUGH OBJECTIVE ALIGNMENT" filed on Nov. 21, 2023, the specifications of which are hereby incorporated by reference in its entirety.

BACKGROUND OF THE INVENTION

Field of the Art

The disclosure relates to the field of communications, and more particularly to the field of validating incoming communication through privacy-preserving pattern analysis and cross-network intelligence sharing.

Discussion of the State of the Art

Modern communication systems face an epidemic of spoofed calls and messages. Traditional caller ID can be easily manipulated, making it impossible to verify if communications are genuinely from claimed sources. Scammers routinely impersonate banks, government agencies, and trusted contacts.

Existing security systems provide only crude "trusted/ untrusted" classifications that fail to capture the nuanced nature of human relationships. A business contact calling after hours might be legitimate but unusual, yet current systems cannot distinguish this from a potential threat. Moreover, existing security systems may require access to communication content, personal information, or behavioral data, forcing users to sacrifice privacy for security. Content monitoring systems analyze message text, identity verification requires personal data collection, and behavioral analysis tracks usage patterns in privacy-invasive ways.

Additionally, the situation is further complicated by the siloed nature of existing security systems that perform validation of communication within specific channels (email, voice, messaging) or services, unable to leverage insights across different communication methods. A sophisticated attack might use consistent patterns across multiple channels, but fragmented systems cannot detect these coordinated threats.

Furthermore, from a user perspective the current security systems provide minimal context information about incoming communications, forcing users to make communication decisions without any information. This may lead to missed important communications, acceptance of risky contacts, or privacy violations that undermine user trust in the security system itself.

Hence, there is a need for security systems that provide context to users to make communication decisions without accessing compromising privacy.

SUMMARY OF THE INVENTION

Accordingly, the inventor has conceived and reduced to practice, in a preferred embodiment of the invention, a system and method for privacy-preserving communication validation and multi-attribute trust scoring that transforms complex communication pattern analysis into actionable user guidance while maintaining privacy protection. The system implements a communication management server comprising one or more processors, a memory, and programming instructions that analyze communication metadata to determine pattern legitimacy by comparing current communication patterns against relationship fingerprints stored in a relationship fingerprints database without accessing communication content. When current communication patterns are determined legitimate, the system validates relationship context between communicating parties using interaction graph analysis and historical communication data, performs cross-network intelligence correlation across voice, email, and messaging services, and generates comprehensive multi-attribute trust assessments comprising individual trust attribute scores and overall trust levels. The system displays trust context through a user interface presenting simplified, intuitive, and actionable information while providing communication processing actions tailored to specific trust assessment results.

According to a preferred embodiment of the invention, the pattern analysis process employs sophisticated metadata analysis techniques that extract temporal patterns, channel preference patterns, and behavioral patterns without accessing message content, preserving complete privacy while enabling advanced pattern recognition capabilities. The cross-network intelligence correlation performs similarity analysis across email patterns, voice patterns, and SMS patterns, conducts pattern correlation through cross-channel comparison, and validates current communication patterns by checking consistency with known legitimate patterns stored in a pattern database. This cross-network approach creates a self-strengthening security framework that recognizes emerging threat patterns and validates legitimate communication behaviors based on collective intelligence while maintaining privacy through pattern-only analysis, enabling the system to identify sophisticated attacks that exploit multiple communication channels.

According to a preferred embodiment of the invention, the multi-attribute trust assessment generation integrates individual trust attribute scores with cross-network intelligence correlation results to produce dynamic trust levels that adapt based on pattern validation across multiple communication services. Individual trust attributes extracted by a pattern analysis engine from communication metadata comprise engagement rate measuring interaction frequency and quality, reliability index assessing communication consistency, channel preference indicating alignment with preferred communication methods, temporal pattern reflecting timing characteristics, and behavioral pattern capturing interaction styles. The system modifies individual trust attribute scores based on cross-network intelligence correlation results, wherein consistent patterns across channels result in increased trust levels while inconsistent patterns or matches to known attack signatures result in reduced trust assessments.

According to a preferred embodiment of the invention, the user interface implements progressive disclosure of trust information with important trust indicators visible immediately and detailed trust attributes available through user interaction, translating complex multi-attribute trust assessments into practical user guidance. The intuitive and actionable trust context provides communication processing actions including answer, block, verify, and redirect options dynamically configured based on specific trust assessment results, enabling informed user decisions while preserving privacy for all parties involved. The privacy-preserving approach operates through exclusive focus on metadata patterns rather than content, ensuring that sophisticated trust validation capabilities can be provided without compromising communication privacy or enabling reverse-engineering of personal information from pattern data, creating a communication security framework that strengthens over time as relationship fingerprints evolve and cross-network intelligence expands.

BRIEF DESCRIPTION OF THE DRAWING
FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary and are not to be considered as limiting the scope of the invention or the claims herein in any way.

4

Figure 7A:
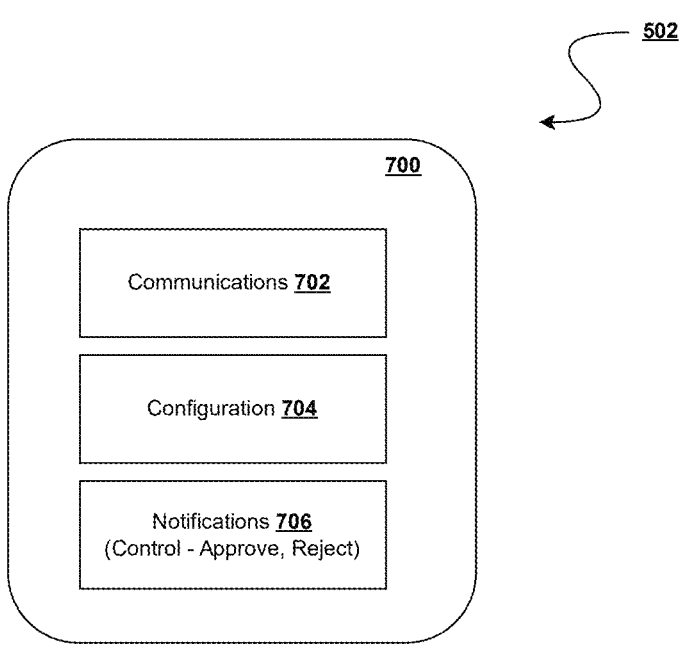
Figure 7B:
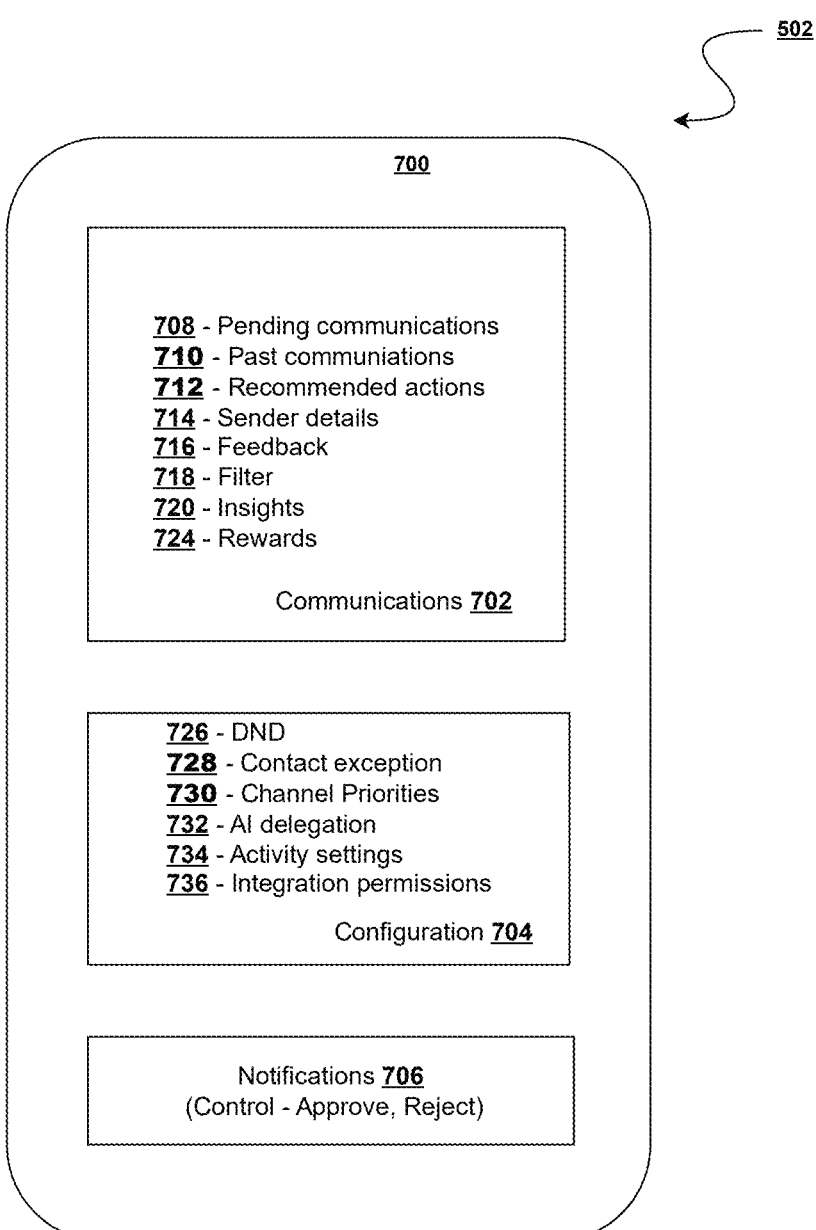

FIGS. 7A and 7B depict the dashboard of a mobile application associated with a communication management server on a user interface, according to an embodiment of the invention.

Figure 8:
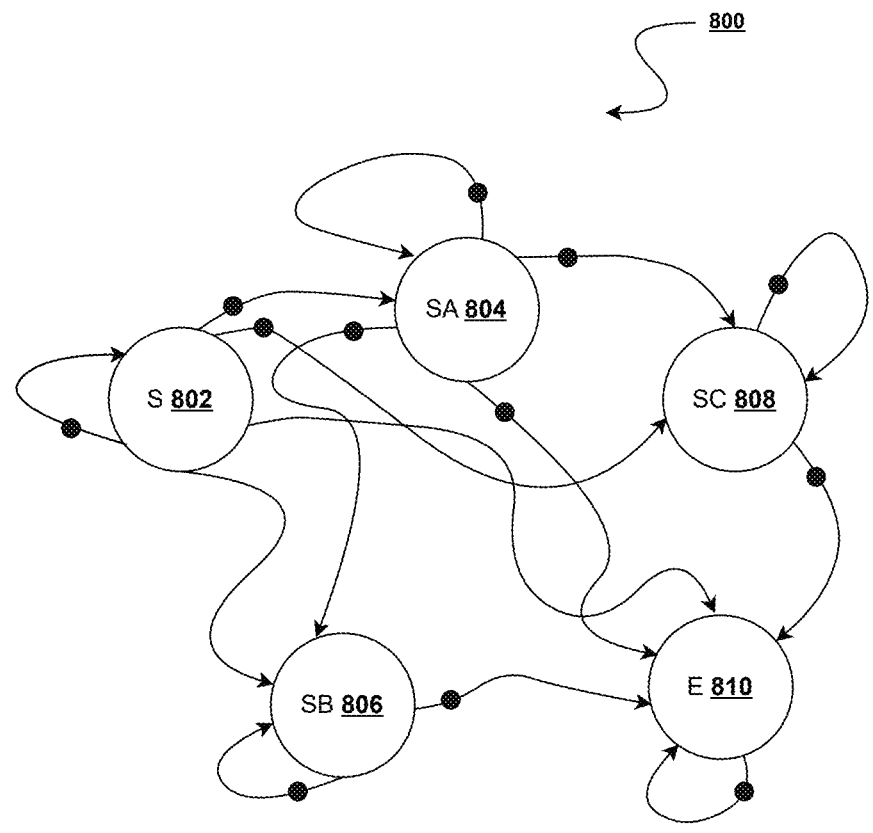
Figure 9:
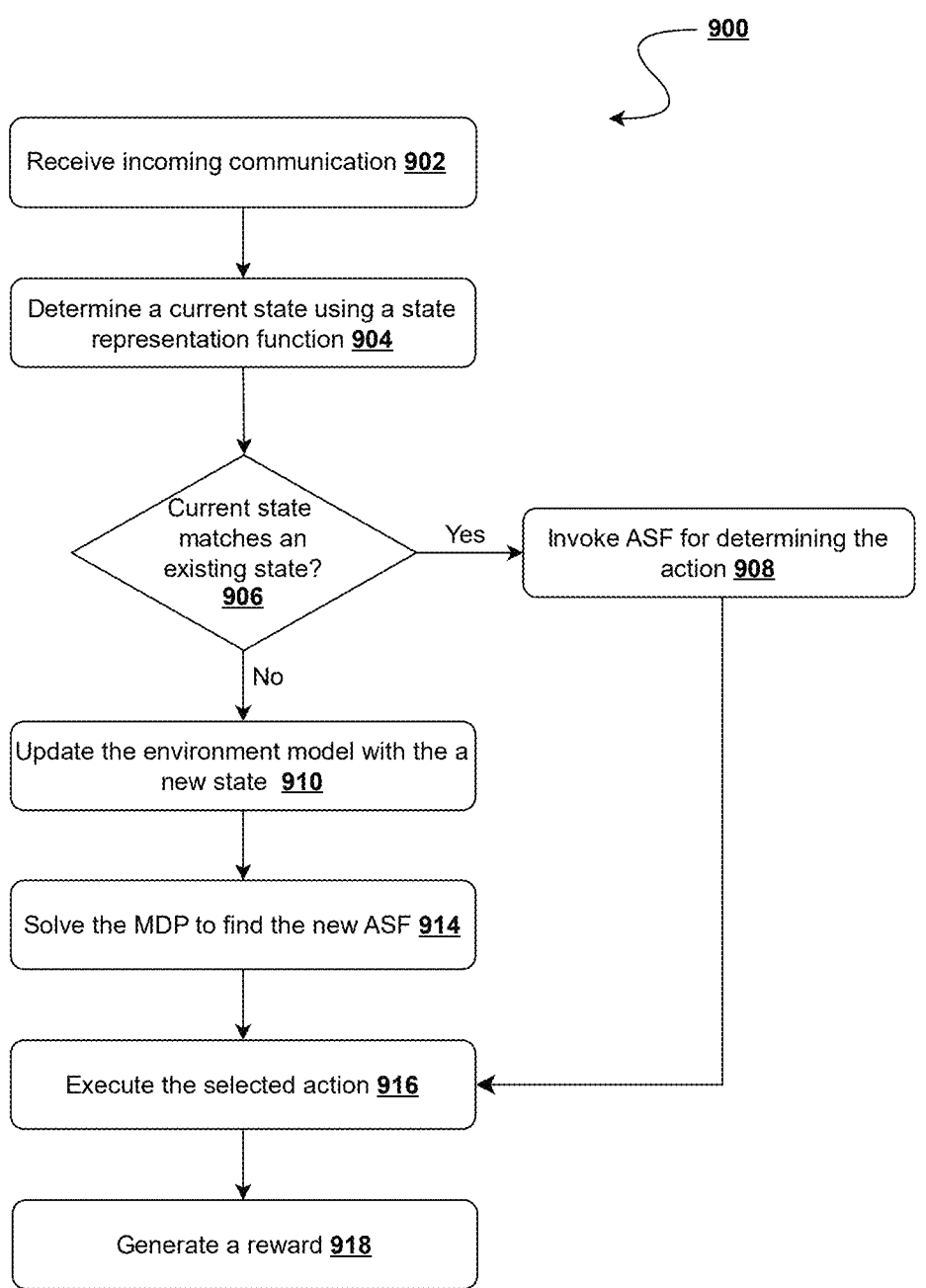

FIG. 8 illustrates an example of an environment state model used by a master AI agent for determining the action, according to an embodiment of the invention FIG. 9 is a flow diagram of an example method for determining an action for processing an incoming communication using an MDP model-based approach, according to an embodiment of the invention.

Figure 10:
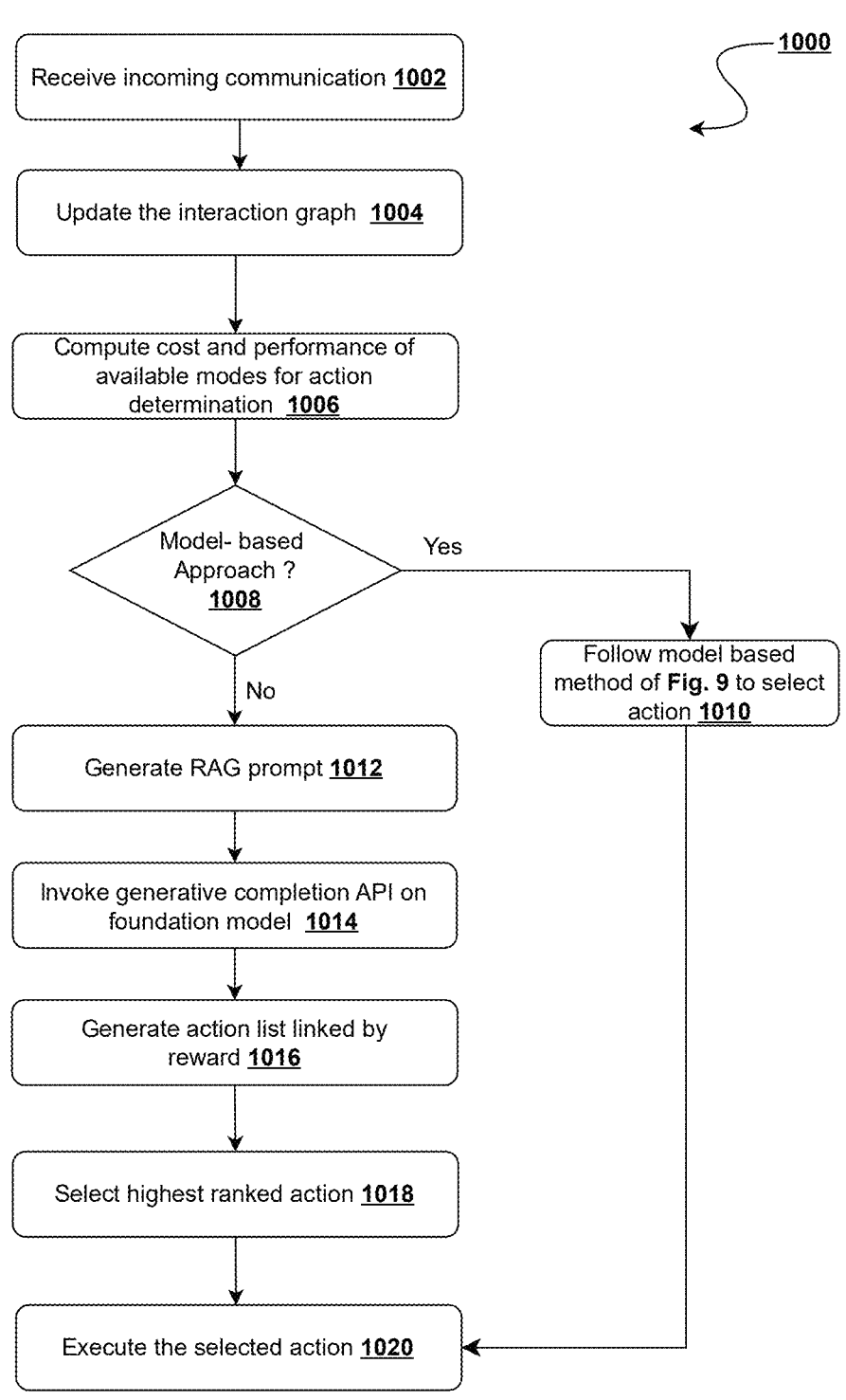

FIG. 10 is a flow diagram of an example method for determining an action for processing an incoming communication using model-free and model-based modes, in accordance with an embodiment of the invention.

Figure 11:
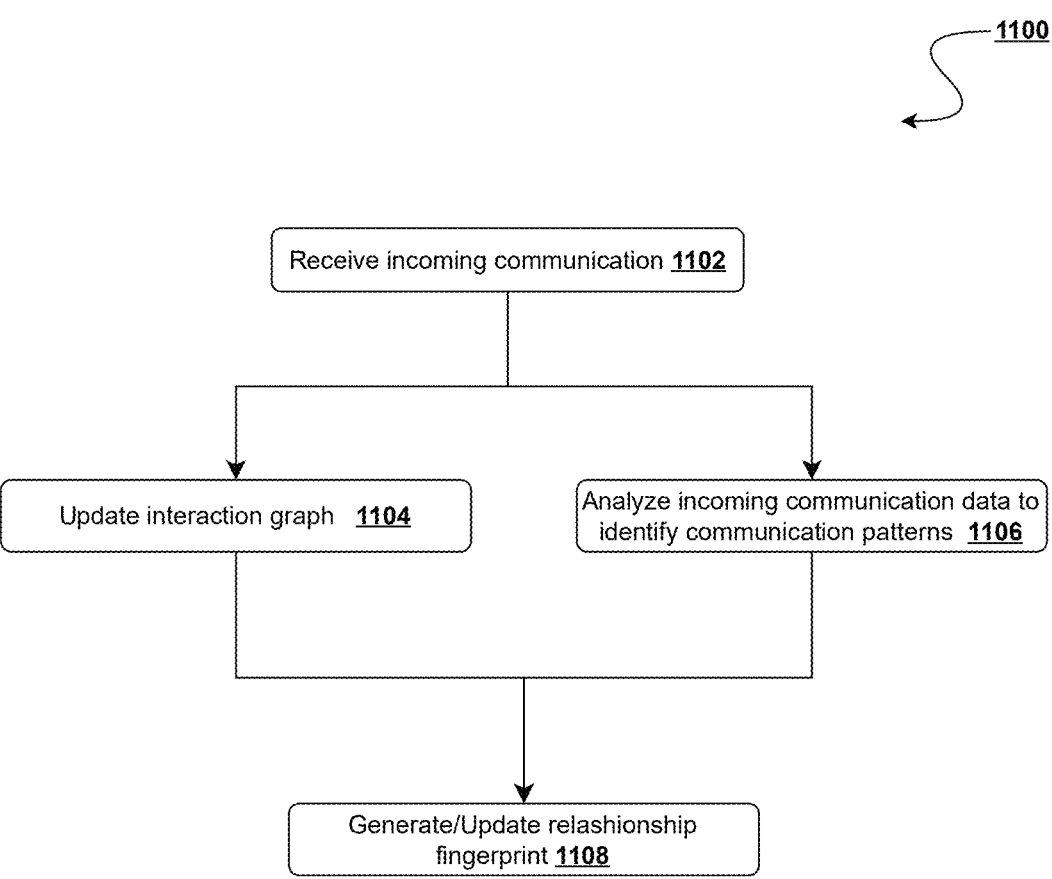

FIG. 11 is a flow of an example method for generating relationship fingerprints, according to an embodiment of the invention.

Figure 12:
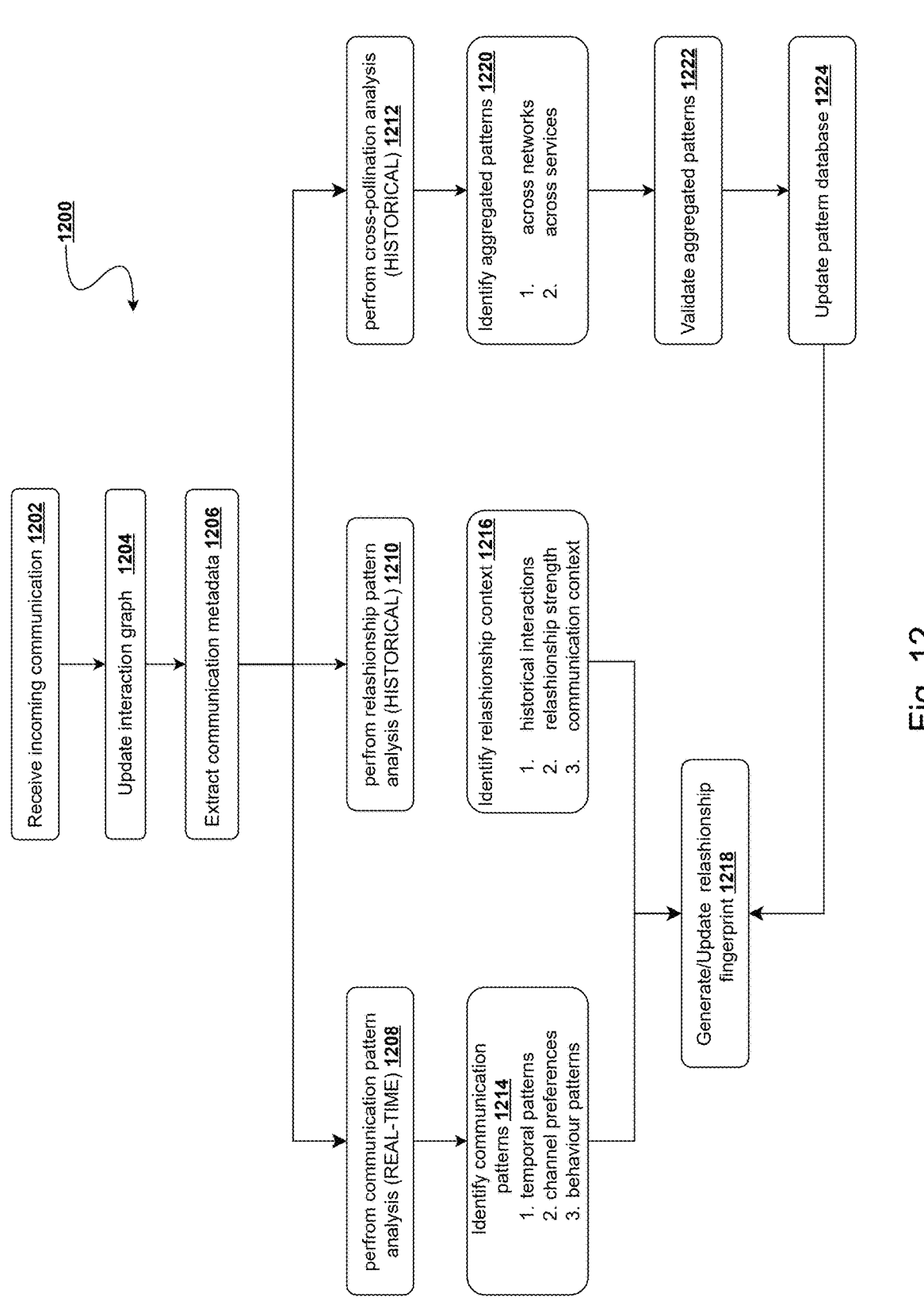

FIG. 12 is a flow diagram of an example method for analyzing the incoming communication metadata to identify communication patterns.

Figure 13:
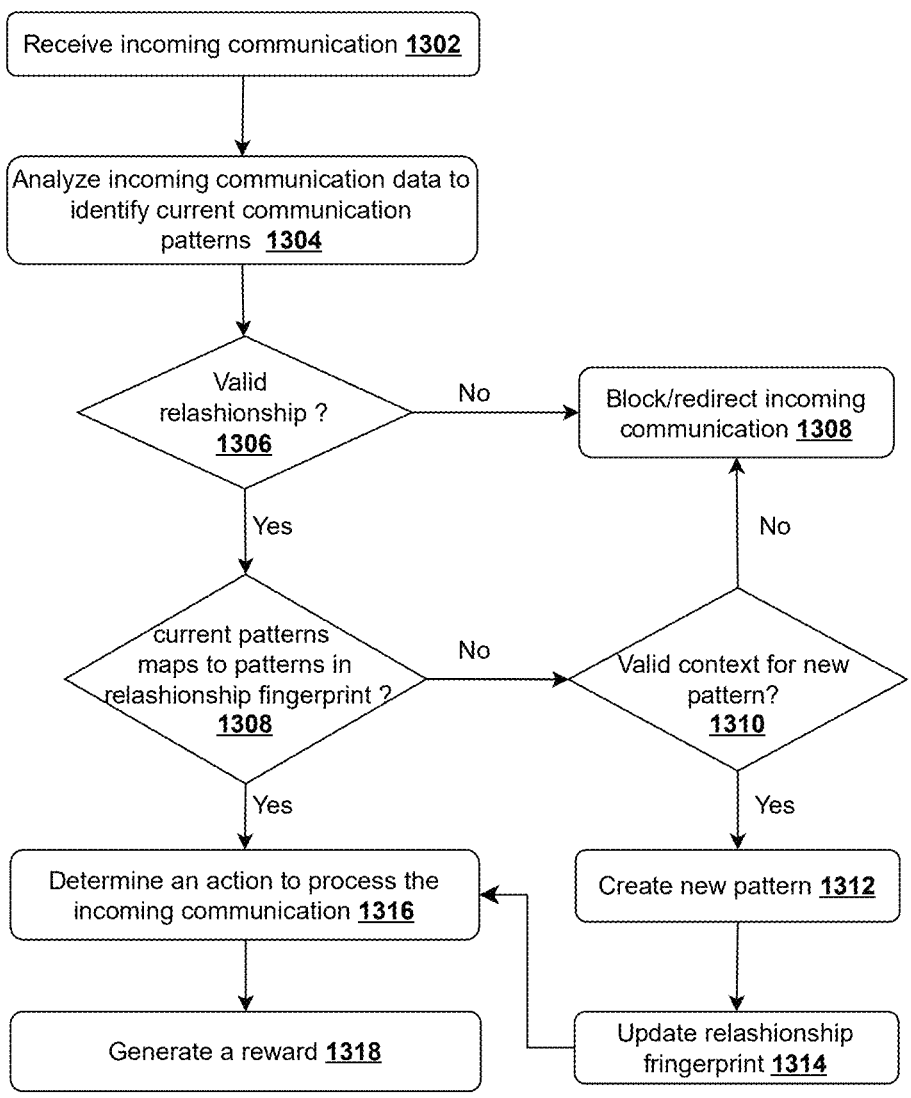

FIG. 13 is a flow diagram of an example method for securely validating incoming communications using pattern-based relationship fingerprints, according to an embodiment of the invention.

Figure 14:
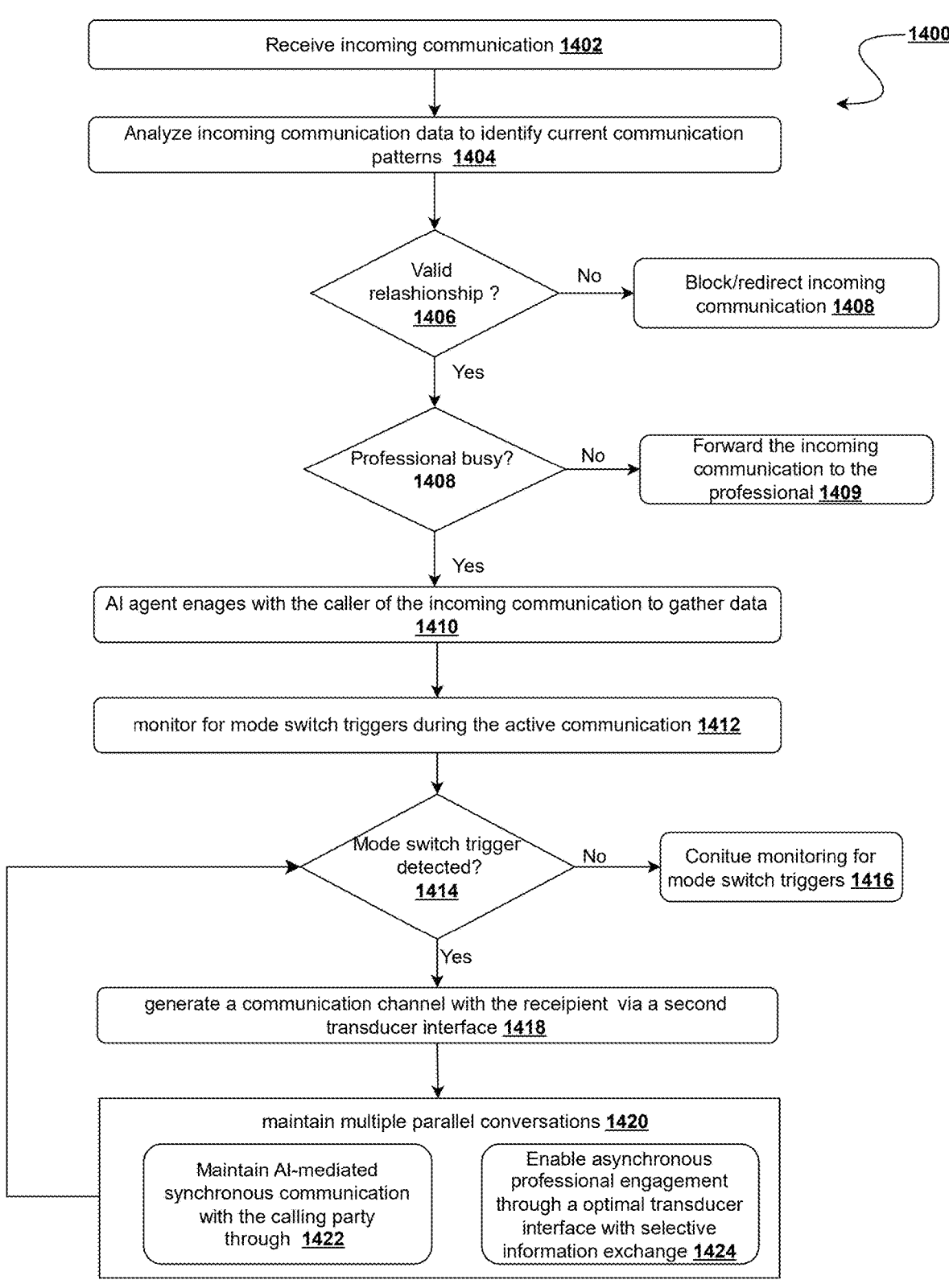

FIG. 14 is a flow diagram of an example method for managing seamless transitions between synchronous and asynchronous communication modes across multiple transducer interfaces, according to an embodiment of the invention.

Figure 15A:
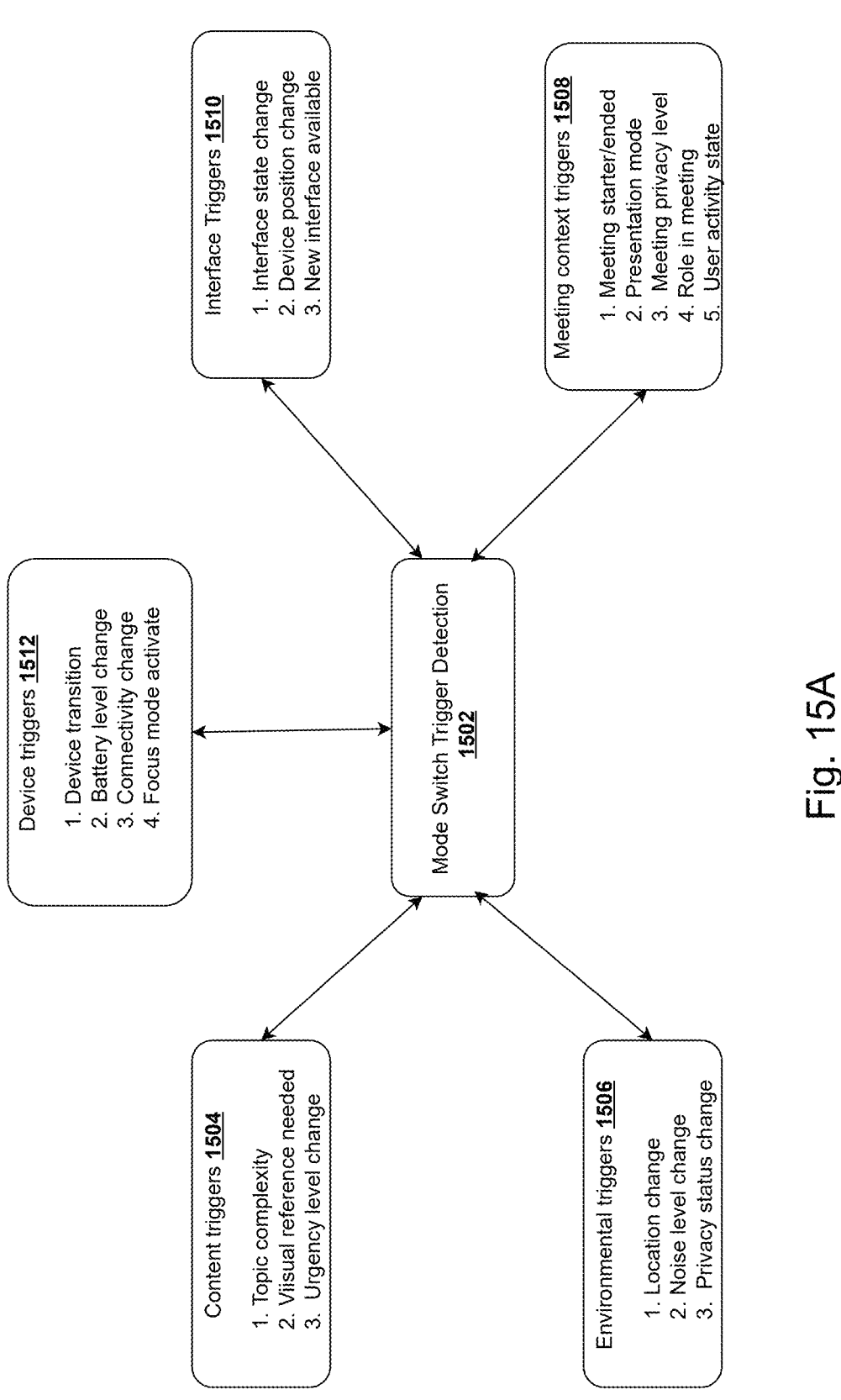

FIG. 15A illustrates a comprehensive categorization of triggers that can initiate a switch between communication modes or transducer interfaces, according to an embodiment of the invention.

Figure 15B:
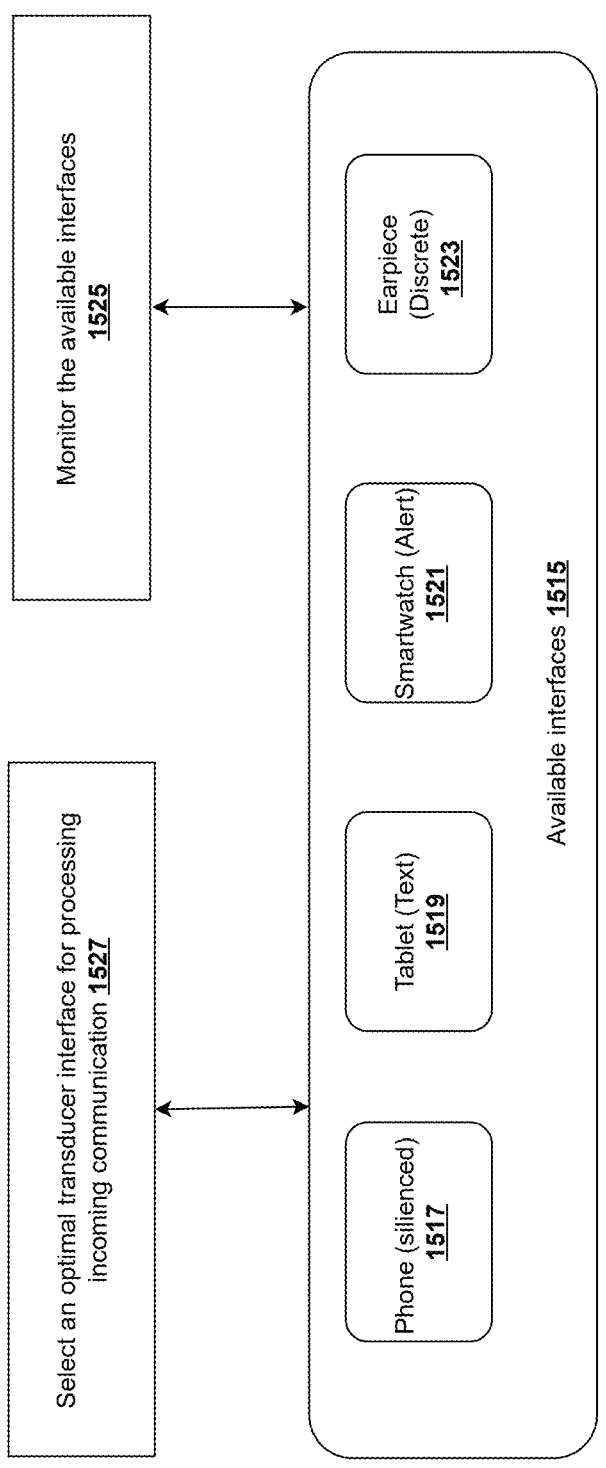

FIG. 15B illustrates a process by which transducer interface coordinator selects the optimal transducer interface for processing an incoming communication, according to an embodiment of the invention.

Figure 16:
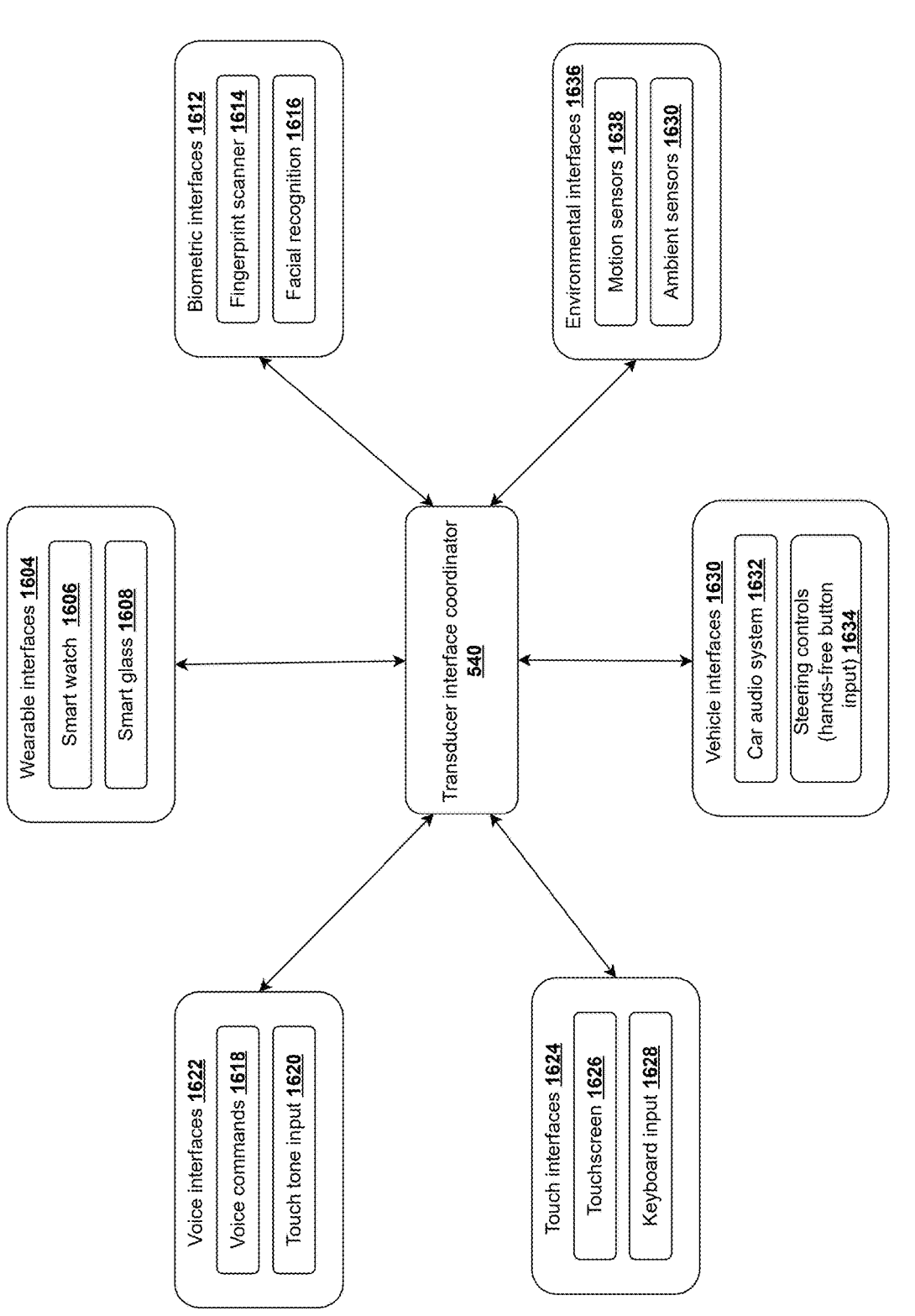

FIG. 16 illustrates the architecture of the transducer interface coordinator that manages transitions across diverse input modalities, according to an embodiment of the invention.

Figure 17:
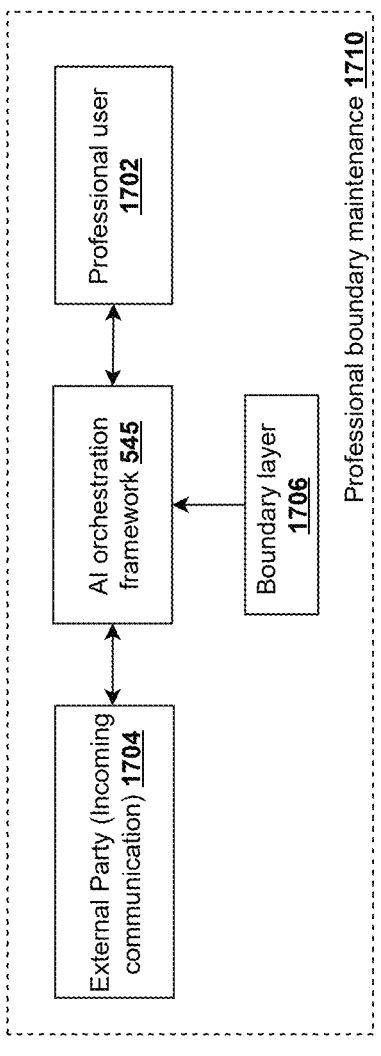

FIG. 17 illustrates the implementation of boundaries in parallel conversations related to the incoming communication, according to an embodiment of the invention.

Figure 18:
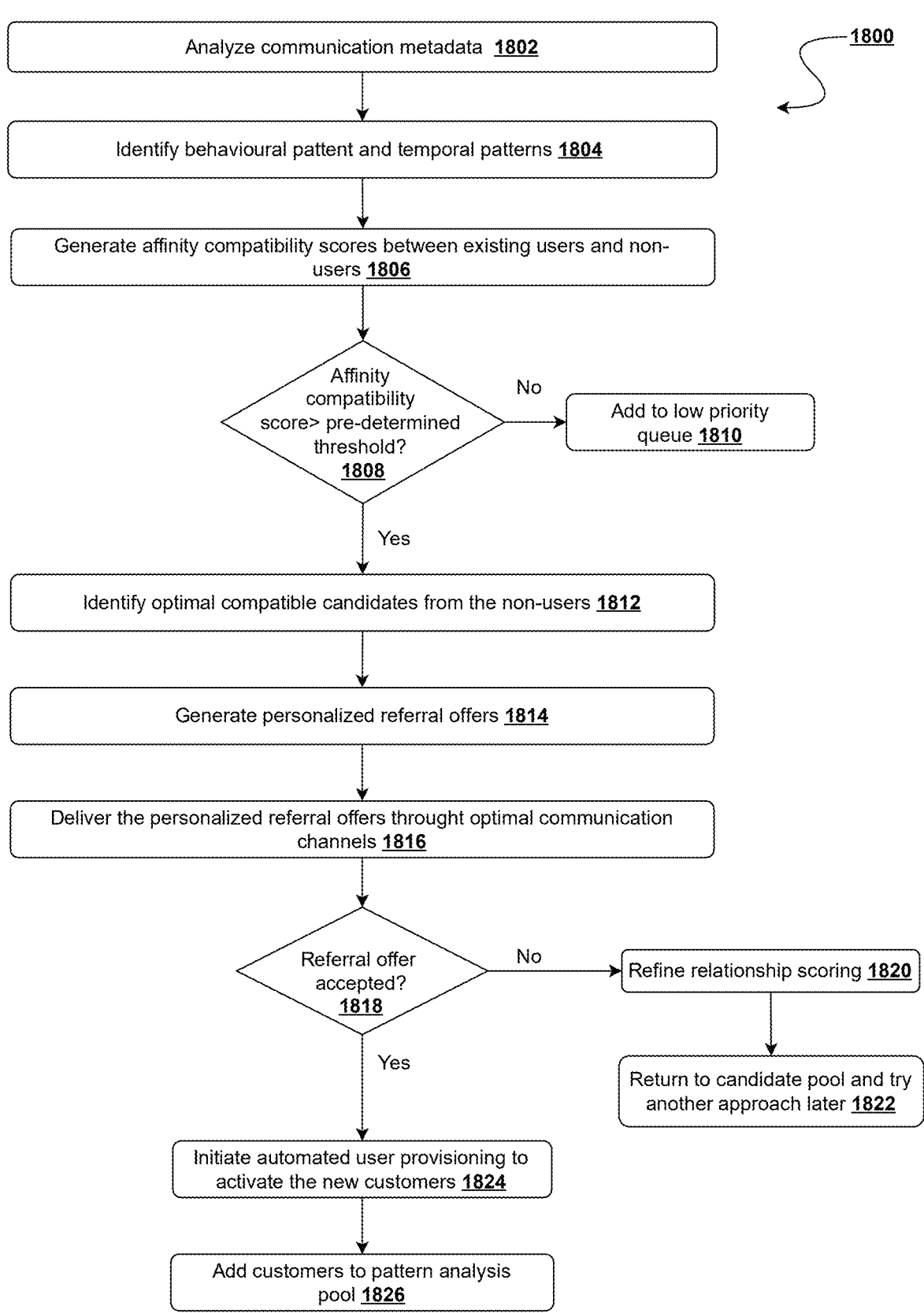

FIG. 18 is a flow diagram of an example method for affinity-based user acquisition and network expansion, according to an embodiment of the invention.

Figure 19:
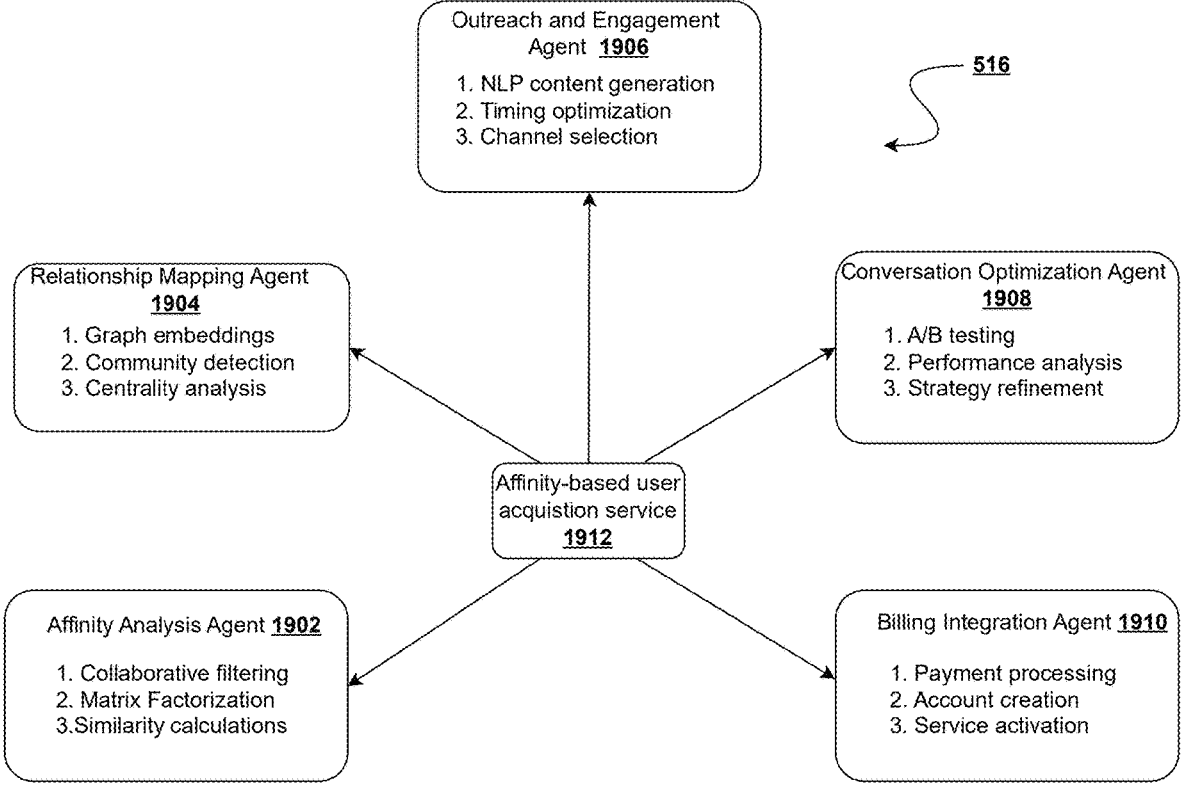

FIG. 19 illustrates the different types of AI communication AI agents used in the affinity-based user acquisition process, according to an embodiment of the invention.

Figure 20:
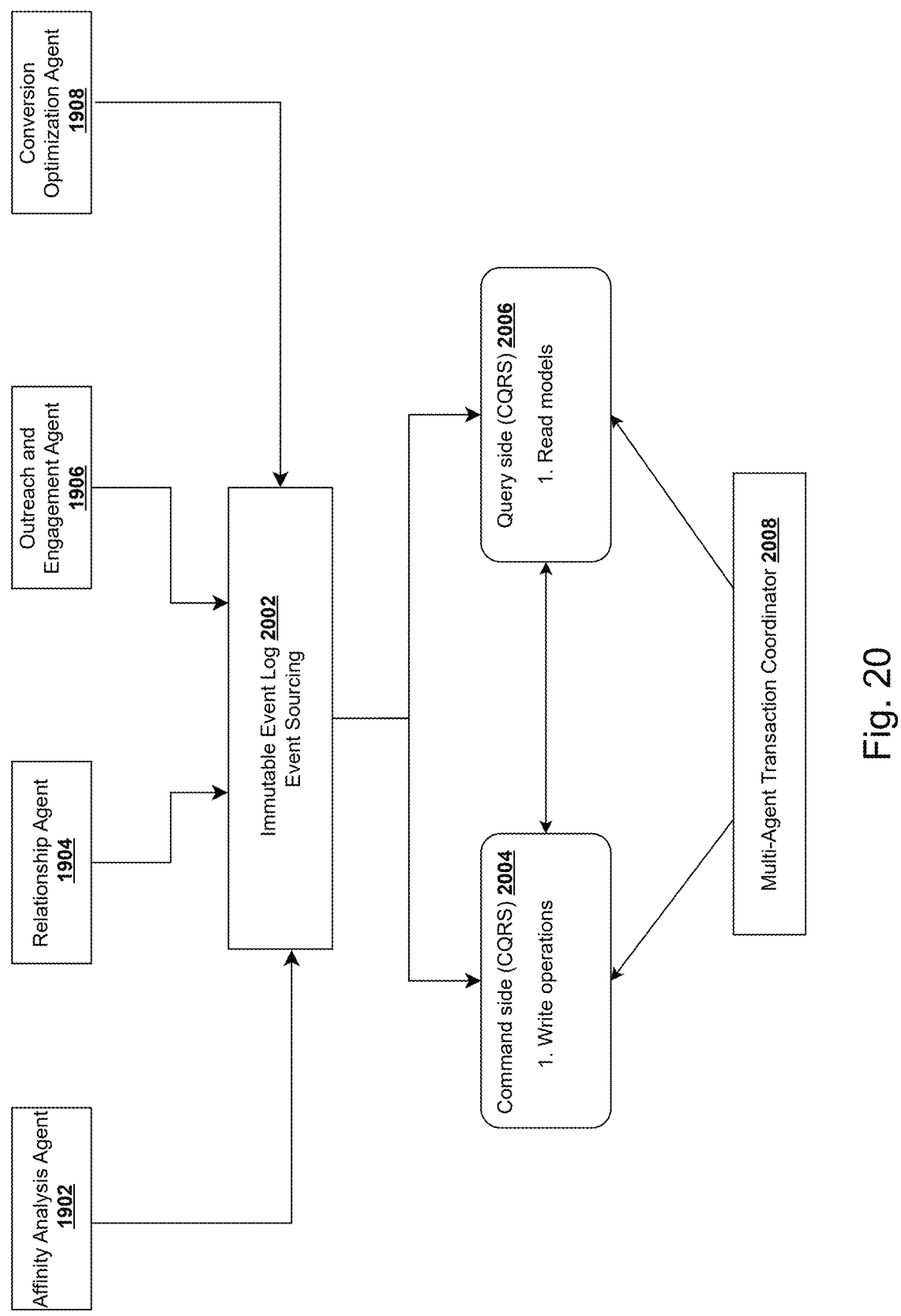

FIG. 20 illustrates a distributed coordination architecture between AI communication agents to operate as a unified affinity-based user acquisition service, according to an embodiment of the invention.

Figure 21:
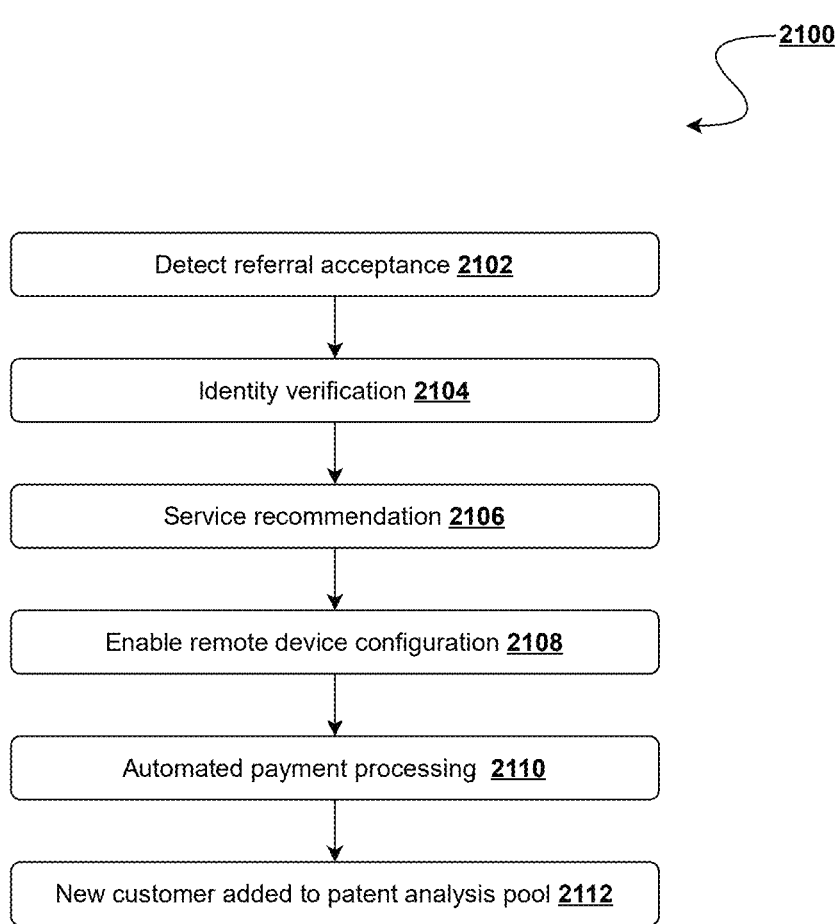

FIG. 21 is a flow diagram of an example method for automated onboarding, according to an embodiment of the invention.

Figure 22:
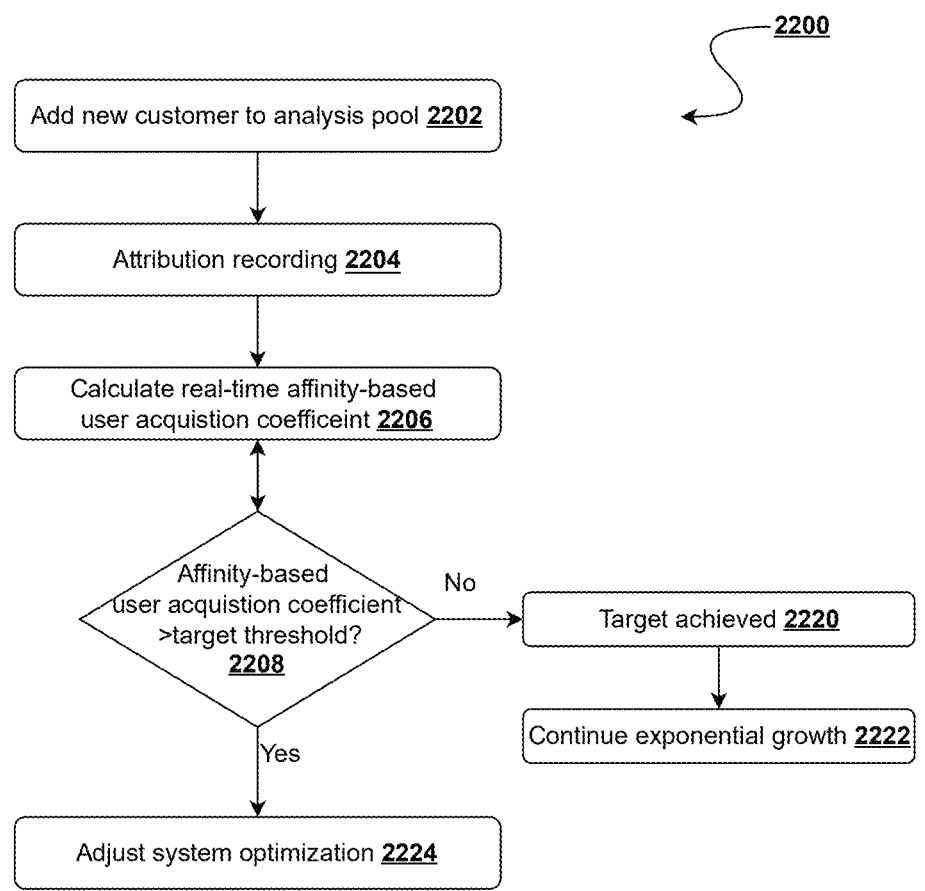

FIG. 22 is a flow diagram of an example method for affinity-based user acquisition coefficient monitoring and optimization, according to an embodiment of the invention.

Figure 23:
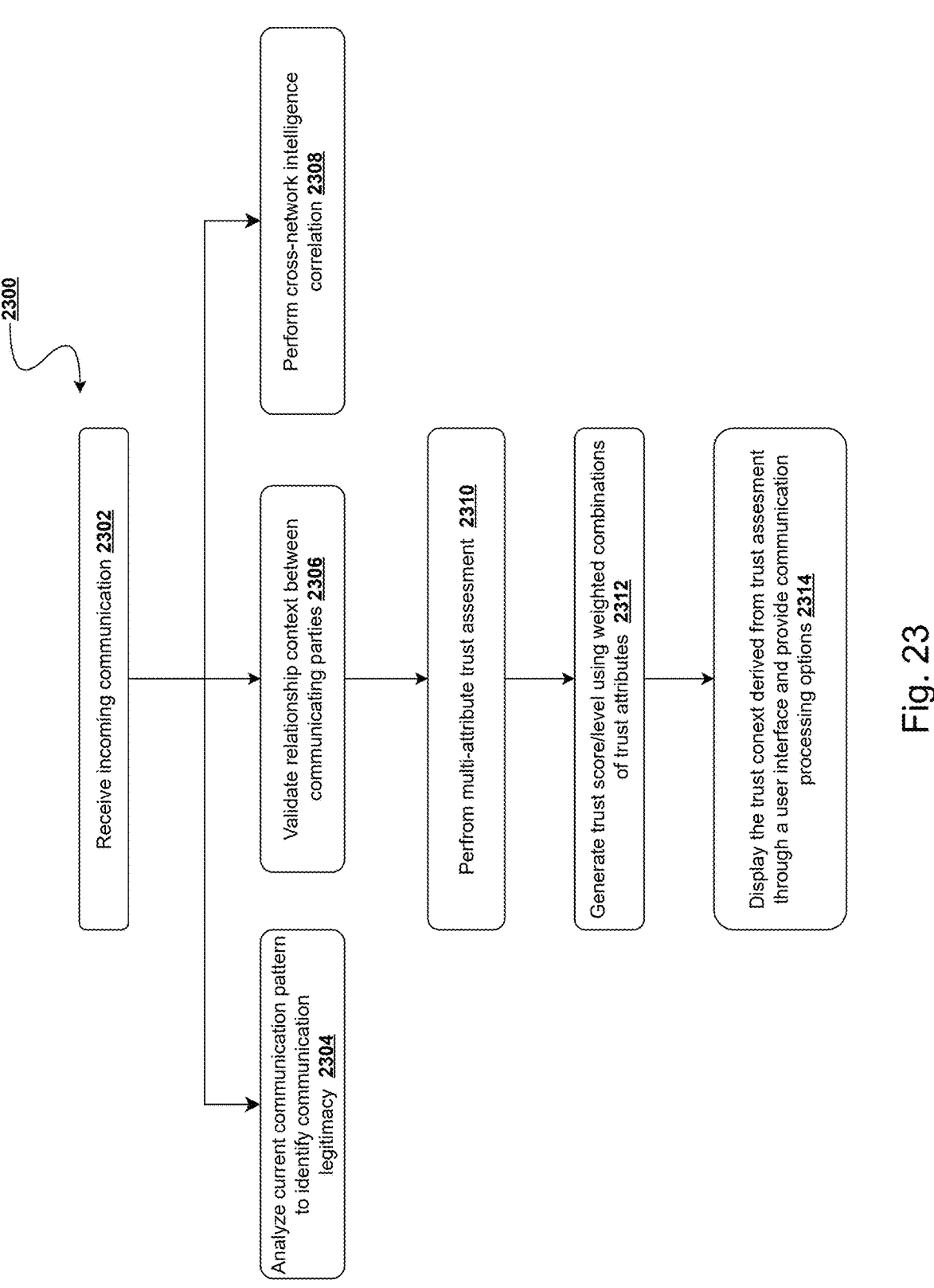

FIG. 23 is a flow diagram of an example method for generating trust score for incoming communications and displaying actionable context for the user, according to an embodiment of the invention.

Figure 24:
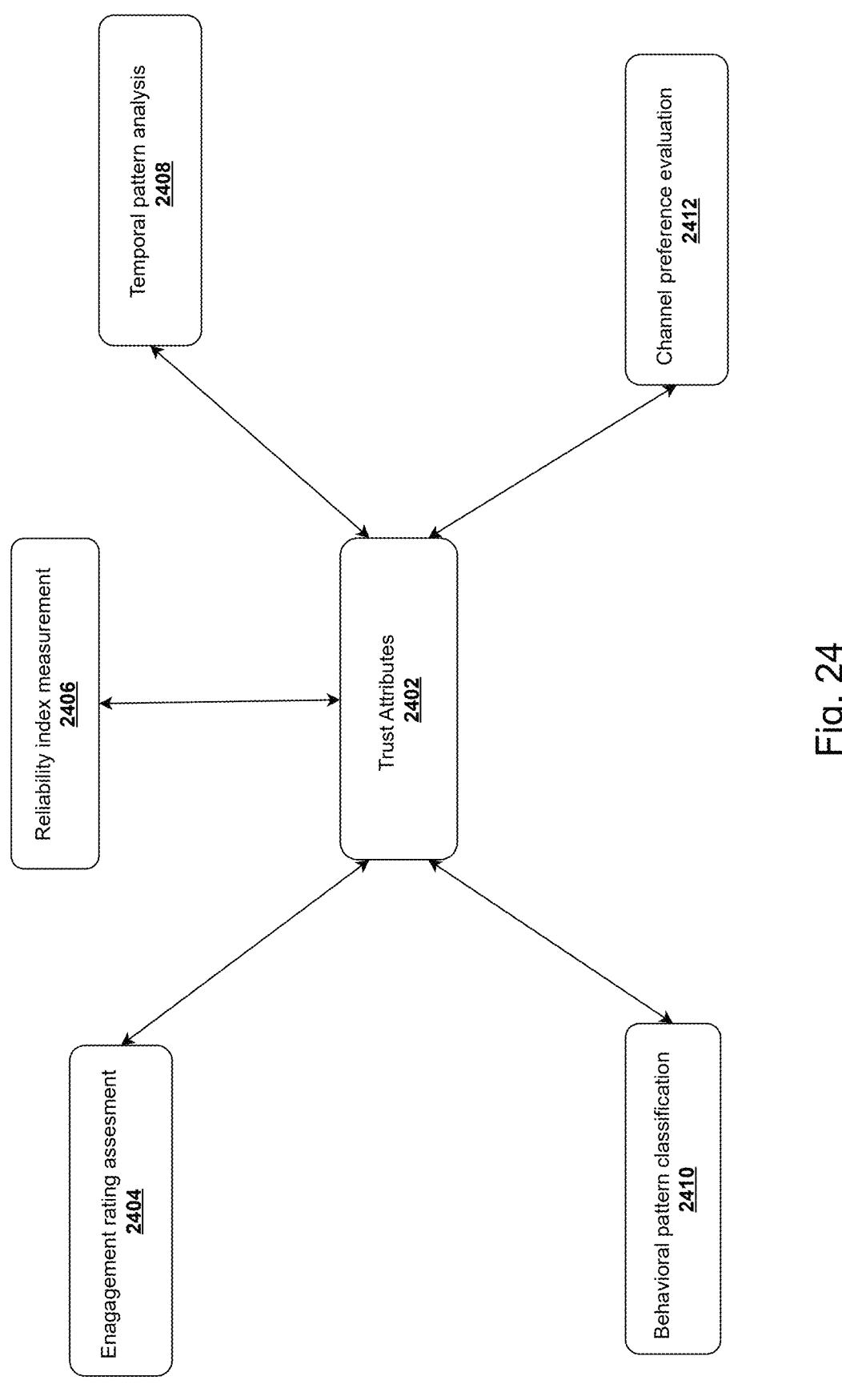

FIG. 24 illustrates different attributes that are considered while generating a multi-attribute trust score, according to an embodiment of the invention.

Figure 25:
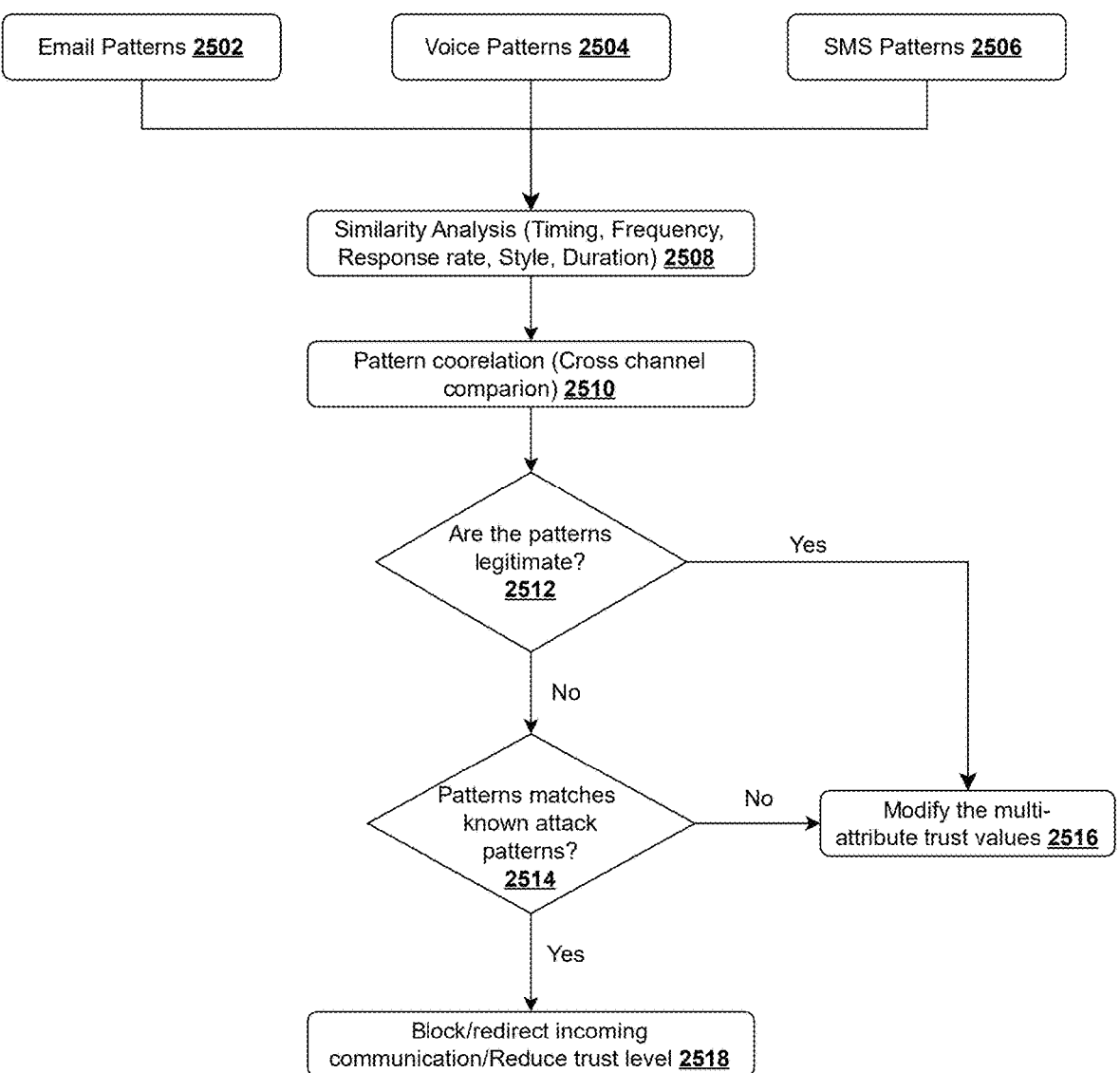

FIG. 25 depicts a flow diagram of an example method for cross-pollination pattern analysis, according to an embodiment of the invention.

Figure 26:
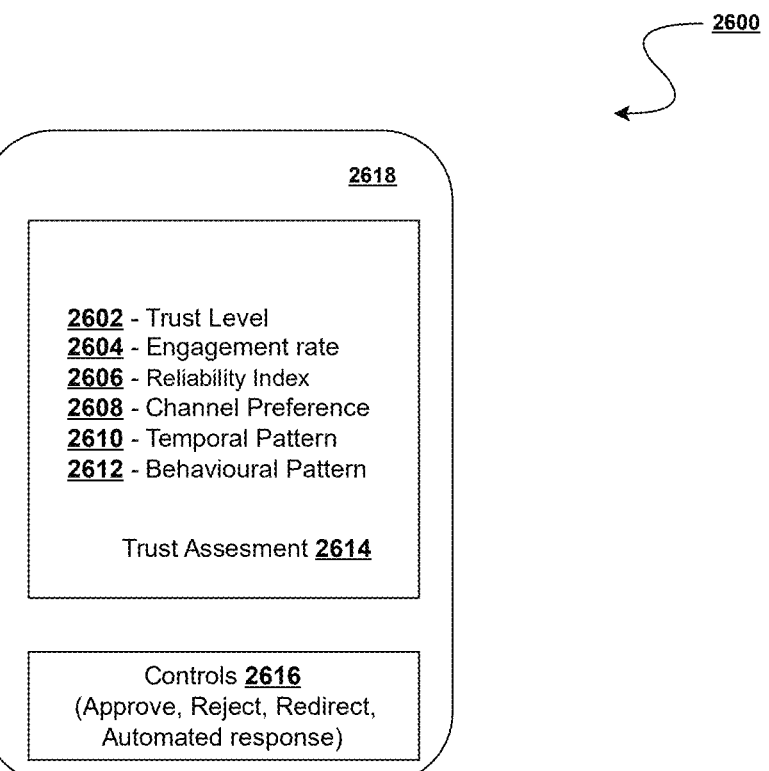

FIG. 26 depicts the dashboard on a user interface displaying comprehensive trust score information, according to an embodiment of the invention.

Figures 27A, 27B, 27C:
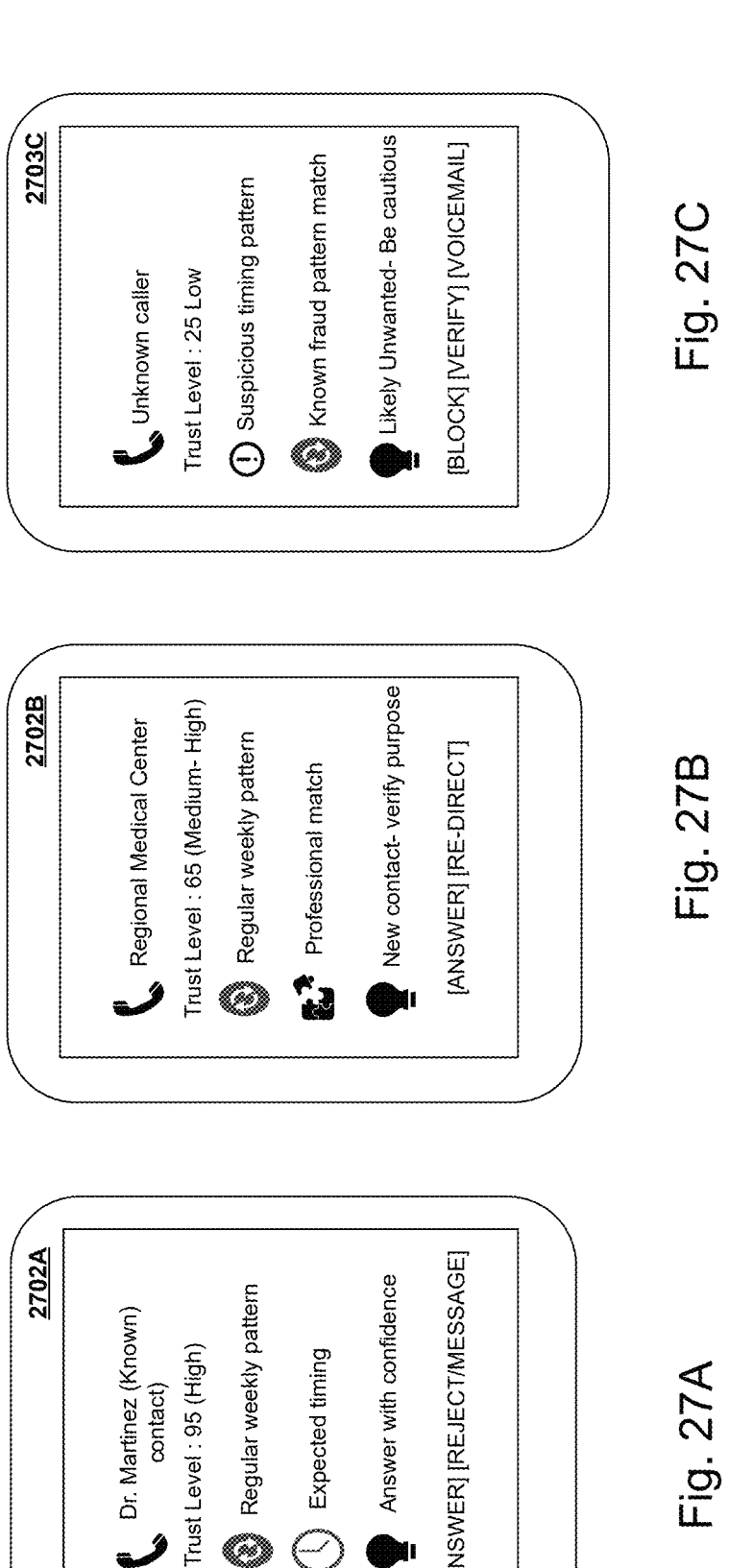

FIGS. 27A, 27B, and 27C depicts dashboards on a user interface displaying trust score across different communication scenarios, according to embodiments of the invention.

DETAILED DESCRIPTION

The inventor has conceived, and reduced to practice, a mechanism for preserving communication validation and multi-attribute trust scoring that transforms complex communication pattern analysis into actionable user guidance while maintaining complete privacy protection. The disclosed system analyzes communication metadata across temporal, channel, and behavioral domains without accessing message content, validates relationship context through interaction graph analysis, and leverages cross-network intelligence correlation to create a self-strengthening security framework. The system generates comprehensive trust assessments comprising individual trust attributes including engagement rate, reliability index, channel preference, temporal pattern, and behavioral pattern that are combined into overall trust levels, then presents this complex analysis through intuitive user interfaces that provide actionable engagement context enabling informed user decisions while preserving privacy for all parties involved. Through cross-network intelligence correlation, the system compares current communication patterns against aggregated patterns across voice, email, and messaging services, enabling recognition of emerging threat patterns and validation of legitimate communication behaviors based on collective intelligence while maintaining strict privacy boundaries through pattern-only analysis.

In some embodiments, the system performs lightweight pattern matching and basic trust scoring in real-time. In other embodiments utilizing advanced processing architectures, edge computing, or specialized hardware acceleration, more sophisticated machine learning operations including graph neural network analysis may be performed within interactive response times. In further embodiments, the system may employ distributed AI agent architectures with parallel processing capabilities that enable real-time execution of complex correlation algorithms across multiple communication channels.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to fully illustrate one or more aspects of the inventions. Similarly, although process steps, method steps, algorithms or the like may be described in sequential order, such processes, methods, and algorithms may generally be configured to work in alternate orders, unless specifically stated to the contrary. In other words, any sequence or order of steps that may be described in this patent application does not, in and of itself, indicate a requirement that the steps be performed in that order. The steps of the described processes may be performed in any practical order. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the inventions, and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of more than one device or article.

The functionality or features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code that include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

One or more different inventions may be described in the present application. Further, for one or more of the inventions described herein, numerous alternative embodiments may be described; it should be appreciated that these are presented for illustrative purposes only and are not limiting the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. On the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of the processes described may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the inventions, and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 1:
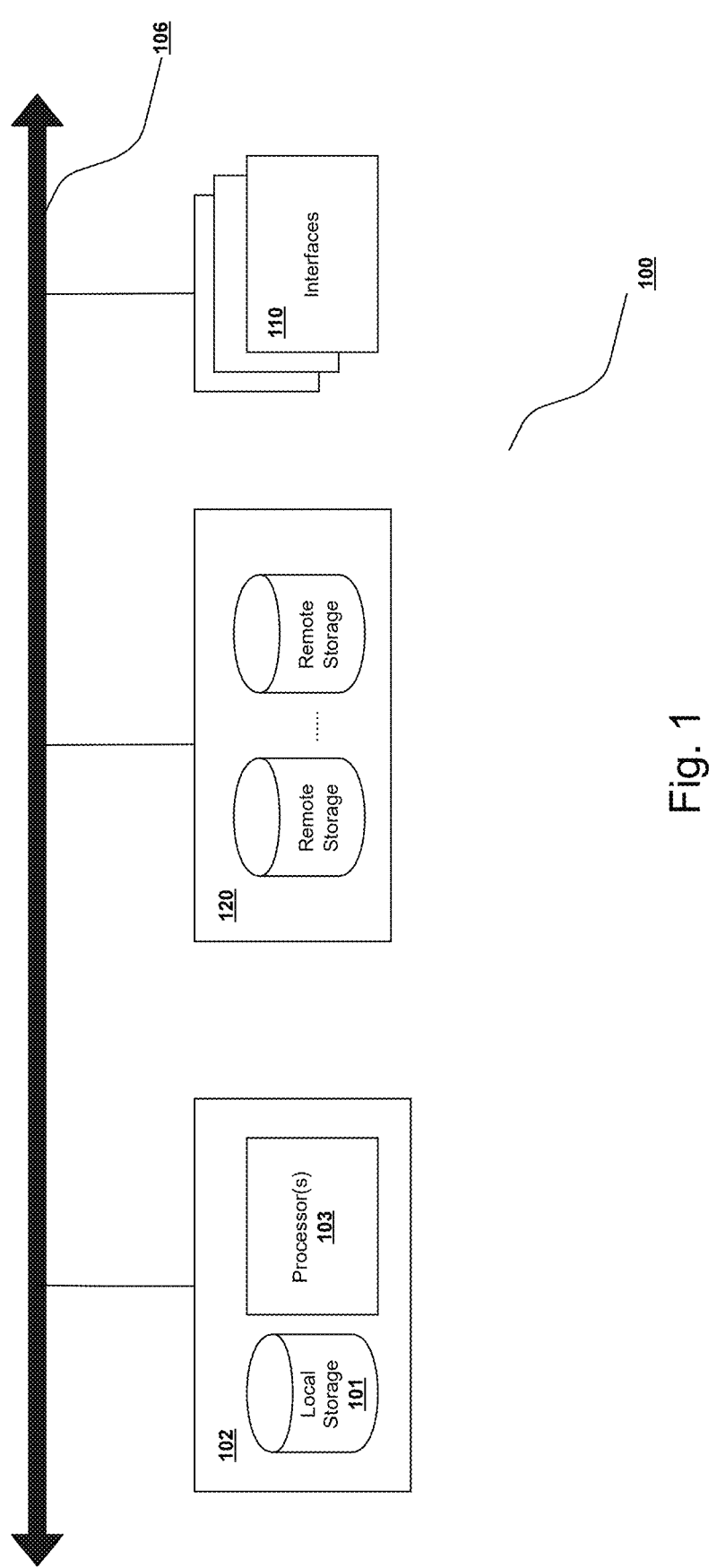
FIG. 1 is a block diagram illustrating an exemplary hardware architecture of a computing device used in an embodiment of the invention.

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network, a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface (s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random-access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FD-DIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control the execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include non-transitory machine-readable storage media, which, for example, may be configured or designed to store program instructions, state information, and the like for performing various operations described herein. Examples of such non-transitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swap-pable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
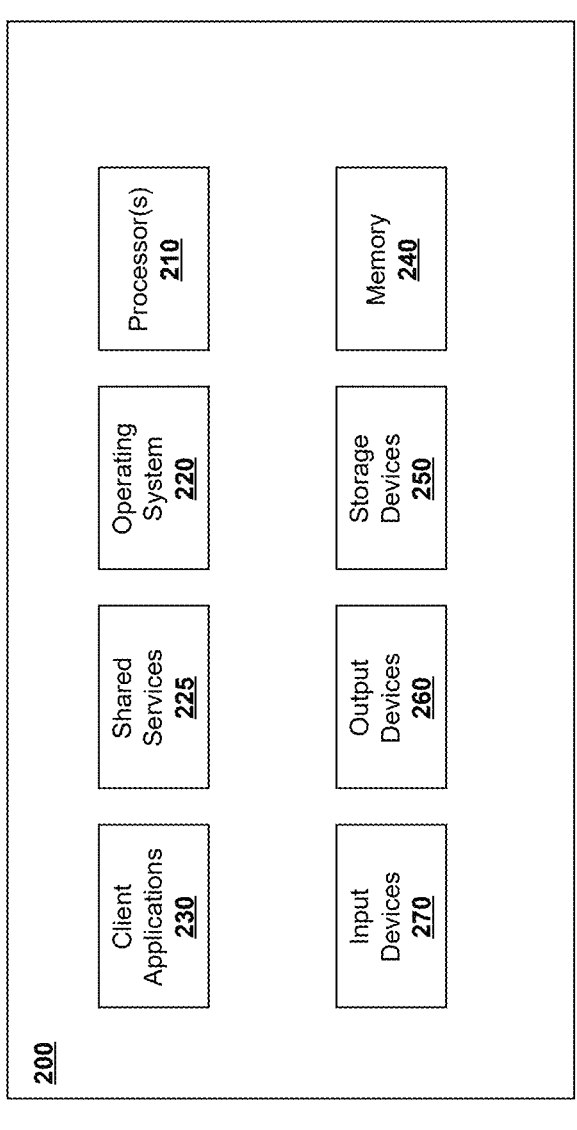
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200 and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example, to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
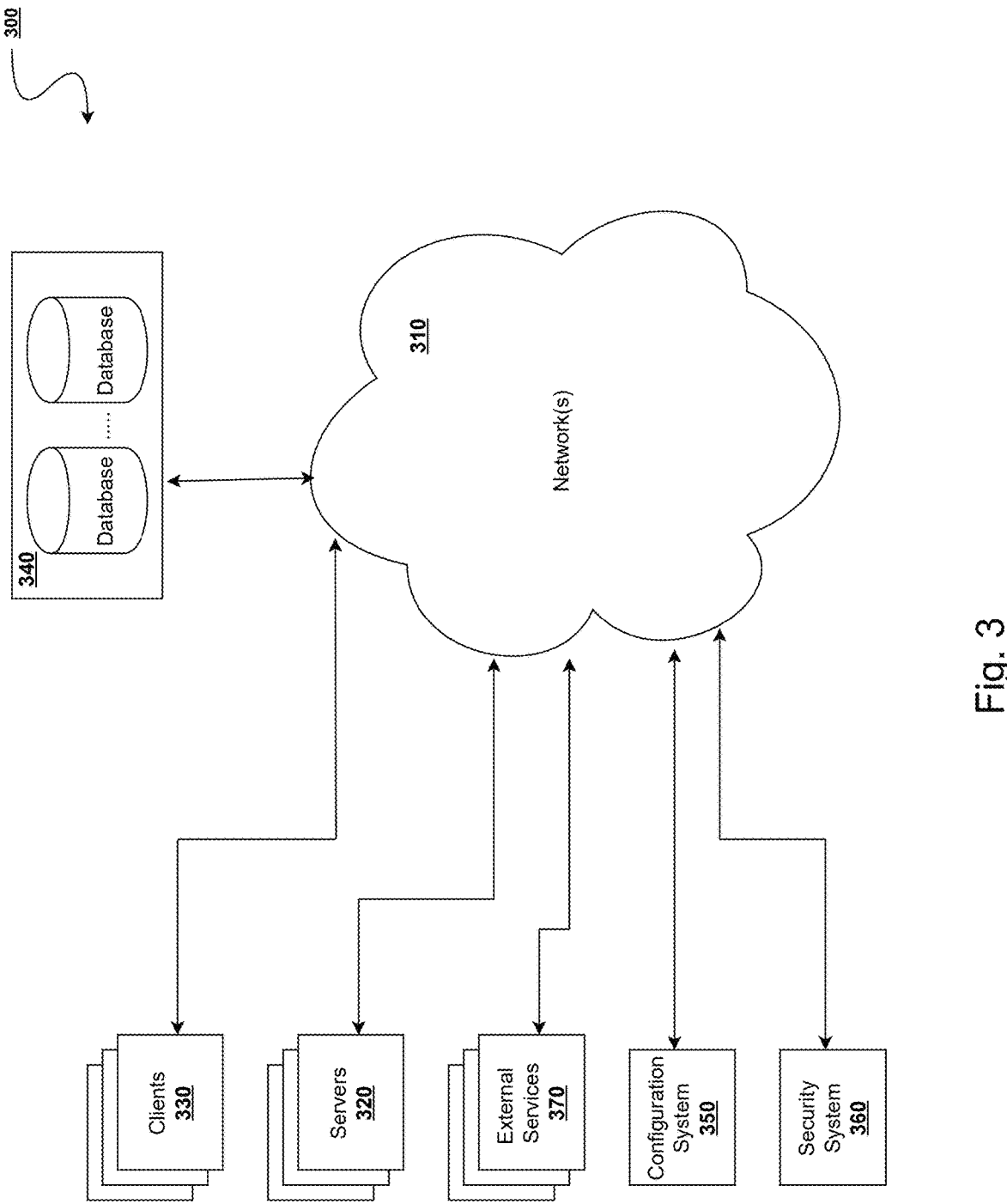
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as Wi-Fi, WiMAX, LTE, and so forth), or a local area network (or indeed any network topology known in the art; the invention does not prefer any one network topology over any other).

Networks 310 may be implemented using any known network protocols, including for example wired and/or wireless protocols.

In addition, in some embodiments, servers 320 may call external services 370 when needed to obtain additional information, or to refer to additional data concerning a particular incoming communication. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments, one or more databases 340 may comprise a relational database system using a structured query language (SQL), while others may comprise an alternative data storage technology such as those referred to in the art as "NoSQL" (for example, Hadoop Cassandra, Google Big Table, Mongo, and so forth). In some embodiments, variant database architectures such as column-oriented databases, in-memory databases, clustered databases, distributed databases, or even flat file data repositories may be used according to the invention. In addition, Graph-oriented databases, also known as graph databases, are designed to manage and store data structured as graphs, where entities (nodes) are interconnected with relationships (edges), examples include (Amazon Neptune, Microsoft Azure Cosmos DBs, TigerGraph, GraphDB and so forth). These databases are particularly effective for applications involving complex relational queries and traversals, such as social networks, recommendation systems, and network topology analysis.

In addition, vector databases also referred to as vector search databases or similarity search databases, are engineered to index, manage, and retrieve high-dimensional vectors typically generated by machine learning models. These databases are adept at handling operations such as nearest neighbor search in vector space, which is critical for tasks involving image recognition, natural language processing, and recommendation engines, where items are represented as vectors in a multi-dimensional space. Notable examples include Pinecone, Milvus, Weaviate, and Elasticsearch with vector plugins. Vector databases excel in scenarios that require matching patterns or finding similar items based on vector proximity, making them indispensable for modern AI-driven applications such as semantic search, personalization features, and fraud detection systems.

It will be appreciated by one having ordinary skill in the art that any combination of known or future database technologies may be used as appropriate unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database," it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each is generally associated with any IT or web systems. It should be understood by one having ordinary skill in the art that any configuration or security subsystems known in the art now or in the future may be used in conjunction with embodiments of the invention without limitation unless a specific security 360 or configuration system 350 or approach is specifically required by the description of any specific embodiment.

Figure 4:
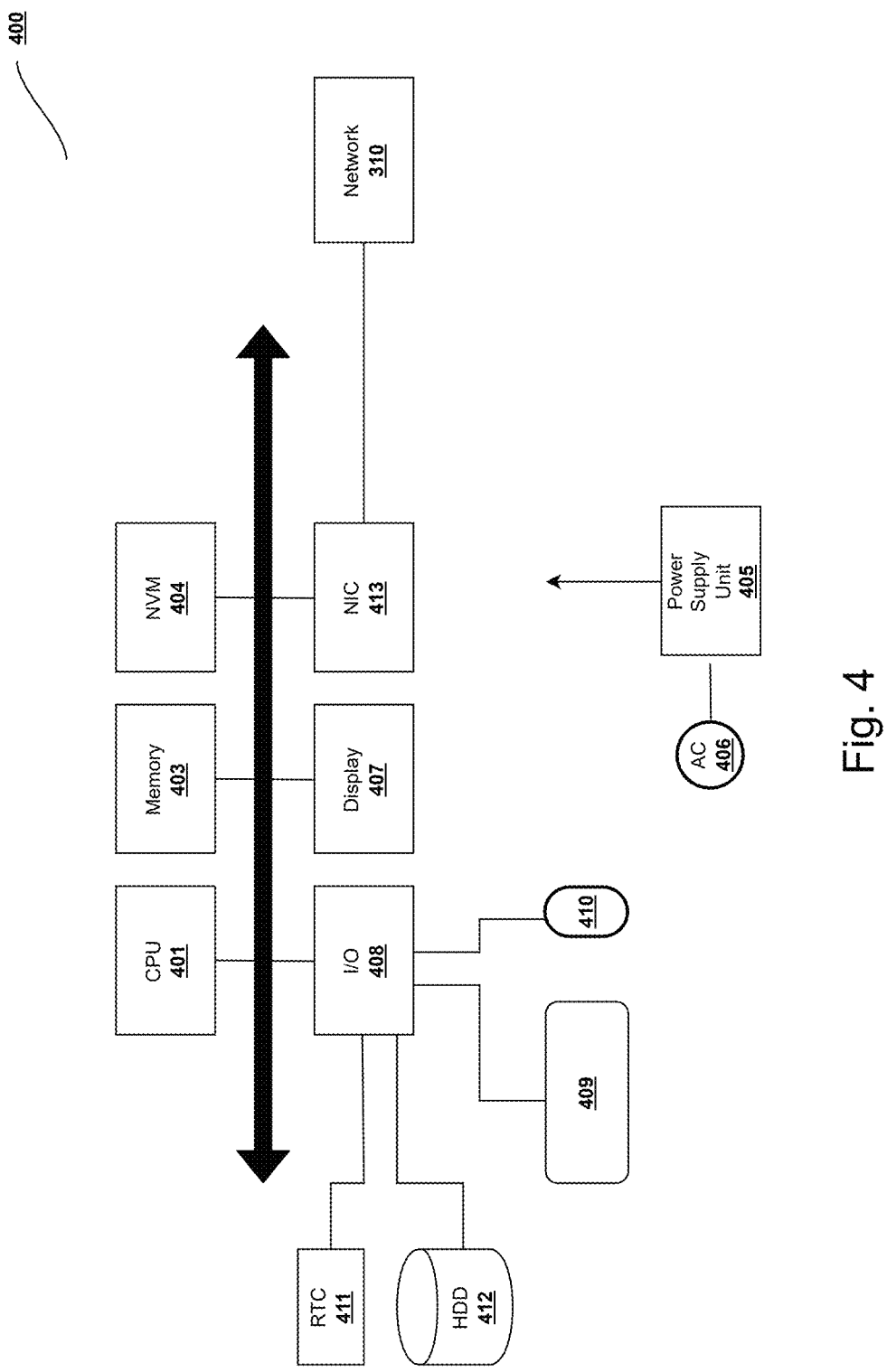
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which may or may not have connections to the Internet. Also shown as part of system 400 is power supply unit 405 connected, in this example, to ac supply 406. Not shown are batteries that could be present, and many other devices and modifications that are well known but do not apply to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

Figure 5:
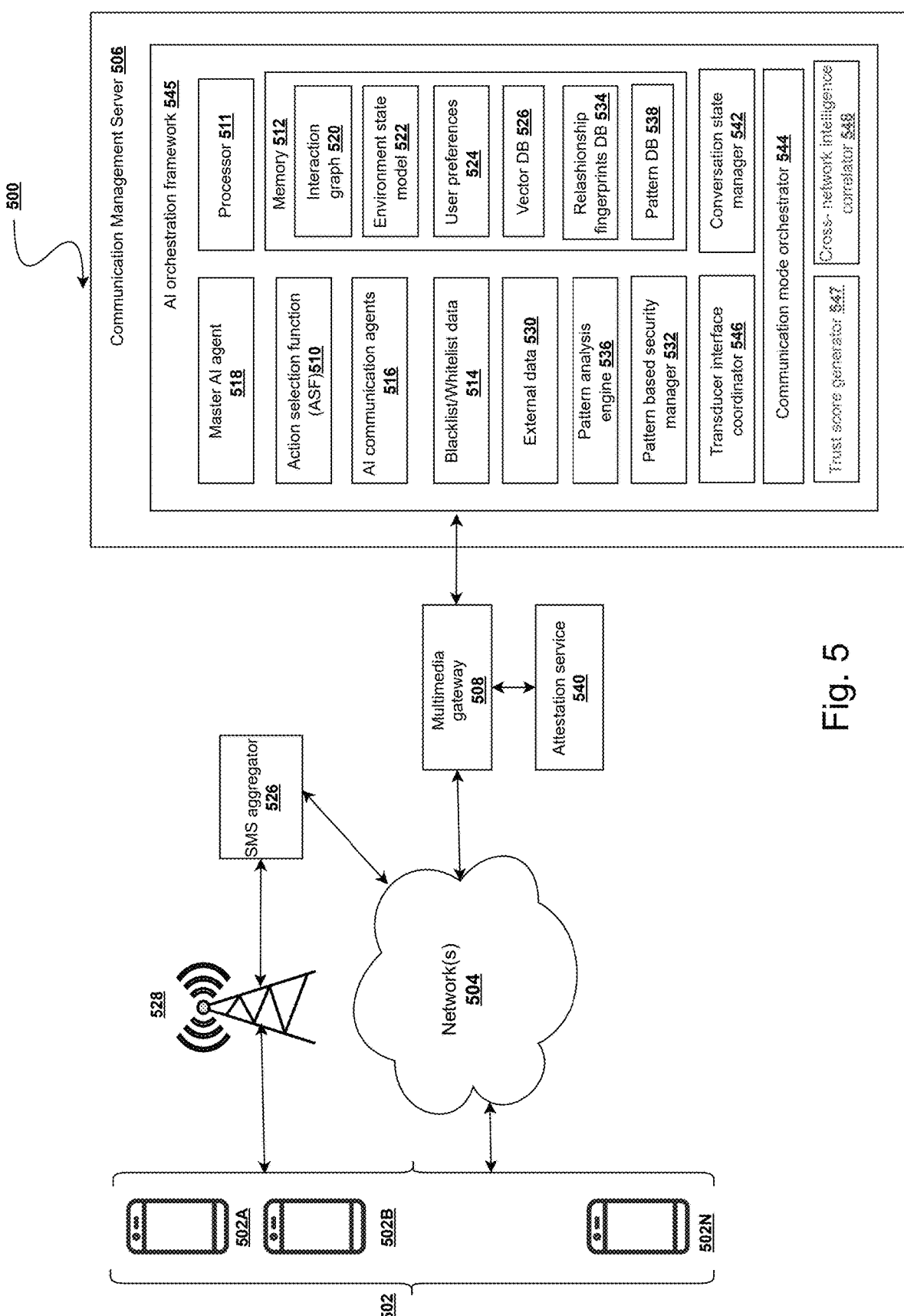
FIG. 5 is an example implementation architecture of the AI orchestration framework 545 within communication management server 506, according to an embodiment of the invention.

In various embodiments, functionality for implementing systems or methods of the present invention may be distributed among any number of client and/or server components. For example, various software modules may be implemented for performing various functions in connection with the present invention, and such modules may be variously implemented to run on server and/or client components.
Detailed Conceptual Architecture FIG. 5 is an example implementation architecture of the AI orchestration framework 545 within communication management server 506. Communication management server 506 is the physical server infrastructure that hosts the AI orchestration framework 545.

The AI orchestration framework 545 enables seamless transitions between synchronous and asynchronous communications for professional users for processing of an incoming communications, according to an embodiment of the invention.

AI orchestration framework 545 represents a system architecture that enables professional communication management through seamless transitions between synchronous and asynchronous communications. This framework functions as a sophisticated telephone receptionist for high-value professionals while maintaining strict boundaries that preserve professional control over substantive decisions.

In an embodiment, a "professional user" refers to a high-value professional who manages frequent, important communications across multiple channels as an integral part of their specialized occupation. These individuals typically work in fields where missed or delayed communications can have significant consequences, different contacts require different handling approaches, and understanding affinity patterns directly impacts outcomes. Professional users include, but are not limited to, legal professionals (attorneys, paralegals), healthcare practitioners (physicians, specialists), financial services professionals (investment advisors, financial planners), real estate professionals (agents, brokers), executive leadership (C-suite executives, directors), consultants, and business development professionals whose work involves complex relationship management and time-sensitive decision-making.

In an embodiment, communication management server 506 is in communication with the multimedia gateway 508, which in turn may be connected through one or more networks 504 with a plurality of user devices 502A, 502B . . . 502N, (collectively referred to as user devices 502).

In an embodiment, professional user devices are a specialized subset of user devices 502 that are registered to and operated by these professional users. In an embodiment, user devices 502 may include one or more mobile devices, smartphones, general-purpose computers, tablet computers, laptop computers, smart wearable devices, voice command devices, Internet-of-Things (IoT) devices, or any other device capable of communicating with the network 504, including mobile service provider 528, and ultimately communicating through the multimedia gateway 508 with one or more components of the communication management server 506. One subset of the user devices 502 are the devices owned and used by the registered users which are being monitored for incoming communications by the multimedia gateway 508. Another subset of the user devices may be owned and used by known contacts of the registered users. The remainder may be user devices of user's unknown to the registered user of the system.

As shown in FIG. 5, professional user devices may include a primary work device 502A (such as a desktop computer or workstation), a mobile professional device 502B (such as a smartphone or tablet), and potentially other specialized communication devices 502N (such as wearables, vehicle systems, or smart office equipment). These devices are configured with the professional's preferences, authentication credentials, and domain-specific settings that enable AI orchestration framework 545 to make appropriate decisions aligned with the professional's needs and ethical obligations.

In an embodiment, a device owner first registers an account with the communication management server 506 for their devices, thereby becoming a registered user, and sets initial preferences, regarding contacts and hours and the user's goals if the user wishes. In an embodiment, registered user devices 502 may connect using a progressive web application that uses WebRTC for communications data exchange and registration. Further, the user may answer a series of questions that set their initial objective reward function based on a holistic view of their lifestyle and short-term and long-term goals. After the registered user is set up, incoming communications to the registered user's devices are handled by communication management server 506.

In an embodiment, communication management server 506 may include a processor 511 and a plurality of programming instructions stored in a memory 512. The instruction when executed may be configured to manage incoming communications for registered user devices. Communication management server 506 may be configured to communicate with user devices 502 via the multimedia gateway 508, which may serve as an intermediary between one or more networks 504 and communication management server 506.

In an embodiment, multimedia gateway 508 receives an incoming communication notification from the communication networks 504 including signaling and routing information as well as originating and terminating user identification information from among the plurality of user devices 502. Multimedia gateway 508 responds with appropriate information to pause the communications process while it is processed by communication management server 506. Multimedia gateway 508 may be configured to communicate signaling and routing information along with originating and destination user identification information from among a plurality of users 502 associated with an individual incoming communication from an originating network 504.

In an embodiment, multimedia gateway 508 may be configured to make use of existing third-party attestation data from a third-party attestation service 540 if available. This brings additional contextual data relating to a telco customer and the source of the incoming call. This additional data may be added to the interaction graph 520 to further improve the decisions made by the master AI agent 518 when handling the incoming call.

In an embodiment, user preferences 524 may be maintained by communication management server 506 and may include: Do not disturb (DND) hours (set unavailable times to mute notifications), contact exceptions (override hours for priority contacts), channel priorities-rank messaging, email, calls for importance, custom rules (If-then logic to route senders and keywords), AI delegation (desired level of automation versus user confirmation), activity settings (visibility of transcripts, recording, data), integration permissions (allowed 3rd parties and data access). In addition, the registered user can enter a statement of their overall short-term and long-term goals relating to communications decisions. Details related to configuring the user preferences and rules are described in FIGS. 7A and 7B.

In an embodiment, the interaction graph 520 may be a heterogeneous multigraph holding multiple graph representations with different types of nodes and different types of edges between nodes for different purposes. At the lowest level, the interaction graph 520 may capture current or historical communications (or communication attempts) between devices where each node represents a unique device, and each edge represents an individual communication between devices. Each node has a rich set of attributes relating to the details of the device and each edge has a rich set of edge attributes associated with the communication between the nodes, including information like the channel type, duration, subjects, content, and embeddings of content. In an embodiment, these detailed historical interaction data are essentially immutable (as they can be considered the raw "facts" in the terminology of data warehousing).

The interaction graph 520 in the communication management system is a complex network of nodes and edges representing users, their relationships, and communication interactions. To effectively leverage this graph-structured data for decision-making, the master AI agent 518 employs Graph Neural Networks (GNNs), a cutting-edge AI technique designed to process and learn from graphs.

GNNs work by iteratively updating the representation (embedding) of each node and edge in the graph based on the features of the node itself, the features of its neighboring nodes, and the features of the connecting edges. This allows the GNN to capture both the local and global structure of the interaction graph and learn meaningful patterns and relationships.

The master AI agent 518 uses a specific type of GNN called a Graph Convolutional Network (GCN) to process the interaction graph. The GCN consists of multiple layers, each of which performs the following operations:

1. Feature Aggregation: For each node, the GCN aggregates the features of its neighboring nodes, and the features of the connecting edges, weighted by the strength of their connections (edges).
2. Edge Feature Transformation: The features of the edges are transformed using a learnable weight matrix to compute new edge representations that capture the characteristics of the relationships between nodes.
3. Node Feature Transformation: The aggregated node features and transformed edge features are then combined and transformed using another learnable weight matrix to compute a new representation for the node.
4. Non-linear Activation: A non-linear activation function, such as ReLU (Rectified Linear Unit), is applied to the transformed features to introduce non-linearity and increase the expressive power of the GCN.

By stacking multiple GCN layers, the master AI agent can learn hierarchical representations of the interaction graph, capturing both low-level features (e.g., individual communication interactions and relationship characteristics) and high-level patterns (e.g., group communication dynamics and complex relationship structures).

The learned representations from the GCN, including both node and edge embedding, are then used as input features for the Environment State Model 522 and a Markov Decision Process (MDP) which is then solved to find the Action Selection Function (ASF) 510 to make more informed and context-aware decisions for managing incoming communications based on the user's preferences and the structure of the interaction graph, and the nature of the relationships between users. Specifically, the learned embeddings from the GCN may be used as input features for the MDP in the following ways:

State Representation: The Environment State Model 522 of the MDP may be represented using the embeddings of the relevant nodes and edges in the interaction graph. For example, when a new communication arrives, the state may be constructed by concatenating the embeddings of the sender node, the recipient node, and the edge representing their relationship. This environment state representation provides the MDP with rich information about the context of the communication, including the characteristics of the involved users and their relationship. Clustering in the embedding space may then be performed to proactively manage the size of the state space.

Reward Function: The reward function of the MDP is designed to align with the user's preferences and the desired communication management objectives. The GCN embeddings may be used to compute rewards based on the characteristics of the users their relationships and the communication content. For example, edge embeddings can assign higher rewards for priori-
tizing communications from important contacts, or the
importance or urgency of the communication based on
the nature of the relationship between the sender and
the recipient and the embedded content of the communications.

Transition Probabilities: The transition probabilities of the
MDP, which define the likelihood of moving from one
state to another based on the chosen action, can be
based on historical frequency or in their absence, also
estimated using the GCN embeddings. The embeddings
can capture patterns and dynamics in the interaction
graph that influence the outcomes of communication
management decisions. For instance, the node and edge
embeddings can help predict how users are likely to
respond to different actions taken by the master AI
agent, such as the probability of a delegated task being
completed successfully based on the characteristics of
the assigned person or agent.

At the higher level, the interaction graph may capture
relationships between the parties (who operate the devices)
where each node represents a unique party, and where each
edge between parties represents a relationship between
parties. This enables the interaction graph to represent
affinities, common interests, and other associations between parties as general relationships. These relationships may be
dynamic, unlike the immutable device-level graph edges.
Each node may have a rich set of known attributes about the
party, e.g. for human parties this this can include demo-
graphics, personal preferences, and interests. But there can
be multiple kinds of relationships between two parties. One
kind of relationship can be e.g. a declared actual familial or
business relationship between parties, e.g. "is the spouse of"
"is a child of" or "is business partner of." Another relation-
ship could be an "affiliation" between two parties in terms of
a formal or informal connection or association that would
typically involve some form of cooperative relationship or
alignment or common interest, e.g. "share interest in moun-
tain biking" or "share interest in antique collection." A
communication interaction relationship exists when there is
frequent communication between parties even though the
topic of conversation may not be known. The interaction
graph therefore uses an aggregated measure of frequency or
strength of communications between two parties to represent
a communications interaction relationship.

The interaction graph 520 discovers and stores the asso-
ciation of one or more devices to each party over time or also
the fact that multiple parties may share the use of certain
devices in some circumstances (such as a shared home or
office communications device). In an embodiment, the parties included in the interaction graph nodes also include AI
machines acting like proxies for humans which may include
the AI communication agents 516 of the system itself, but
also any third-party communication bots.

Interaction graph 520 therefore captures relationships and associations between devices and parties that may be useful
in optimizing communication interactions and unlocking
value through actions creating new interactions (or blocking
interactions) between nodes. Data from interaction graph
520 may be used for additional feature calculations such as
correlation, causation, covariance, association rules, depen-
dencies, time-series relationships, spatial and temporal asso-
ciations, and general multivariate relationships. A simple
example of an interaction graph 520 is described in FIG. 6.

In an embodiment, master AI agent 518 receives signaling
and routing information about incoming communication
directed toward a first-user device via multimedia gateway 508. Based on the content and context of the incoming
communication, the master AI agent 518 first updates the
interaction graph 520 and then uses the interaction graph
520 data to update environment state model 522 in case a
similar state is not previously captured.

In an embodiment, environment state model 522 is a state
machine that tracks the current environment state of the
registered user which may include the number and type of
live communications the registered user is currently paying
attention to, including the state of each. Further in some
cases, in addition to considering the communication state of
the registered user other attributes of the physical environ-
ment, the user is in, and even states such as the emotional,
and tiredness state of the registered user may be tracked by
the environment model.

Environment state model 522 may be used by master AI
agent 518 to determine the action to be performed for
processing the incoming communication. Environment state
model 522 may be the basis of a reinforcement learning-
based AI model that defines states and associated actions
based on learning and user preferences 524. In an embodi-
ment, environment state model 522 is designed to allow
communication management server 506 to identify and
trigger the modification of the communication state of user
devices and to take other actions. In an embodiment, envi-
ronment state model 522 may be used by the master AI agent
518 to implement a fully observable Markov Decision
Process (MDP). Details of an environment state model 522
are described in conjunction with FIG. 8.

In some aspects, the techniques described herein relate to
a model-based method for managing incoming communica-
tions, whereby the environment state model 522 is selected
to be partially observable and may be modelled by a
Partially Observable Markov Decision Process (POMDP).
The POMDP allows the invention to plan communication
actions under uncertainty that considers not just the proba-
bilistic outcomes of actions (like for MDPs) but also the
uncertainty of what the current state is due to privacy or
other data restrictions.

In an embodiment, master AI agent 518 may be config-
ured to initiate actions for incoming communication. The
actions taken on behalf of the user may be in alignment with
the user's short-term and long-term goals. In one embodi-
ment, the master AI agent 518 may perform decision-
making using two different approaches to reinforcement
learning referred to as "model-based" and "model-free." The
master AI agent 518 may switch between these two
approaches based on the availability of adequate relevant
historical data, the observed decision quality, user goal
modifications, or changes in the user's environment. The
terms "model-based" and "model-free" are used here in the
context understood by those skilled in the art of reinforce-
ment learning. Model-free approach to decision-making and
switching between model-based and model-free approaches
is described in FIG. 10. FIGS. 6-9 describe the use of a
model-based approach for determining actions for process-
ing incoming communication.

During operation, based on the information available in
the system, a current state of the environment is generated
and master AI agent 518 may invoke the action selection
function (ASF) 510 to determine the action to take to process
the incoming communication. The action selected by ASF
510 may be executed by the master AI agent 518 using the
multimedia gateway 508 and/or AI communication agent.
For example, the action may be to send an instruction
directly to the multimedia gateway 508 to block the incom-
ing call, or the master AI agent 518 invoke one or more generative AI communication agents 516 to perform additional sub-tasks according to different agentic roles before sending an instruction to the multimedia gateway 508.

For some incoming communications, the action chosen by the ASF 510 and executed by the master AI agent 518 may be a complex one requiring the master AI agent 518 to invoke an AI communication agent 516.

In an embodiment, AI communication agents 516 represent a sophisticated subsystem of specialized AI agents designed to interact with external parties according to specific roles and contexts. AI communication agents 516 serve as the system's primary interface for direct communication with callers and other external parties.

AI communication agents 516 serve as sophisticated intermediaries that facilitate communication while respecting strict professional boundaries. They receive high-level instructions from master AI Agent 518, leverage relationship context from the interaction graph 520, follow professional preferences defined in user preferences 524, maintain conversation coherence through conversation state manager 542, adapt their communication mode based on directions from communication mode orchestrator 544, and utilize appropriate interfaces as determined by transducer interface coordinator 546.

In an embodiment, AI communication agents 516 are generative AI models that use natural language processing to extract preferences from conversations, emails, and messaging history to infer optimal communication hours, interests for conversation topics, and priority contacts. In an embodiment, AI communication agents 516 operate in the framework of retrieval augmented generation, declarative model building, and collective reasoning under the control of the master AI agent 518.

The AI agents in the communication management system are more than simple generative AI agents and may utilize Machine Learning (ML) techniques to continuously improve their decision-making capabilities. This involves:

Data Collection: Gathering historical data on incoming communications, user preferences, actions taken, and outcomes.

Feature Extraction: Identifying key features from the collected data that are relevant for decision-making, such as sender attributes, communication type, content keywords, and user feedback.

Model Training: Using the extracted features to train ML models, such as decision trees, support vector machines, deep neural networks, or graph neural networks to predict the best actions for handling incoming communications.

Model Evaluation: Testing the trained models on a separate dataset to assess their performance and make any necessary adjustments.

Online Learning: Continuously updating the ML models based on new data and user feedback to adapt to changing user preferences and communication patterns.

Unsupervised Learning: Applying techniques such as clustering and dimensionality reduction to identify hidden patterns and structures within the data, which can provide insights and improve the decision-making process.

By leveraging ML techniques, AI agents can learn from past experiences and improve their ability to make optimal decisions that align with the user's goals and preferences.

In an embodiment, different AI communication agents 516 may be configured to support different types of communications. For example, a first AI communication agent may be associated with performing voice-based actions, a second AI communication agent may be associated with handling email communication, and a third AI communication agent may be associated with incoming text messages.

During the processing of the incoming communication, an AI communication agent 516 may be utilized by master AI agent 518 to generate communication content for the incoming communication. In some cases, AI communication agents 516 may analyze communication content.

In addition to machine learning and generative AI techniques, AI communication agents may employ more conventional Natural Language Processing (NLP) techniques to analyze and understand the content of incoming communications. This includes:

Tokenization: Breaking down the text into individual words or tokens.

Part-of-Speech (POS) tagging: Identifying the grammatical role of each word (e.g., noun, verb, adjective) to understand the structure of the sentences.

Named Entity Recognition (NER): Identifying and classifying named entities such as people, organizations, locations, and dates.

Sentiment Analysis: Determining the sentiment (positive, negative, or neutral) expressed in the communication to gauge the emotional tone.

Intent Recognition: Identifying the purpose or goal of the communication, such as making a request, asking a question, or expressing a complaint.

By applying these NLP techniques, the AI communication agents can extract meaningful information from the incoming communications, which is then used by the master AI agent to make informed decisions on how to handle each communication based on the user's preferences and the interaction graph.

In an embodiment, communication management server 506 may include a blacklist/whitelist data 514. This may be used to avoid unnecessary repeating of reasoning to determine whether an incoming multimedia communication should be immediately blocked or be connected for further processing. The data may also be prepopulated through the 3rd party attestation service or user preferences. The data may be configured with an expiry timeout.

In an embodiment, communication management server 506 may include a vector DB 526 which is a specialized type of database designed to efficiently handle vector embeddings, which are high-dimensional vectors used to represent complex data items in a form suitable for machine learning algorithms, particularly in the context of similarity search operations or compressed representations of graph data. This may be used by the master AI agent 518, in its method of managing the large state-space during model-based operation, but also for more efficient routing and semantic search operations.

During operation, an incoming communication associated with a user device among a plurality of user devices is received on a multimedia gateway wherein the incoming communication is one of a voice message, an audio call, a text message, an email, or a video communication. The multimedia gateway provides new context and content data associated with the incoming communication which is sent to the master AI agent. The master AI agent stores the new information in the interaction graph memory. It then invokes the reinforcement learning action selection function ASF to determine an action for processing the incoming communication, wherein (for the model-based mode) the action is associated with the modified environment state, and information from the interaction graph, wherein the interaction graph is indicative of previous interactions and relationships of the user and user device, other user devices, and also with AI communication agents invoked previously by the communication management server.

The action selected by the action selection function ASF may be executed by a function call from the master AI agent 518 to an internal application programming interface (API). Some function calls are executed on the multimedia gateway, but a selected action may require the master AI agent to perform additional sub-tasks including the selection and configuration of AI communication agents to co-operate to further analyze content, or for generating new multimedia content, perform additional limited reasoning and estimations and so on. On completion of such sub-tasks or in the event of a timeout, the master AI agent 518 may send a completion message back to the multimedia gateway 508 that specifies any final external actions for multimedia gateway 508 to continue handling user devices.

In an embodiment, multimedia gateway 508 and communication management server 506 may operate in the cloud, and master AI agent 518 may perform functions when one or even all of the registered user's devices are offline or even powered down. This enables a high degree of intelligent communication handling, content analysis, and generation to occur even in the complete absence of the registered user and their devices.

In an embodiment, communication management server 506 may be implemented as a set of microservices for each of the various components of communication management server 506 running in containers. In an embodiment, the multimedia gateway 508 may be software that sits in front of an application programming interface (API) or group of microservices to facilitate requests and delivery of data and services between user devices 502 and the communication management server 506. Its primary role may be to act as a single-entry point and standardized process for interactions between the communication management server 506, and the external networks 504, user devices 502, and other external devices.

In another embodiment, the components of the communication management server 506 and multimedia gateway 508 may be implemented as containerized microservices that run in a cloud computing environment. The use of containerization is important in that service instances can be spun up in near-real-time and then made inactive when no longer required. Certain elements such as the multimedia gateway 508 need to be running continuously but can be shared through multi-tenant configuration. The architecture is provided with telco-grade security with encryption, data isolation, access controls, key management, and auditing. Communications are encrypted in transit and at rest using TLS, HTTPS, and AES standards. AI communication agents 516 processing may be isolated through containerization and private cloud tenants. Granular role-based access control may be used for managing user and agent permissions. Secrets and keys follow principles of least privilege and rotation. Detailed security event logging provides transparency and supports forensic analysis. User authentication may include Password, 2FA, SSO, and biometrics.

In an embodiment, communication management server 506 includes a pattern-based decision manager 532 for security validation of the incoming communication. Pattern-based based decision manager 532 manages relationship validation, performs pattern-based security checks and master AI agent 518 determines communication actions.

In an embodiment, pattern-based decision manager 532 uses a pattern analysis engine 536 to identify communication patterns and extract pattern characteristics.

Communication patterns are indicative of how users interact with each other. Communication patterns for every relationship (interaction between two users) may include, but is not limited to, timing of responses, preferred communication channels, and frequency of contact. Communication patterns naturally evolve and become more sophisticated as relationships develop, creating unique fingerprints.

Pattern analysis engine 536 may analyze communication metadata to determine communication patterns between the parties. The parties are a user device associated with the incoming call and the first-user device which is the recipient of the incoming communication.

In an embodiment, the communication patterns may be temporal patterns that identify the time when communications occur, the frequency of interactions between the user devices, the duration of communication, and intervals between interactions. In some cases, the frequency of interaction may be used for tracking trends including, but not limited to, increasing or decreasing interaction frequency, patterns in communication volume, and variations across different time periods. Further, pattern analysis engine 536 may track these temporal patterns to identify characteristics such as response times, preferred communication hours, and changes in these temporal patterns over time.

In an embodiment, the communication patterns may be channel patterns that identify the preferred communication channels (voice, text, email, etc.) between the parties. Further, Further, pattern analysis engine 536 may track shifts in channel preferences over time.

In an embodiment, the communication patterns may be response behavior patterns that identify the time taken by parties to respond to each other, the consistency of responses, and any changes in response patterns that might indicate shifts in relationship dynamics.

In an embodiment, memory 512 may be configured to store an interaction graph 520, an environment state model 522 for the registered user for model-based mode, and user preferences 524. In addition to interaction graph 520, the memory 512 may include a relationship fingerprints database 534, and a pattern database 538.

In an embodiment interaction graph 520 may provide a relationship context to pattern analysis engine 536. In an embodiment, the communication patterns identified by pattern analysis engine 536 may be used for updating interaction graph 520. For example, new nodes may be added in case of receiving incoming communication from new user devices. Edge weights are updated based on interaction frequency and a relationship context is created/strengthened. In an embodiment, interaction graph 520 may further be updated based on the communication channel used. Interaction graph 520 provides relationship context for communication between parties.

In an embodiment, relationship fingerprints stored at relationship fingerprints database 534 may provide the unique characteristics of communication relationship between two parties and it may include temporal patterns (timing, frequency, duration), channel preferences patterns (voice, text, email), response behaviors (speed, consistency), engagement levels, and relationship context. In an embodiment, relationship fingerprints database 534 implements a hierarchical structure that organizes communication patterns at multiple levels-individual relationships, organizational relationships, and network-wide patterns. Each level maintains its own set of pattern characteristics while enabling cross-referencing for pattern validation. The database architecture supports real-time pattern matching while continuously incorporating new pattern observations, creating an evolving knowledge base of communication behaviors.

Relationship fingerprints may be generated from interaction graph 520 data and communication patterns. Relationship fingerprints database 534 may be constantly updated with the processing of new incoming communications. Relationship fingerprints offer relationship characteristics and may be indicative of established communication behaviors.

The fingerprint continuously evolves as the relationship develops, making it increasingly precise in distinguishing legitimate communications from unwanted ones. Each relationship generates its own unique fingerprint that adapts over time, enabling sophisticated pattern matching while preserving complete privacy since no message content is ever accessed or stored.

In an embodiment, communication management server 506 stores aggregated patterns used across services and networks in pattern database 538. Details related to the generation of aggregated patterns using cross-network analysis are described in FIG. 12.

In an embodiment, pattern-based decision manager 532 may use information available in the relationship fingerprints database 534 to process the incoming communication.

During operation, when an incoming communication is received, pattern analysis engine 536 may analyze the communication metadata without accessing content to identify current communication patterns. These patterns are checked against relationship fingerprints stored in a database that captures unique characteristics of how parties communicate. The validation process involves first verifying the relationship context using historical interaction data from an interaction graph and then determining if current communication patterns match established patterns in the relationship fingerprints. For valid relationships without matching patterns, the system evaluates if there is legitimate context for a new pattern and updates the relationship fingerprints accordingly. Pattern-based decision manager 532 continuously strengthens security by updating relationship fingerprints with new patterns and sharing validated patterns across services, enabling protection that evolves with relationships while maintaining privacy.

Details related to the security validation of incoming communication using relationship context and communication patterns are described in detail in FIG. 13.

In an embodiment, communication management server 506 provides a sophisticated AI orchestration framework 545 that functions as an intelligent telephone receptionist for high-value professionals in legal, healthcare, financial, real estate, executive, and consulting fields. A transducer interface coordinator 546, conversation state manager 542, and communication mode orchestrator 544 enables parallel conversation management and context preservation across different communication modes and devices.

In an embodiment, communication mode orchestrator 544 may serve as the central coordination mechanism for managing transitions between synchronous (real-time) and asynchronous communications. It enables bidirectional transitions that maintain full conversational context regardless of communication mode or timing.

In an embodiment, communication mode orchestrator 544 continuously monitors for triggers that might necessitate a mode switch, including changes in the professional's environment, device status, meeting context, content requirements, or interface availability. Upon detecting such triggers, it coordinates with the conversation state manager and transducer interface coordinator to execute the transition.

A key capability of communication mode orchestrator 544 is its ability to manage hybrid communication modes where some information is exchanged synchronously while other aspects are handled asynchronously. This enables sophisticated scenarios like putting a caller on hold while texting the professional for instructions, then seamlessly resuming the conversation with full context preservation.

In an embodiment, a conversation state manager 542 may maintain multiple parallel conversation states simultaneously across different channels and parties. This enables a professional to hold a synchronous conversation with one party via a first transducer interface and communicate asynchronously with an AI agent to process an incoming communication.

Each conversation is maintained as a separate state object with its own context, history, and current status. Conversation state manager 542 may create appropriate information boundaries between conversations, preventing unintended information leakage while enabling intentional cross-conversation referencing when appropriate. It implements information flow controls that respect confidentiality requirements and professional boundaries.

In an embodiment, conversation state manager 542 may support conversational continuity mechanisms that allow a professional to pause a conversation, engage in other activities, and then resume exactly where they left off with full context preservation. This is achieved through comprehensive state capture that includes not just the content but also the intent, mood, and trajectory of each conversation.

In an embodiment, transducer interface coordinator 546 may be configured to manage seamless transitions between different input devices and modalities, allowing professionals to switch between voice commands, touchscreens, keyboards, and wearable devices while maintaining conversation context. Transducer interface coordinator 546 may detect available interfaces in the professional's environment and selects the optimal interface based on the current context, environmental conditions, and affinity patterns. Details related to the selection of optimal interface for processing the incoming communication is described in detail in FIG. 15B

A key innovation of the transducer interface coordinator is its implementation of hybrid interface modes, where multiple interfaces are used simultaneously or in sequence to optimize the communication experience. For example, it might use voice input for content generation while using a touchscreen for navigation and selection, creating a seamless multi-modal interaction experience.

Together, these components enable communication management server 506 to function as a sophisticated telephone receptionist that maintains multiple conversation states, preserves context across different devices and communication modes, and respects the strict boundaries of professional communication management.

In an embodiment, communication management server 506 implements a cloud-native microservices architecture that decomposes the monolithic AI orchestration framework 545 into independently deployable, scalable services. Each component of the system operates as a dedicated microservice with isolated computational resources and dedicated data stores.

In an embodiment, master AI agent 518 operates as a stateless microservice implementing a command query Responsibility Segregation (CQRS) pattern. The service maintains separation between command operations (decision-making, action execution) and query operations (state retrieval, pattern analysis). The microservice exposes REST-ful APIs conforming to OpenAPI 3.0 specifications and implements gRPC endpoints for high-performance inter-service communication with sub-millisecond latency requirements.

In an embodiment, pattern analysis engine 536 functions as a compute-intensive microservice utilizing a compute-intensive microservice that uses automatic scaling based on computational resource utilization metrics. The service implements message streaming integration for real-time event processing and employs distributed caching using in-memory data stores for frequently accessed pattern data. The microservice architecture enables parallel processing of communication metadata across multiple worker instances with automatic load distribution.

In an embodiment, each AI communication agents 516 operate as an independent microservice within a distributed service architecture. The agents communicate through asynchronous message queues implementing the Actor Model pattern, where each agent maintains an isolated mailbox for message processing. The cluster implements circuit breaker patterns using Netflix Hystrix for fault tolerance and auto-matic failover capabilities.

In an embodiment, vector DB 526 operates as a distrib-uted microservice cluster utilizing consistent hashing for data distribution across multiple nodes. The service imple-ments read replicas for query optimization and employs eventual consistency models for high availability. Integra-tion with distributed storage systems ensures persistent data allocation and automated backup procedures.

In an embodiment, pattern-based security manager 532 functions as a security-focused microservice implementing zero-trust networking principles. The service maintains dedicated security contexts with encrypted inter-service communication using mutual TLS (mTLS) protocols. All security operations execute within isolated containers with minimal attack surface exposure.

In an embodiment, a centralized API gateway manages all external communications to communication management server 506, implementing rate limiting, authentication, and request routing. An API gateway provides traffic manage-ment with automatic SSL/TLS termination and automated certificate management.

Distributed storage management discovery enables auto-matic service registration and health monitoring. Distributed service coordination enables automatic service registration and health monitoring. Services communicate through logi-cal service identifiers, eliminating hardcoded network addresses and enabling dynamic scaling without service interruption.

In an embodiment, communication management server 506 may include components designed for trust score gen-eration and multi-attribute trust assessment. Trust score generator 546 operates as a specialized module within the AI orchestration framework 545 that integrates cross-network intelligence correlation results with individual attribute scor-ing to generate dynamic trust levels. During operation, trust score generator 547 receives pattern legitimacy determina-tions from pattern analysis engine 536, relationship context validation from interaction graph 520, and cross-network correlation results from cross-network intelligence correla-tor 548, and then combines these privacy-preserving analy-sis results to calculate trust scores that adapt based on pattern validation across multiple communication services without accessing communication content."

In an embodiment, pattern analysis engine 536 may analyze communication metadata to identify multi-dimen-sional patterns across temporal, channel, and behavioral domains without accessing communication content. Pattern analysis engine 536 employs sophisticated algorithms including time series analysis, frequency analysis, pattern recognition, and behavioral modeling techniques to extract metadata elements such as timestamp, channel type, dura-tion, and other available metadata from incoming commu-nications. Pattern analysis engine 536 continuously updates relationship fingerprints stored in relationship fingerprints database 534 and coordinates with the cross-network intel-ligence correlator 548 to validate patterns across different services and networks.

In an embodiment, cross-network intelligence correlator 548 implements the cross-pollination analysis capability that identifies, validates, and leverages communication patterns across different services and networks to create a self-strengthening security and trust framework. Cross-network intelligence correlator 548 abstracts and normalizes com-mon patterns into standardized formats that can be compared and shared across different parts of the ecosystem, removing service-specific elements while preserving essential pattern characteristics.

Cross-network intelligence correlator 548 may generate correlation results that integrate with individual attribute scoring by providing validated pattern signatures that enhance trust level calculations. Correlator 548 may create a self-strengthening security framework where patterns vali-dated across email, voice, and messaging services strengthen individual trust attribute calculations, enabling dynamic trust levels that adapt based on collective intelligence while maintaining privacy through metadata-only analysis. Cross-network intelligence correlator 548 validates identified pat-terns through consistency checking across services, corre-lation with known legitimate patterns, absence of conflicting pattern indicators, and alignment with expected relationship behaviors. Validated patterns are distributed throughout the ecosystem as aggregated patterns stored in pattern database 538, enhancing the pattern recognition capabilities of all nodes in the network while maintaining strict privacy boundaries. During operation, cross-network intelligence correlator 548 performs similarity analysis across email, voice, and SMS patterns, conducts cross-channel pattern correlation, and compares current communication patterns against known attack patterns to enable proactive threat identification and legitimate communication validation.

In an embodiment, trust score generator 547 may calcu-late specific trust attributes that capture different dimensions of communication relationships including trust level, engagement rate, reliability index, channel preference, tem-poral pattern, and behavioral pattern indicators.

In an embodiment, trust level provides an overall assess-ment of communication trustworthiness based on historical interactions, pattern consistency, and relationship context, displayed as numerical scores or categorical ratings that immediately communicate overall assessment to users. Engagement rate measures the level and quality of engage-ment between communicating parties, including frequency of communications, duration of interactions, and depth of engagement, helping recipients understand how actively parties have communicated in the past. Reliability index assesses the consistency and dependability of communica-tion patterns between parties, including factors such as predictable timing, consistent channel usage, and reliable response behaviors that indicate relationship trustworthi-ness. Channel preference indicates preferred communication methods for the relationship, such as voice calls, text messages, or emails, helping recipients understand whether the current communication channel aligns with established patterns. Temporal pattern provides information about timing patterns of the relationship, including typical communication hours, frequency of interactions, and response timing characteristics that help identify whether current communication follows established patterns. Behavioral pattern may capture interaction styles and engagement behaviors characteristic of the relationship, including formal versus informal communication styles and typical interaction approaches that define authentic communication behaviors.

In an embodiment, communication management server 506 may implement a comprehensive trust score generation process for incoming communications. Upon receiving an incoming communication via multimedia gateway 508, pattern analysis engine 536 immediately initiates parallel processing workflows including communication pattern legitimacy analysis, relationship context validation using interaction graph 520, and cross-network intelligence correlation through cross-network intelligence correlator 548. The trust score generation process employs a sophisticated two-step approach: first validating the relationship context between communicating parties using historical interaction data and relationship strength indicators, then determining whether current communication patterns match established patterns in relationship fingerprints database 534.

Cross-network intelligence correlator 548 compares current patterns against aggregated patterns stored in pattern database 538 to identify consistency with known legitimate behaviors or similarity to recognized threat patterns. Trust score generator 547 directly processes this pattern analysis to generate comprehensive multi-attribute trust scores, where high trust levels indicate communications with validated relationships and consistent patterns, moderate trust levels reflect legitimate relationships with evolving or contextually appropriate new patterns, and low trust levels identify communications with suspicious pattern deviations or alignment with known threat signatures, ensuring that recipients receive actionable trust context through the calculated attributes themselves that enable informed decision-making while preserving privacy for all parties involved.

DETAILED DESCRIPTION OF EXEMPLARY EMBODIMENTS

Figure 6:
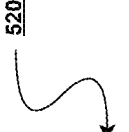
FIG. 6 is an illustration of an interaction graph, according to an embodiment of the invention.
Figure 6:
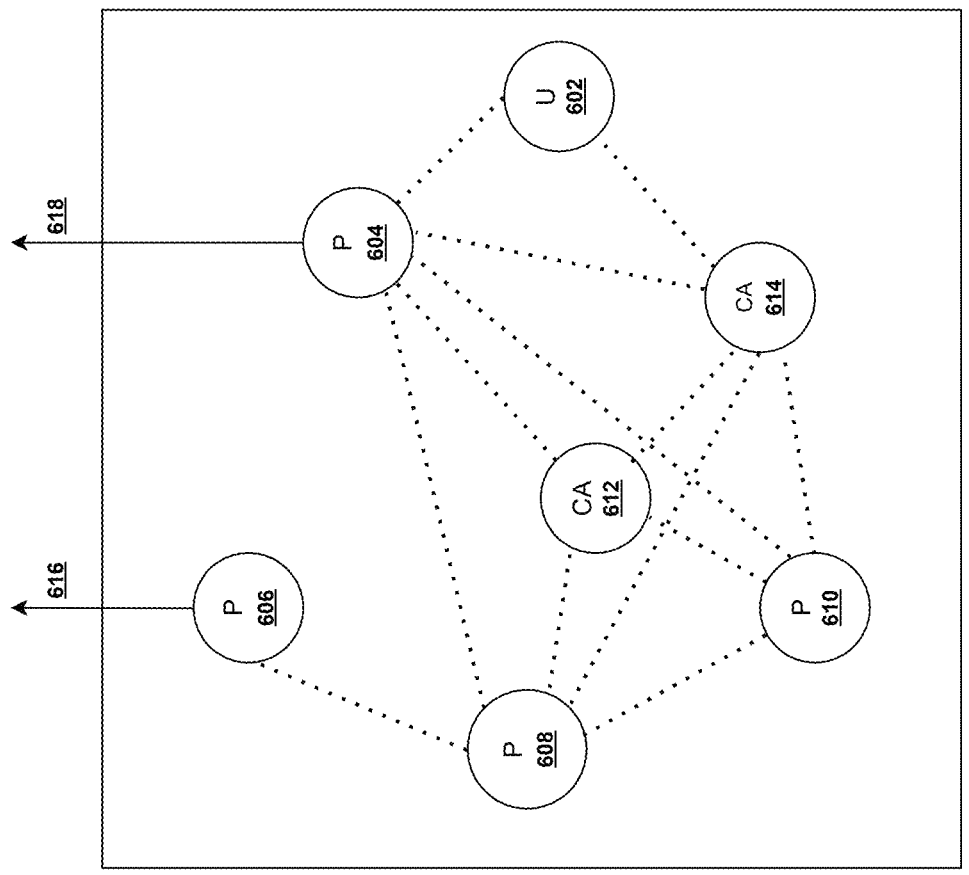

FIG. 6 is an illustration of an interaction graph 520, according to an embodiment of the invention. In this simplified view device nodes are not shown, only party nodes. Each circular node labeled P corresponds to a person, "party" or "contact," and a registered user may be labeled "U," and the AI communication agents are labeled CA. Registered user U-602 may use devices (not shown in this figure) for communication. Interaction graph 520 may be stored in memory 512. Interaction graph 520 represents people and software agents as nodes with relationships and relationships or affinities as edges. The dotted edges in the interaction graph 520 may depict communications interaction relationships between registered user U-602, with known party contacts (P-604, P-606, P-608, P-610), and AI communication agents CA-612 and CA-614. In one embodiment, the edges are weighted by the number of historical interactions between parties and where the absence of an edge indicates no previous direct historical interactions. In FIG. 6, node U-602 represents a registered user as a center point or "root" of their interaction network. Surrounding party nodes (P-604, P-606, P-608, and P-610) represent other people connected to the user. These may include friends, family, coworkers, and acquaintances, but may also represent the source of incoming communications from people or spam bots entirely unknown to the user. AI communication agents CA-612 and CA-614 may be actively connected with users and contacts dynamically by the master AI agent 518 when making decisions about incoming communications by considering relationships, common attributes, and history.

In an embodiment, AI communication agents at nodes CA-612 and CA-614 may be configured by the master AI agent 518 to interact with specific parties. In an embodiment, solid lines 616 and 618 in FIG. 6 may represent actual communication session attempts towards the device of user 602 triggered from parties P-606 and P-604 respectively. In this example, attempt 618 represents a repeat connection between parties P-604 and U-602 which already have a strong direct communications interaction relationship, whereas attempt 616 represents an attempt to make an initial connection from a device of party P-606 to a device of party U-602, which has only a single third level human connection via P-608 and P-604.

FIGS. 7A and 7B depict example dashboards 700 of a user application associated with user preferences 524 within communication management server 506 on the user interface, according to an embodiment of the invention. In an embodiment, the dashboards shown in FIGS. 7A and 7B are examples of an application displayed on a smartphone of user devices 502. Dashboard 700 helps users set the preferences for and respond to notifications from the communication management server 506 using communications 702, configurations 704, and notifications 706. Users can manage their incoming communications by using a mobile web application associated with communication management server 506. In an embodiment, notifications 706 may include a control button to approve, reject, or alter suggestions provided by AI communication agents 516.

Communications 702 may provide a list of pending communications 708 and past communications 710 along with master AI agent 518 recommendations and actions 712. In an embodiment, a user may have access to sender profile details 714 including the person's name, company, location, and photo. In an embodiment, the user can provide feedback 716 on the recommendations and actions from master AI agent 518. In an embodiment, the user can use filter 718 to narrow the view of, e.g., pending communications 708 and past communications 710 by date range, specific senders, or communication channel. Filters 718 may be used, e.g., for searching for contacts and identifying communication patterns.

Insights 720 provides summary statistics and trends about communications associated with users based on incoming communication of user devices. For example, volume and trends for different channels and sender types may be provided to the user. In another example, insights 720 may be specific to AI communication agents 516 and actions taken. Frequency of handling, redirecting, gathering info, and blocking. Further, in some embodiments, insights 720 provides metrics related to communication. Metrics may include conversational quality and processing of unwanted versus wanted communications. Conversational quality reflects on natural language metrics like fluency, coherence, and accuracy. Unwanted versus wanted communications include a comparison of communications deemed wanted against unwanted.

In an embodiment, goals, and rewards 724 are provided to enable the user to express the overall goals they want to achieve with communication management and to specify rewards that are indicative of a related alignment score. Alignment score may be a quantitative measure of reward captured vs maximum possible. Configurations 704 provides a list of configuration options for setting user preferences 524 and rules for managing communication. Do not disturb (DND) hours 726 may be set by the user. DND may refer to unavailable times to mute notifications. Contact exception 728 may be related to priority contacts. DND may not apply to contact exception 728. Channel Priorities 730 allows users to rank different channels of communication (messaging, email, calls for importance, custom rules) in order of priority. Further, channel priorities may also include rules and conditions to route senders and keywords. AI delegation 732 refers to the level of automation versus user confirmation. In an embodiment, the master AI agent 518 may direct actions without requiring user confirmation via a control button. Activity settings 734 may be related to the visibility of transcripts, recording, and data storage. Integration permissions 736 display the allowed third parties that can access user device data. This type of configuration and communication-related insights may assist in the data-driven tuning of the master AI agent 518 to help in improving alignment and effectiveness.

FIG. 8 illustrates an example of a highly simplified environment state model 800 used by master AI agent 518 for determining an action for incoming communication, according to an embodiment of the invention. In an embodiment, master AI agent 518 invokes ASF 510 to determine the action to be selected for processing the incoming communication. ASF 510 may be associated with the environment state model that implements the MDP to reflect the different states, actions, and associated rewards. In the example shown in FIG. 8, environment state model 800 may be implemented as a fully observable MDP. MDP provides a mathematical framework for modeling decision-making in situations where outcomes are partly random and partly under the control of a decision-making agent. MDPs are used to help make decisions that maximize the cumulative reward to the registered user. MDP is a framework for AI model-based reinforcement learning. Environment state model 800 may be configured with states, transitions, and rewards based on the user preferences. The MDP may be characterized by the following:

States(S): A set of states describing the possible combined state of the agent representing the registered user in its environment. In FIG. 8 states labeled SA-804, SB-806, and SC-808 depict different states corresponding to specific communication and general environment states with a registered user. In an embodiment, a user will have many states for representing variation of communication-related states and many more for additional holistic state combinations. The states in environment state model 800 may be designed based on the user preferences and short-term and long-term goals of the registered user or clustering of GCN embeddings.

Actions (A): A set of actions that can be taken by the master AI agent 518 in any specific state. The black dots on each state transition may reflect the different possible actions taken from that state which will result in a probabilistic transition to the next state indicated by the transition arrow.

Transition Probabilities (P): The transition model is a description of what state the registered user moves to in their environment, given the current state and action taken by the master AI agent 518. The transition is uncertain and has a probability associated with it for each combination of state and available action. For example, when a spammer is asked a question to discover more information about them or the purpose of the call, they may answer the question, or they may abandon the call resulting in transitions to different communication states with different probabilities. In an embodiment, the registered user may start their first day on the system at state "S-802" and may desire to be close to some holistic state "E-810" at the end of the day with messages answered and no communications active and located in their bedroom by 11 pm. Powering on their phone the next morning would result in them being transitioned to a new starting state depending on waiting messages and any missed calls.

Rewards (R): A reward function that returns the immediate reward received after transitioning from one state to another due to an action. Rewards are a measure of fulfillment of user preferences 524 by master AI agent 518. In an embodiment, different actions may be associated with different rewards FIG. 9 is a flow diagram of an example method 900 for determining an action for processing an incoming communication using an MDP model-based approach, according to an embodiment of the invention using the MDP model-based approach. The steps of method 900 may be performed at communication management server 506 by the master AI agent 518.

In the model-based approach, environment state model 522 may be configured to model the state of the user's world and to predict the outcomes (next states and rewards) of communications actions taken from a particular state the user may be in at the time the action is taken. Because they possess a model of the environment, model-based systems may also plan by considering multiple future states and choose actions that optimize long-term rewards. This capability allows for sophisticated strategies that plan a sequence of future events. A model-based system can therefore use the environment model to simulate and evaluate not only the immediate reward from an individual action but also the accumulated reward of sequences of actions to maximize long-term rewards. In model-based reinforcement learning, the objective is to learn a function that provides a mapping from the current state of the user in their environment to the best action they can take, i.e. the one that maximizes the expected value of the total (discounted) reward in the future. An advantage of the model-based approach is that it can efficiently make use of prior knowledge and extrapolate to new situations not previously encountered.

At step 902, master AI agent 518 may receive signaling and routing information related to the incoming communication device via the multimedia gateway 508. The incoming communication may be directed towards a first-user device registered with the communication management server 506. The incoming communication may be a voice message, an audio call, a text message, an email, or a video communication.

At step 904, master AI agent 518 may use a state representation function to determine the current state of the user environment. In an embodiment, a state representation function may update interaction graph 520 based on the incoming communication and may determine the environment state of the user based on a context associated with the incoming communication, user preferences associated with the user device, and the updated interaction graph 520, and features from the GCN.

In an embodiment, an existing State Representation Function may be used to map the structured and unstructured description into a single state s of the set of all states S of the model-based Markov Decision Process.

In an embodiment static, dynamic, structured, and unstructured data may be retrieved from interaction graph 520 and user preferences 524 to create a declarative form of the decision problem to be solved. The decision problem may consider structured and unstructured data to generate a current state in the environment state model 522.

Examples of structured and unstructured data may include Do Not Disturb (DND) hours (set unavailable times to mute notifications), contact exceptions (override hours for priority contacts), channel priorities—rank messaging, email, calls for importance, custom rules (If-then logic to route senders and keywords), AI delegation (desired level of automation versus user confirmation), activity settings (visibility of transcripts, recording, data), integration permissions (allowed 3rd parties and data access), short-term and long-term goals relating to communications decisions that may be found in the user preferences 524 present in memory 512 of communication management server 506. In addition to user preferences 524, data from interaction graph 520 including relationship scores with friends, family, and co-workers may also be considered. Besides using data from interaction graph 520 and user preferences 524, data from users' calendars, and currently active communications in progress along with their content type and duration may also be incorporated. In an embodiment, the actual data may be a mixture of JSON (JavaScript Object Notation) text for the more structured data and plain text for the unstructured data.

At step 906, master AI agent 518 determines if the current state of the user environment matches with an existing state. When the current state defined at step 904 matches an existing state in environment state model 522 then at step 908, the ASF (policy) is called to determine the action to be taken which is returned to the master AI agent 518 at step 916.

At step 906, when the current state determined in step 904 does not match with an existing state, then at step 910, the environment state model 522 is updated with the new state based on the created current state. State representation function may be involved in normalizing numerical values, numerically encoding categorical variables, converting text data into dense vector embeddings, using the embeddings of the GCN, clustering of dense vectors to define states S, and validating states with LLM. Environment state model 522 may be updated for the new state using starter data from history if available or using starter data from a Large Language Model (LLM). The updating of environment state model 522 with new states using clustering of dense vector embeddings ensures that state generation does suffer from drawbacks of high dimensionality. Further, in some embodiments, environment state model 522 may be updated to remove old states that are no longer being used.

At step 912 the new MDP may then be solved to find the new ASF.

At step 914 the new ASF is called using the new state to determine the action.

At step 916, the action returned to master AI agent 518 from steps 908 or step 914 is executed. In an embodiment, the action returned by the ASF 510 may be invoked by a function call on the master AI agent 518. For example, the action may be to send an instruction directly to the multimedia gateway 508 to block the incoming call, or the master AI agent 518 function call may require it to invoke one or more generative AI communication agents 516 to perform additional sub-tasks before sending an instruction to multimedia gateway 508.

At step 918, a reward may be generated for the execution of the action. In an embodiment, a reward function may return an immediate reward received after transitioning from one state to another due to an action. Rewards are a measure of fulfillment of user preferences. In an embodiment, rewards may be indicative of a related alignment score. Alignment score may be a quantitative measure of user reward captured vs maximum possible.

ASF 510 may be configured to select an action based on the state of the communications of the registered user in environment state model 522 and the actions with higher reward value may be preferred to optimize long-term rewards. Master AI agent 518 and ASF 510 may use environment state model 522 to simulate and evaluate not only the immediate reward from an individual action but also the accumulated reward of sequences of actions to maximize long-term rewards, noting that the solution of the MDP is the ASF which maximizes the expected reward.

In an embodiment, ASF 510 may be configured to choose actions that maximize the expected value of rewards to the user given the uncertainty of being able to connect and communicate with them, i.e. maximize the probability of connecting multiplied by the reward if connected. In other words, actions may be selected that optimally manage the tradeoff between the dynamic "reachability" of the user to contacts/parties and the reward to the registered user when contact is made. The "reachability" may be the probability of getting to a state of having communicated with a target contact either directly through a single hop or through a more complex path on the interaction graph.

EXEMPLARY EMBODIMENTS

When an incoming communication is identified as SPAM, master AI agent 518 may instruct multimedia gateway 508 to block the incoming communication. In an alternate embodiment, master AI agent 518 may instruct multimedia gateway 508 to have the SPAM caller connected to an AI communication agent 516 to answer a SPAM caller. In an embodiment, an AI communication agent 516 may talk to the caller and confirm that the incoming communication is SPAM and then instruct the multimedia gateway 508 to disconnect the call. In another embodiment, an AI communication agent 516 may take the role of "spam-the-spammer timewaster" in which role AI communication agent 516 will first talk with the caller to confirm the call is indeed spam and then deliberately waste the time of the spammer using a convincingly earnest human voice in a pointless, rambling conversation. Contact information of the incoming SPAM communication may be sent to legal authorities and stored in a long-term memory associated with communication management server 506.

When the incoming communication is from a close contact associated with a registered user's device, an AI communication agent 516 may provide a notification on the registered user's device. If the registered user accepts a voice call, processing of the incoming communication may be considered complete, and a reward may be provided. In some cases, the incoming communication may be redirected to another resource (e.g. another AI communication agent, such as an AI voicemail agent), or the incoming communication may be rescheduled to another time and only a partial reward may be generated.

In case the user decides not to answer a voice call, the call may get routed to a new AI communication agent which may use a friendly and apologetic persona that communicates that the registered user cannot take the call now and will communicate later. In an embodiment, if the calling device is also registered with communication management server 506, AI communication agents associated with both users can negotiate and coordinate an appropriate time to call based on their objectives and constraints and automatically make the connection when the two users are scheduled to be free.

In another example, a registered user of the system, Bob, is working at his company office in San Francisco, his wife is working at another office across town, and his son is in high school not far from Bob's office. Bob has pre-configured his communication management system to assume a persona called "Angel" when communicating with or about his family. The time is 2:35 pm and Bob is in the middle of an important Zoom video conference with a potential business prospect in Dallas. Bob forgot to charge his smartphone overnight and didn't notice the phone battery was low until partway through the video conference and his smartphone has now died completely and is no longer communicating on any network. Bob makes a mental note to get his charger from his car and charge his phone after his video conference is over. Meanwhile, an urgent security situation has arisen at Bob's son's high school. Bob's wife tried to call Bob 3 minutes ago, but her call went to voice mail because Bob's phone was dead. Bob's son tried to send Bob a text message from the school 2 minutes ago. One minute later in the middle of the video conference, Angel proactively and unexpectedly joins Bob's video conference with the business prospect and says, "Excuse me, and sincere apologies for interrupting this video conference, but there is an urgent situation I need to make Bob aware of." Bob talks to the business prospect who understands and leaves the video conference. Bob tells Angel that his phone is dead and it's okay to talk about the personal matter on the video conference now. Angel tells Bob about the situation at his son's high school, that Bob's wife just tried to call him worried that his son, and that his son had texted him and that she (Angel) in the last 2 minutes has already taken the following actions:

Angel talked to Bob's wife reassuring her that she is trying to locate Bob and that she is trying to join his video conference to let him know.

Angel replied to the text message from Bob's son (as Angel) saying that she is locating his father, and he loves him Angel emailed Bob's manager to say that Bob needs to leave work urgently and requested to reschedule their one-on-one meeting that is currently scheduled for 4 pm today on Bob's calendar Angel emailed Bob's dry-cleaning company (as Bob) saying he won't be able to pick it up before 5 pm when they close even though it is overdue (based on a reminder Bob had on his calendar)

Still on the video conference with Angel, Bob tells Angel to let his wife know that he's on his way to the school and will charge his phone from his car and asks Angel to put him on a call with his wife as soon as his phone charges enough to rejoin the network and to also try to get his son on a 3-way conference call with his wife while Bob is busy driving. This example highlights the network aspect of the system in the absence of a smartphone and the ability of the system to think and act as a human would in the interests of the human user and understanding a new situation.

FIG. 10 is a flow diagram of an example method for determining an action for processing an incoming communication using model-free and model-based modes, in accordance with an embodiment of the invention.

In model-based reinforcement learning, the decision-making process involves the construction of an internal model of the "world" of the user, also referred to as the "environment." Part of the environment state model 522 covers the communications aspect concerning the state of all communication devices including which devices the user is currently using, who they are communicating with, for how long, on what topic, the number and content of unread messages, and so on. However, a truly "holistic" and "human-centric" view of a user's world that drives their communication behavior needs to also include information not normally considered in telecommunications such as the state of relationships with other people, the current state of mind of the user, current ability to focus, state of tiredness and emotional aspects. Users have long-term goals and also dynamic short-term goals and transient interests, or changes in relationships and responsibilities in their personal and business lives and so on.

Further, modeling a person's world given all possible actions they could perform in that world is a nearly impossible task, however, for now, only the communications actions that can be performed by communication management server 506 are considered. These include simple control actions such as answering, terminating, recording, and redirecting communications, but also more human-like actions such as analyzing the content and tone of a message, inferring the intent, degree of urgency, and so on. Other communication actions include generating content (text, voice, or video) or responding to communications using appropriate emotions and degree of formality. But always doing so using a system and method that ensures that the goals and objectives of the AI in the system are aligned with the goals, objectives, and constraints of the user. Further, accurate modeling of the environment may be complex and computationally expensive.

On the other hand, true "model-free" reinforcement learning may not use an internal model of the user's world environment. Instead, it learns the value of actions directly through trial-and-error interactions with the environment. This approach estimates the rewards associated with different actions and uses these estimates to make decisions. The primary advantage of model-free learning is that it does not require a model of the environment, making it simpler and often more robust to errors in model specification. The downside is that it may require more interactions to learn an effective action selection function ASF 510, especially in complex environments. These model-free systems cannot generally plan, as they do not anticipate future states beyond learning from direct trial-and-error interactions. Their decision process is short-sighted, focusing on immediate outcomes.

Here by "model-free" it means that there is no explicit internal model of the user environment maintained as was done in FIG. 9 where a state representation function was used to represent the state based on both fully observable state and "latent" state from the GCN and state dynamics under uncertainty described by an MDP. Here in the "model-free" mode, the environment state is only represented "externally" within an LLM by prompting an LLM with the important features from the interaction graph, including fully observable current communication state, relationship states, communication history, and user objectives and preferences in a form of retrieval-augmented-generation relying on the limited reasoning, planning, and prioritization skills of the LLM. In an embodiment, the system may also perform true model-free learning by trial-and-error but generally this results in poor quality of actions early in the learning process which is not acceptable to users, so what is needed is a flexible way to leverage the limited modeling provided by the LLM early in the deployment process in parallel to the model-based approach and dynamically choose the best mode based on performance, history, and novelty of situations being encountered.

In FIG. 10 at step 1002, master AI agent 518 may receive signaling and routing information related to the incoming communication device via the multimedia gateway 508. The incoming communication may be directed towards a first-user device registered with the communication management server 506. The incoming communication may be a voice message, an audio call, a text message, an email, or a video communication.

At step 1004, master AI agent 518 updates the interaction graph.

At step 1006, master AI agent 518 may determine the current performance and cost of available model-free and model-based modes for action determination. In one embodiment, master AI agent 518 may perform decision-making using two different modes of reinforcement learning referred to as "model-based" and "model-free". Master AI agent 518 may switch between these two approaches based on the availability of adequate relevant historical data, the observed decision quality, user goal modifications, or changes in the user's environment. The terms "model-based" and "model-free" are as described above.

At step 1008, ASF 510 may determine if a model-based approach is being used for determining the action. To be more flexible and leverage the advantages of both model-based and model-free learning at different times or in different situations, master AI agent 518 may support both model-based and model-free approaches concurrently, and the system is equipped to automatically adapt to use the best approach.

The relative performance and costs of the model-free and model-based methods for computing the ASF 510 may be evaluated, and one of the following choices may be made; (i) to use only the best-performing mode (ii) to switch to a different mode or (iii) to return an ensembled suggestion (mixture of experts). The method selected may change based on user situation, user settings, available data, and devices of the users. Furthermore, the registered user may begin setting goals that require more complex planning in which case the model-based approach would be required.

At step 1010, when the model-based method is used by master AI agent 518, the model-based approach of FIG. 9 is performed to determine the action to be used and the action selected using environment state model 522 may be received for execution by master AI agent 518.

At step 1012, a Retrieval Augmented Generation (RAG) style system prompt and user prompt is generated for a generative AI LLM and populated with the important features from the interaction graph, including fully observable current communication state, relationship states, communication history, and user objectives and preferences in a form of retrieval-augmented-generation relying on the limited reasoning, planning, and prioritization skills of the LLM to generate a ranked list of suggested actions.

At step 1014, to determine action for incoming communication, a generative completion API may be invoked on a foundation model using the prompts generated in step 1012. In an embodiment, the foundation model may be a pre-trained public foundation model. In another embodiment, the foundation model may be a pre-trained custom foundation model. Generative AI may be a custom model that has been pre-trained to select communication actions to maximize a user reward. The training follows the typical approach of a Chat LLM starting with tasking human labelers to suggest action sequences based on samples presented of holistic states and user objectives, which may be then used to fine-tune a Generative Pretrained Transformer model which then creates candidate actions that are then ranked by human labelers which constitutes a reward model that may be used in a proximal policy optimization loop to train the generative AI for finally generating a ranked sequence of communication actions given user goals and a holistic state description. However, building such a generative model from scratch may be expensive and may lack a large amount of real-world human thinking about life, work, balancing priorities, and general communications. Therefore, a more cost-effective approach for the model may be to simply fine-tune a pre-trained public LLM. In another embodiment, the model-based approach described in FIG. 9 is used to fine-tune the model.

At step 1016, the foundation model may generate an action list ranked by reward and a highest-ranked action may be selected at step 1018. At step 1020, the action is executed.

FIG. 11 is a flow of an example method 1100 for generating relationship fingerprints, according to an embodiment of the invention. Relationship fingerprints may be generated from interaction graph 520 data and communication patterns and may be constantly updated with the processing of new incoming communications. Relationship fingerprints offer relationship characteristics and may be indicative of established communication behaviors.

At step 1102, pattern-based security manager 532 receives an incoming communication via multimedia gateway 508. The incoming communication may be directed towards a first-user device among the plurality of user devices 502. The incoming communication may be a voice message, an audio call, a text message, an email, or a video communication.

In an embodiment, relationship fingerprints may provide the unique characteristics of a communication relationship between two parties, and it may include temporal patterns (timing, frequency, duration), channel preferences patterns (voice, text, email), response behaviors (speed, consistency), engagement levels, and relationship context.

The fingerprint continuously evolves as the relationship develops, making it increasingly precise in distinguishing legitimate communications from unwanted ones. Each relationship generates its own unique fingerprint that adapts over time, enabling sophisticated pattern matching while preserving complete privacy since no message content is ever accessed or stored.

At step 1104, pattern-based security manager 532 updates interaction graph 520 with context associated with the incoming communication. Interaction graph 520 may maintain nodes representing parties and devices, edges representing relationships, and stores communication history and patterns. Interaction graph 520 provides relationship context. For example, new nodes may be added in case of receiving communication from new user devices, and edge weights may be updated based on interaction frequency from the identified communication patterns.

At step 1106, pattern-based security manager 532 may use pattern analysis engine 536 to analyze the metadata associated with the incoming communication data to identify patterns. Pattern analysis engine 536 extracts communication patterns present in communication metadata including timing, frequency of communication, channel preferences, and network-level characteristics without accessing communication content.

At step 1108, pattern-based security manager 532 generates or updates the relationship fingerprint based on the interaction graph 520 data and communication patterns. In case the incoming communication is from a new/unknown user, a new relationship fingerprint may be generated. In case the communication is from a known user and the communication pattern is new, existing relationship fingerprints may be updated with the new pattern. Details related to the update of the relationship fingerprint with the new pattern is described in FIG. 13.

Each relationship (between two parties) generates its unique fingerprint that adapts over time, enabling sophisticated pattern matching while preserving complete privacy since no message content is ever accessed or stored. Several advantages and features of relationship fingerprints are explained in conjunction with FIGS. 12 and 13.

FIG. 12 is a flow diagram of an example method 1200 for analyzing the incoming communication metadata to identify patterns.

At step 1202, pattern-based security manager 532 receives an incoming communication via multimedia gateway 508. The incoming communication may be directed towards a first-user device among the plurality of user devices 502. The incoming communication may be a voice message, an audio call, a text message, an email, or a video communication.

At step 1204, pattern-based security manager 532 updates interaction graph 520 with context associated with the incoming communication. For example, new nodes may be added in case of receiving communication from new user devices. Interaction graph 520 may maintain nodes representing parties and devices, edges representing relationships, and stores communication history and patterns. Interaction graph 520 provides relationship context.

In an embodiment, based on the identified communication patterns interaction graph 520 may be updated. Edge weights may update based on interaction frequency from the identified communication patterns.

At step 1206, pattern-based security manager 532 may use pattern analysis engine 536 to extract communication metadata associated with the incoming communication data to identify patterns. Pattern analysis engine 536 extracts communication patterns present in communication metadata including timing, frequency of communication, channel preferences, and network-level characteristics without accessing communication content.

Once the metadata is available, pattern analysis engine 536 may perform different types of analysis simultaneously with the available communication metadata.

In an embodiment, at step 1208, pattern analysis engine 536 may perform real-time communication pattern analysis to handle immediate pattern detection in incoming communications. At step 1214, pattern analysis engine 536 may extract communication patterns related to three main categories: temporal patterns, channel preference patterns, and behavioral patterns. Temporal patterns may be indicative of when and how often people communicate. Temporal patterns may include timing-based patterns like response times, communication frequency, and preferred contact hours. For example, temporal patterns may indicate that a user always responds to work emails within an hour during business hours but takes longer on weekends.

Channel preference patterns highlight preferred communication methods like calls vs. texts, or switching between channels. For example, a user may prefer using text for quick updates and calls for complex discussions. Similarly, channel-switching behaviors (starting with email and then moving to calls for urgent matters) may also be identified.

Behavioral patterns might indicate interaction styles (brief vs. detailed responses), engagement levels (active participation vs. passive responses), and relationship-specific communication habits (formal with clients, casual with teammates).

In an embodiment, at step 1210, pattern analysis engine 536 may perform historical relationship pattern analysis to determine relationship strength, context patterns, and interaction history. Relationship strength may be determined based on the depth and frequency of past interactions.

In an example, relationship strength may be measured through factors like communication consistency (regular weekly meetings vs. sporadic interactions), the longevity of the relationship (years of steady contact vs. recent connections), and interaction depth (detailed collaborative projects vs. surface-level exchanges).

The context patterns may be identified based on the different situations and topics in the incoming communication. In an example, context patterns may include recurring discussion topics (regular financial reviews with clients), situational triggers (emergency response patterns), and role-based interactions (manager-employee one-on-ones).

Interaction history may track how relationships evolve between the parties, such as a customer relationship progressing from initial inquiry to long-term account, including changes in communication frequency, formality levels, and trust indicators.

The real-time communication patterns identified at step 1214 and historical relationship context patterns identified at step 1216 may be used for the generation of a relationship fingerprint between the parties. This relationship fingerprint is constantly updated based on changing patterns, and context between the parties. Further, the relationship fingerprint is also updated with aggregated patterns generated across different services and In an embodiment, at step 1212, pattern analysis engine 536 may perform cross-pollination analysis, to identify common patterns across services and users/networks. Cross-pollination analysis identifies communication patterns that are found across different services, users, and networks.

At step 1220, pattern analysis engine 536 may identify common patterns that are emerging across different services, users, and networks. In an embodiment, pattern analysis engine 536 may perform cross-pollination pattern analysis by examining communication behaviors across different network types-cellular, VOIP, messaging platforms, etc. This multi-network view enables the detection of sophisticated patterns that might be invisible when looking at a single network. For example, a legitimate business relationship may show consistent patterns across email, voice, and messaging, while fraudulent communications often show inconsistent patterns across different channels.

Any aggregated pattern identified by cross-pollination analysis is normalized so they can be comparable and validated by pattern analysis engine 536. At step 1222, pattern analysis engine 536 may validate the identified aggregated patterns by checking the authenticity of pattern against known legitimate patterns, absence of conflicting patterns, cross-service pattern matches, and pattern consistency based on expected relationship behavior from relationship fingerprints.

Through cross-pollinated analysis, pattern analysis engine 536 continuously strengthens its pattern recognition capabilities. When similar patterns are observed across different services (email, voice, messaging), the communication management servers 506 understanding of those patterns becomes more refined and accurate. This learning occurs while maintaining strict privacy boundaries and no personal information or content is shared between services.

At step 1222, once the aggregated patterns are validated, then at step 1224 a pattern database 538 is updated. The aggregated patterns stored in pattern database 538 may be used by pattern analysis engine 536 while processing incoming communication. The aggregated patterns may be stored with pattern version, timestamp, source information, and pattern relationship.

Along with using patterns in relationship fingerprints, pattern analysis engine 536 may use aggregated patterns to process incoming communication. Further, in some embodiments, relationship fingerprints may be updated with aggregated patterns.

By analyzing patterns (aggregated patterns) across services and networks, communication management server 506 may be able to identify emerging threat patterns before they become widespread. When unusual patterns are detected in one area, this information is abstracted and shared across the network to enable proactive protection. This creates a self-strengthening security system that becomes more effective as attack patterns evolve, without requiring access to communication content. For example, the same spam pattern may be received by users across voice, SMS, and Email. When a spam pattern is added to communication patterns in relationship fingerprints, any incoming communication with this pattern can be identified, even if the incoming communication has a valid relationship context.

FIG. 13 is a flow diagram of an example method 1300 for securely validating incoming communications using pattern-based relationship fingerprints, according to an embodiment of the invention. The steps of method 1300 may be performed at communication management server 506 by pattern-based security manager 532.

At step 1302, pattern-based security manager 532 receives an incoming communication via multimedia gateway 508. The incoming communication may be directed towards a first-user device among the plurality of user devices 502. The incoming communication may be a voice message, an audio call, a text message, an email, or a video communication.

At step 1304, pattern-based decision manager 532 uses a pattern analysis engine 536 to identify current communication patterns. Current communication patterns may include, but is not limited to, time of communication, channels used, and frequency of the incoming communication.

At step 1306, pattern analysis engine 536 may determine if the relationship between the parties associated with the incoming communication is valid. In an embodiment, pattern-based security manager 532 may consider the relationship history, strength, and context between the user device transmitting the incoming communication and the first-user device (recipient of the incoming communication). The relationship validation may be performed based on the relationship context indicated in interaction graph 520, and relationship fingerprints data.

When pattern analysis engine 536 determines that the relationship between the devices is not valid, then at step 1308, pattern-based security manager 532 may block or redirect the incoming communication by sending an instruction directly to the multimedia gateway 508. In some cases, pattern-based security manager 532 may invoke one or more generative AI communication agents 516 to perform additional sub-tasks before sending an instruction to multimedia gateway 508.

At step 1306, for valid relationships, pattern analysis engine 536, at step 1308, may further check if the current communication patterns identified by pattern analysis engine 536 at step 1304 maps to patterns stored in relationship fingerprints database 534. Patterns in relationship fingerprints database 534 may include, but are not limited to, temporal patterns, channel preference patterns, and behavioral patterns and represent established communication behavior between the two parties.

Relationship fingerprints include both pattern characteristics and strength indicators (described in FIG. 12) that measure the consistency and reliability of observed patterns. As relationship fingerprints are generated through multi-dimensional analysis that considers historical consistency, cross-channel correlation, and relationship context, patterns require more significant deviations to trigger alerts. This ensures that a comparison of current communication patterns with relationship fingerprints is sufficient for security validation of the incoming communication.

In an example, the parties involved in the communication may be user devices associated with a manager and an employee. Relationship fingerprints may include communication patterns: communications primarily during business hours (9 AM-5 PM), primary channel preference may be Email (80% of communications), secondary channel preference may be video calls for scheduled meetings, regular weekly meeting pattern, and formal communication style. The current communication patterns extracted from metadata of incoming communication may include multiple rapid voice calls late at night.

In an embodiment, in addition to mapping the current communication patterns to patterns stored in relationship fingerprints database 534, the current communication patterns may be mapped to aggregated patterns stored in pattern database 538.

At step 1308, when there is no mapping between the current communication patterns and patterns in relationship fingerprints 534, then at step 1310, pattern analysis engine 536 may determine whether there is valid context for a new pattern. As the relationship between the parties is validated at step 1310 and there is no matching communication pattern in relationship fingerprint database 534, pattern analysis engine 536 may use additional contextual information to determine if the current communication pattern is a new communication pattern between the parties. Additional contextual information may include, but is not limited to, current communication context, historical patterns, and cross-service pattern match.

At step 1310, when there is no valid context for the new pattern, then pattern analysis engine 536 may invoke one or more generative AI communication agents 516 to perform additional sub-tasks before sending an instruction to multimedia gateway 508.

At step 1310, when there is a valid context for the new pattern, then at step 1316, pattern-based security manager 532 may create a new pattern at step 1312, and the new pattern is updated in relationship fingerprint database 534 at step 1314. In some cases, instead of updating with new pattern, existing patterns may be modified based on the incoming communication.

Relationship fingerprint database 534 database architecture supports real-time pattern matching while continuously incorporating new pattern observations, leading to an evolved knowledge base of communication behaviors.

Continuing with the previous example of manager and an employee, there may be changes in the communication pattern when the manager and/or employee works from home, or works from a new location (different time zone), work on a new global project, or have just changed their work schedules. In such a case, a new pattern is created and the existing pattern in relationship fingerprint may be updated.

In an embodiment, pattern-based security manager 532 performs initial security validation before master AI agent 518 determines communication actions.

At step 1316, master AI Agent 518 uses the validation results of communication patterns along with interaction graph 520 to determine an action to performed to process the incoming communication. Master AI Agent 518 may use the security validation results along with current communication patterns to make appropriate decisions.

Different actions to process the incoming communication may include, but are not limited to, allowing direct communication between parties, redirecting to AI communication agents 516, scheduling for later, and blocking the communication.

At step 1318, a reward is generated based on the alignment of the action with established patterns, relationship dynamics, user preferences 524, and communication goals.

As the secure validation of the incoming communication described methods 1100, 1200, and 1300 work on relationship-based communication patterns making spoofing difficult as attackers may not be able to replicate evolving affinity patterns.

The use of cross-pollination analysis, identification of anomalous patterns, and sharing of the aggregated patterns across services provide proactive protection. Further, the security validation is primarily based on communication metadata analysis and does not require access to communication content.

FIG. 14 is a flow diagram of an example method 1400 for managing seamless transitions between synchronous and asynchronous communication modes across multiple transducer interfaces, according to an embodiment of the invention. The steps of method 1400 may be performed at communication management server 506 by communication mode orchestrator 544.

The method begins at step 1402 when the communication management server 506 receives an incoming communication directed toward a professional user's device (towards a first-user device among the plurality of user devices 502) via multimedia gateway 508. The incoming communication may be a voice message, an audio call, a text message, an email, or a video communication.

At step 1404, pattern analysis engine 536 may analyze the incoming communication data to identify current communication patterns, including temporal patterns, channel preferences, and behavioral patterns without accessing message content. This pattern analysis provides essential context for determining how to handle the communication.

At step 1406, pattern-based security manager 532 may validate the relationship context between the user device associated with the incoming communication and the professional's device. In an embodiment, pattern-based security manager 532 may consider the relationship history, strength, and context between the user device transmitting the incoming communication and the first-user device (professional/ recipient of the incoming communication). The relationship validation may be performed based on the relationship context indicated in interaction graph 520, and relationship fingerprints data stored in the relationship fingerprints database 534. The relationship validation determines whether the communication is from a legitimate contact or potentially unwanted communication.

At step 1406, if the relationship is determined to be invalid, then at step 1408 multimedia gateway 508 blocks or redirects the incoming communication, preventing it from reaching the professional user.

At step 1406, if the relationship is determined to be valid, communication mode orchestrator 544 proceeds to step 1408 where communication mode orchestrator 544 determines whether the professional user is currently busy or unavailable for direct synchronous communication. This determination takes into account the professional's current activities, calendar information, device status, and environmental context.

At step 1408, if it is determined that the professional is not busy and available for direct communication, method 1400 proceeds to step 1409 where the incoming communication is forwarded directly to the professional user through their preferred transducer interface.

At step 1408, if it is determined that the professional is busy and not available for direct communication, method 1400 proceeds to step 1410 where an AI communication agent 516 engages with the caller of the incoming communication to gather preliminary information about the caller, the purpose of communication, the urgency and nature of the call. AI communication agent 516 establishes a synchronous communication channel with the caller, maintaining a professional relationship continuity while representing the professional user's interests.

At step 1412, communication mode orchestrator 544 may begin monitoring for mode switch triggers during the active communication between AI communication agent 516 and the caller. These triggers could include changes in the incoming communication urgency, professional's environment, device status, meeting context, content requirements, or interface availability. Details related to the different types of triggers that can initiate a mode switch during communication is descried in detail in FIG. 15A.

At step 1414, communication mode orchestrator 544 checks if a mode switch trigger has been detected. If no trigger is detected at step 1414, then at step 1416, transducer interface coordinator 546 continues monitoring for triggers and maintains the current active communication mode between the AI communication agent 516 and the caller.

At step 1414, if a mode switch trigger is detected, then at step 1418, communication mode orchestrator 544 may generate an additional communication channel between a communication AI agent 516 processing the incoming communication and the professional. Transducer interface coordinator 546 may selects an optimal interface for this additional communication channel based on the professional's current context, available devices, and environmental conditions as illustrated in FIG. 15B. When the professional is partially available, AI communication agent 516 may relay information between the caller and AI communication agent 516 professional through the additional communication channel.

When a new communication channel is created, conversation state manager 542 may establish a new conversation state, it may add this new state to the existing conversation while maintaining appropriate boundaries. Conversation state manager 542 ensures that the new conversation in the new communication channel is updated with relevant context from the incoming communication.

At step 1420, communication mode orchestrator 544 maintains multiple parallel conversations across different transducer interfaces. This involves coordinating information flow between the parallel conversation states while maintaining distinct context boundaries. Conversation state manager 542 may maintain separate state objects for each parallel conversation and track what information has been shared in each conversation. This prevents confusion between different conversation contexts.

Steps 1422 and 1424 indicates two parallel conversations related to the incoming communication. One is a synchronous communication between AI communication agent 516 and the caller associated with the incoming communication. The other is an asynchronous communication between AI communication agent 516 and the professional via an optimal transducer interface.

Step 1422 indicates an AI-mediated synchronous communication with the calling party through a first transducer interface maintained by communication mode orchestrator 544. AI communication agent 516 may actively engage with caller, gather information, respond to queries, and maintain relationship continuity while representing the professional's interests.

Steps 1424 indicates an asynchronous professional engagement through a second transducer interface with selective information exchange between AI communication agent 516 and professional. Professional may receive filtered essential information and provides decisions/instructions which AI communication agent 516 can translate appropriately for the synchronous conversation.

During operation to maintain multiple, parallel conversations, conversation state manager 542 may maintain a conversational memory to tracks the historical record, and maintain contextual information. Examples of contextual information may include what has been said, what is pending, and what has been shared. Conversation state manager 542 provides context (necessary background) to the AI communication agents 516 to generate appropriate responses for the calling party. Further, conversation state manager 542 may implement rules about what information can flow between different conversations.

1422 and 1424 show the conversation state manager 542 simultaneously managing multiple communication channels for processing the incoming communication while maintaining distinct context boundaries. This flow diagram illustrates the system's ability to seamlessly transition between different communication modes while maintaining context and managing multiple parallel conversations, a critical capability for high-value professionals who must balance immediate availability with focused work time.

Consider an example, of a high-value professional who is in a confidential client meeting when they receive an incoming call from their office about an urgent matter. Communication mode orchestrator 544 may determine that the communication should be handled asynchronously despite arriving as a synchronous voice call. As the meeting continues, communication mode orchestrator 544 monitors for triggers that might allow for a synchronous response. When the professional briefly steps away from the meeting, communication mode orchestrator 544 mode orchestrator may initiate an asynchronous text-based channel between the AI communication agent 516 and professional via a second transducer interface with information regarding the urgent call. The professional could then provide brief instructions through the text channel which AI communication agent 516 translates into appropriate verbal responses to the client, all while maintaining distinct conversation contexts and professional boundaries.

Throughout this process, communication mode orchestrator 544 focuses specifically on the timing and transformation aspects of the communication, while the transducer interface coordinator 540 selects the appropriate physical devices, and the conversation state manager 542 maintains the distinct conversational contexts.

FIG. 14 simplifies the complex capability of communication mode orchestrator 544 into steps 1422 and 1424 for visual clarity, but the actual implementation may support more sophisticated scenarios. In some cases, complex parallel communication may be enabled by communication mode orchestrator 544. For example, communication mode orchestrator 544 may manage several communications simultaneously includes an ongoing video conference with clients about investment strategies (synchronous visual/audio), a time-sensitive text exchange with a colleague about market developments affecting the client (asynchronous text), a monitoring feed of market data relevant to the discussion (asynchronous data), and an incoming call from the compliance department that's been converted to voice-to-text notifications (hybrid mode).

Conversation state manager 542 would maintain distinct states for all these parallel communications, while ensuring appropriate information flows between them when necessary. The transducer interface coordinator would manage the physical interfaces (screen for video, phone for texts, tablet for market data), and the communication mode orchestrator would handle the different timing dynamics of each communication stream.

In summary, while FIG. 14 visually depicts a simplified model with two parallel paths at steps 1422 and 1424, step 1420 ("maintain multiple parallel conversations") encompasses the system's capability to handle numerous concurrent communications of various modes across multiple interfaces, all while maintaining appropriate context boundaries between them.

FIG. 15A illustrates a comprehensive categorization of triggers that can initiate a switch between communication modes or transducer interfaces, according to an embodiment of the invention. The use of this type of trigger detection mode enables transducer interface coordinator 546 to detect when transitions between synchronous and asynchronous communications are appropriate.

In an embodiment, transducer interface coordinator 546 monitors different types of triggers including, but not limited to, content triggers 1504, environmental triggers 1506, meeting context triggers 1508, interface triggers 1510, and device triggers 1512.

In an embodiment, content triggers 1504 may monitor the content/context of the incoming communication. For example, if the topic in the incoming communication is complex and the discussion becomes too detailed for the current communication mode. In some cases when a visual reference is needed, the communication mode may need to switch allow sharing of visual information. Further, when the priority of the incoming communication is urgent, it may act as trigger for a communication mode switch.

In an embodiment. environmental triggers 1506 may be configured monitor changes in the professional's physical surroundings. For example, in case when the professional moves between environments (office, car, public space) a location change is detected, which may trigger a change in the transducer interface. Further in some cases, transducer interface change may be automatically initiate when there is a change in the noise level and the ambient noise makes the current interface less effective. When the professional moves between private and public settings, a privacy status setting change may be detected and may act as a trigger for a change in the communication mode.

In an embodiment. meeting context triggers 1508 may be configured to track the professional's meeting status and detect trigger for mode switch. For example, the start and end of meetings, whether the professional is presenting content (presentation mode), the role of professional in a meeting (leading or participating), the professional user activity (engagement level in a meeting).

In an embodiment, interface triggers 1510 may relate to the status of communication devices. The interfaces available for a professional may be managed and monitored by transducer interface coordinator 546. Any change in the status of the communication devices may result in a trigger for change is communication mode. For example, when a device becomes active or inactive an interface status change is detected, when a device is picked up, put down, or repositioned a device position change is detected. Further new interfaces that are available may also act a trigger.

In an embodiment, device triggers 1512 may monitor the technical status of the professional's devices. For example, a device transition may be detected when the professional switches between devices, or a change in battery level may be device trigger to switch to an alternate interface. Changes in network conditions may act a trigger for a change in the communication mode. Further, when the professional has activated focused mode, the trigger detection may be deactivated or transducer interface coordinator 546 may restrict communication via specific interfaces.

This comprehensive trigger detection by transducer interface coordinator 546 allows communication management server 506 to proactively identify appropriate moments for mode switching, enabling seamless transitions between communication modes and interfaces based on the professional's changing circumstances.

FIG. 15B illustrates a process by which transducer interface coordinator 546 selects the optimal transducer interface for processing an incoming communication, according to an embodiment of the invention.

In an example, transducer interface coordinator 546 monitors available interfaces 1515, which may include multiple options including, but not limited to, professional's smartphone in silent mode 1517, a tablet device, a smartwatch 1521 for discreet notifications, and an earpiece 1523 for private voice communication.

At step 1525, transducer interface coordinator 546 continuously monitors these available interfaces, tracking their status, location, activity, capabilities, and appropriateness for the current context. The monitoring process considers factors such as device connectivity, battery status, proximity to the professional, environmental conditions, and the professional's current activity. In an embodiment, the optimal transducer interface is selected for processing an incoming communication based on the professional's context and available devices.

This sophisticated interface selection process ensures that professionals receive communications through the most contextually appropriate channel, maintaining their productivity, professional presence, and relationship management capabilities across complex and dynamic work environments.

FIG. 16 illustrates the architecture of the transducer interface coordinator 546 that manages transitions across diverse input modalities, according to an embodiment of the invention.

In an embodiment, transducer interface coordinator 546 may be configured to enable seamless communication experiences across different devices and input methods. Transducer interface coordinator 546 may be configured to support and manage multiple categories of interfaces.

In an embodiment, wearable interfaces 1604 may include body-worn devices that provide discreet notification and communication capabilities. A smart watch 1606 may allow for quick notifications and brief responses and smart glasses 1608 may provide heads-up display of information.

In an embodiment, biometric interfaces 1612 use physical characteristics for authentication and interaction. A fingerprint scanner 1614 helps with secure authentication and a facial recognition 1616 enables hands-free authorization.

In an embodiment, voice interfaces 1622 enable hands-free audio interaction using voice commands 1618 and touch tone input 1620 includes numeric input systems.

In an embodiment, touch interfaces 1624 include manual interaction methods including, but not limited to, touchscreen 1626 and keyboard input 1628.

In an embodiment, vehicle interfaces 1630 provide safe interaction while driving and may include a car audio system 1632 for in-vehicle audio communication and hands-free button input 1634 from steering controls).

In an embodiment, environmental interfaces 1636 may detect context through sensor data. Motion sensors 1638 may be used for gesture recognition and presence detection. Ambient sensors 1630 may provide environmental context awareness.

Transducer interface coordinator 546 maintains comprehensive knowledge of each interface's capabilities, current status, and appropriateness for different communication contexts. Transducer interface coordinator 546 may processes input from all available interfaces, normalizes the data into a consistent format, and routes information to the appropriate components of the communication management system.

When transitioning between interfaces, conversation state manager 542 ensures context preservation by maintaining a unified state representation that captures the essential elements of each interaction regardless of the input method. This capability is critical for professionals who must manage communications across multiple devices and environments while maintaining continuity.

In an embodiment, transducer interface coordinator 546 may implement specialized security protocols for each interface type, addressing the unique challenges associated with different input methods while maintaining a consistent security framework across the entire system.

FIG. 17 illustrates implementation of boundaries in parallel conversations related to the incoming communication. A professional boundary maintenance 1710 strictly defines information flow paths between participants that enforce these boundaries. FIG. 17 shows the three primary entities and a boundary layer 1706 that govern their interactions. External party 1704 may represent clients, customers, patients, or other parties attempting to communicate with the professional. Professional user 1702 may represent the high-value professional (attorney, physician, financial advisor, etc.) who maintains control over decisions. AI orchestration framework 545

In an embodiment, boundary layer 1706 may be configured to enforce information control policies that prevent unauthorized content sharing, maintain strict privacy boundaries, ensure professional control over substantive communication, implement role-appropriate information access controls, and enforce domain-specific ethical and legal requirements.

When external party 1704 initiates communication, AI orchestration framework 545 processes the incoming communication through its boundary layer, which applies the strict rules to determine how to handle the information.

For information requiring professional judgment or decision, the system presents options to professional user 1702 without making substantive judgments. The system then facilitates the communication back to external party 1704 according to the professional's user's 1702 direction, without modifying content or adding its own interpretations. Professional user 1702 maintains complete control over all substantive aspects of the communication, making decisions about information sharing and content.

This structured approach enables efficient communication management while maintaining strict professional boundaries that ensuring that AI communication agent 516 functions purely as a facilitator rather than a decision-maker on matters requiring professional expertise. This boundary maintenance is essential in high-value professional settings where ethical, legal, and practical constraints govern information sharing and professional advice.

FIG. 18 is a flow diagram of an example method 1800 for or affinity-based user acquisition and network expansion, according to an embodiment of the invention.

At step 1802, communication management server 506 may analyze communication metadata using pattern analysis engine 536 for affinity indicators. The system identifies potential user acquisitions through interest pattern analysis and existing relationship networks, focusing on compatibility indicators and shared value alignment.

Pattern analysis engine 536 processes communication metadata including timestamps, duration, frequency, and channel preferences without accessing message content. This privacy-preserving approach ensures GDPR (General Data Protection Regulation) compliance while extracting relationship insights. The system analyzes temporal patterns, behavioral characteristics, and communication frequencies to build comprehensive user profiles and identify affinity indicators. The generation and classification of communication patterns have been described in FIG. 12.

At step 1804, pattern analysis engine 536 may identify behavioral patterns and temporal patterns. In some cases, time-series analysis and statistical correlation may be used to determine optimal engagement windows and relationship strength indicators. In an embodiment, pattern analysis engine 536 may coordinate with affinity analysis agent (shown as 1902 in FIG. 19) to identify communication habits, response times, preferred contact hours, and interaction styles. Affinity analysis agent may utilize collaborative filtering algorithms to analyze communication habits, matrix factorization techniques to identify behavioral similarities, and similarity calculations (Euclidean, Hamming, Jaccard) to determine common interaction patterns and shared interests.

At step 1806, pattern analysis engine 536 may coordinate with relationship mapping agent (an AI communication agent shown as 1904 in FIG. 19) to generate affinity compatibility scores between an existing user and non-users. The affinity compatibility scores may be computed using graph neural networks that identify communication frequency, interaction duration, temporal consistency, and bidirectional engagement metrics. In an embodiment, relationship mapping agent may use graph embeddings (Node2Vec) to create vector representations, community detection algorithms to identify subscriber clusters, and perform and centrality analysis (betweenness, PageRank) to calculates influence score.

Vector representations may be generated each subscriber within the network topology, and each vector captures both the subscriber's direct relationships (structural proximity) and their affinity patterns (semantic similarity). These vector representations enable mathematical operations such as similarity calculations, clustering analysis, and relationship strength quantification that would be impossible with raw network data.

Centrality analysis calculates influence scores using multiple metrics. Betweenness centrality identifies subscribers who serve as bridges between different network communities and can facilitate affinity-based user acquisition propagation across diverse subscriber groups; PageRank scores measure each subscriber's overall network influence based on both the quantity and quality of their connections, similar to how web pages are ranked by search engines. These influence scores enable identification of key propagation nodes who can maximize reach and conversion rates.

At step 1808, pattern analysis engine 536 may coordinate with relationship mapping agent (an AI communication agent shown as 1904 in FIG. 19) to performs an affinity compatibility score threshold check. The system evaluates whether calculated relationship scores exceed predetermined thresholds for high-probability compatible candidates. The system continuously adapts the computation of the affinity compatibility score threshold based on emerging interests and changing dynamics, ensuring the community facilitates user acquisition.

In an embodiment, relationship mapping agent 1904 performs dynamic threshold optimization for maximum conversion. Techniques used to determine the predetermined threshold may include A/B testing frameworks. A/B testing is a controlled experimental method where two or more versions of a system, interface, or strategy are tested simultaneously with different user groups to determine which performs better. In affinity-based user acquisition systems, A/B testing compares different strategies, messaging approaches, timing methods, or interface designs to optimize conversion rates and affinity-based user acquisition coefficients through statistical analysis of user responses. The performance analysis refines the scoring criteria, and the strategy refinement adjusts queue priorities.

When the affinity compatibility score is below the predetermined threshold, then at step 1810, the users are placed in a low-priority queue for future re-evaluation as relationships evolve. When the affinity compatibility score is above the predetermined threshold, then at step 1812, the system identifies a compatible individual (referral candidates) from non-users.

In an embodiment, compatible candidates may be identified using affinity analysis agent 1902 and relationship mapping agent 1904. Affinity analysis agent 1902 performs collaborative filtering to rank candidates by similarity. Relationship mapping agent 1904 analyze graph networks to identify affinity-based user acquisition propagation potential. Ensemble scoring combines affinity scores with network positioning and generates a ranked list of high-probability referral targets.

At step 1814, personalized referral offers may be generated for the non-users. Natural language processing pipelines using transformer architectures create customized content incorporating relationship-specific information, preferred communication styles, and optimal service recommendations. In an embodiment, pattern analysis engine 536 may coordinate with outreach and engagement agent (an AI communication agent shown as 1906 in FIG. 19) to generate a contextually appropriate personalized referral offer. In an example. NLP content generation may create personalized messages and a transformer may adapt content to relationship context. Customized referral offers may be generated highlighting specific shared interests and potential connections within the community, emphasizing mutual benefit and growth opportunities.

At step 1816, personalized referral offer may be sent to the compatible candidates through an optimal channel. Optimal delivery channels may include SMS, email, or a voice message. Outreach and engagement agent 1906 may select delivery channels (SMS, email, voice), based on user preferences and engagement history. Further, timing may be determined using reinforcement learning. The personalized referral offer is transmitted at optimal time for maximum engagement probability. Further, as users experience tangible benefits, they are naturally prompted to identify and invite others within their network who share similar interests and would benefit from joining.

At step 1818, communication management server 506 may determine whether the personalized referral offer was accepted. The system monitors referral acceptance responses through event-driven architecture with automated conversion tracking. In an embodiment, pattern analysis engine 536 may coordinate with conversion optimization agent (an AI communication agent shown as 1908 in FIG. 19) to perform real-time tracking of responses using the event-driven architecture. A/B testing may be used to analyze acceptance patterns and identify successful strategies. Immediate conversion detection and strategy feedback is implemented by conversion optimization agent 1908.

When the personalized referral offer is not accepted, then at step 1820, the system may adjust the relationship scoring mechanism. To refine the relationship scoring mechanism, the set of AI communication agents shown in FIG. 19 may collaborate to improve the targeting in the future attempts. Affinity analysis agent 1902 may update similarity calculations based on rejection, relationship mapping agent 1904 may adjust relationship strength scoring, and conversion optimization agent 1904 may refines strategy based on failure analysis.

At step 1822 the candidate is returned to the pattern analysis pool for accepted for future attempts with different approaches. Conversion optimization agent 1904 may identify a timing for re-engagement and A/B testing may explore different messaging/channel combinations.

When the personalized referral offer is accepted, then at step 1824, communication management server 506 may initiate personalized onboarding experience. Upon acceptance, the self-provisioning system executes identity verification, service configuration, and account activation without manual intervention. In an embodiment, pattern analysis engine 536 may coordinate with billing integration agent (an AI communication agent shown as 1910 in FIG. 19) to enable a seamless transition from referral offer to active customer by processing payment through secure gateways, creating accounts via billing platform APIs, and coordinating service activation. FIG. 21 described the details of the self-provisioning mechanism.

As members experience meaningful connections, they naturally introduce others with complementary interests, creating organic growth in the affinity-based user acquisition service. At step 1826, the new customer is added to a pattern analysis pool. New customers join the existing subscriber base for future relationship analysis, creating affinity-based user acquisition cycles where referrals become new referral sources. Affinity analysis agent 1902 may incorporate new user into similarity matrices, relationship mapping agent 1904 may add new node to network graph, outreach and engagement agent 1906 may update communication preference models, conversion optimization agent 1908 may include new data in optimization algorithms, and billing integration agent 1910 may establish ongoing service management.

The affinity-based network expansion approach outlined in method 1800 significantly enhances community growth through authentic connection pathways. As each community member introduces like-minded individuals, the network expands organically through shared interests and values. Each successful referral becomes a new referral source, and compound growth effects can be accomplished. Further, this type of affinity-based user acquisition service maintains privacy-preserving intelligence by analyzing communication patterns without accessing message content, ensuring GDPR compliance while extracting sophisticated relationship insights that enable intelligent targeting without compromising subscriber trust or personal privacy.

The seamless community integration process—from initial discovery through membership activation—eliminates barriers to participation, reducing time-to-engagement from days or weeks to minutes through streamlined onboarding experiences that scale naturally without additional administrative burden or operational complexity.

In an embodiment, the framework utilizes k-anonymity and l-diversity techniques for subscriber identity protection, implementing generalization hierarchies and suppression strategies optimized using genetic algorithms to maximize data utility while satisfying privacy constraints.

For collaborative analysis across service providers, the system implements secure multi-party computation using homomorphic encryption schemes that enable calculations on encrypted data without decryption. The processing pipeline implements strict data minimization principles, extracting only essential metadata attributes while maintaining cryptographic hashing of identifiers and implementing purpose limitation controls through attribute-based access policies.

The system continuously refines acquisition pathways based on engagement patterns, optimizing for users who both receive significant value and contribute to community growth. Method 1800 highlights personalized benefits through intelligent recommendation algorithms that highlight the most relevant user acquisition opportunities and connections for each new user.

FIG. 19 illustrates the different types of AI communication AI agents used in the affinity-based user acquisition service 1912, according to an embodiment of the invention. The role of each agent in the affinity-based user acquisition service has been described in FIG. 18. The AI communication agents coordinate through a sophisticated message-passing framework that ensures relevant findings are shared.

In an embodiment, affinity analysis agent 1902 may implement collaborative filtering algorithms using matrix factorization techniques including Alternating Least Squares (ALS) and Stochastic Gradient Descent (SGD) optimization.

Affinity analysis agent 1202 leverages collaborative filtering algorithms to identify meaningful affinity patterns between potential users and existing community members. Analyzes communication habits, interaction patterns, and shared interests to determine compatibility scores that predict successful community integration without accessing message content. Affinity analysis agent 1202 shares similarity scores and compatibility matrices with relationship mapping agent 1204 for enhanced network positioning.

In an embodiment, relationship mapping agent 1904 implements graph embedding algorithms including Node2Vec for generating vector representations of subscribers within the network topology. Relationship mapping agent 1204 creates dynamic network visualizations using graph embedding algorithms to identify optimal community expansion pathways. Maps relationship strength indicators including interaction frequency, engagement depth, and connection quality to identify prospects with the highest likelihood of meaningful community contribution. Relationship mapping agent 1204 provides affinity-based user acquisition pathway calculations to outreach agent for optimal referral chain targeting.

In an embodiment, outreach and engagement agent 1906 may implements natural language processing (NLP) pipelines for personalized content generation.

Outreach and engagement agent 1906 may employs natural language processing to craft customized outreach that resonates with each prospect's unique interests and needs. Outreach and engagement agent 1906 generates contextually relevant referral offers highlighting specific community benefits and connection opportunities that align with the individual's demonstrated interests and affinity patterns. Outreach and engagement agent 1906 may share engagement success patterns with conversion optimization agent 1908 for strategy refinement. AI agents may facilitate seamless onboarding experiences that immediately connect new members with relevant subcommunities, resources, and potential collaborators. The monitoring identifies early engagement patterns to provide personalized guidance, suggest valuable connections, and highlight community opportunities aligned with the member's specific interests.

In an embodiment, conversion optimization agent 1908 may distribute performance insights to all agents for algorithm tuning. Conversion optimization agent 1908 may continuously analyze interaction data to identify optimal timing, channel preferences, and messaging approaches for each prospect. Conversion optimization agent 1908 implements A/B testing frameworks to refine community referral offer strategies based on response patterns and engagement metrics, ensuring maximum relevance and value demonstration. Further, conversion optimization agent 1908 coordinates community resources, tracks engagement metrics, and ensures each new member receives appropriate recognition for their contributions.

The AI communication agents of FIG. 19 publish findings to shared message queues enabling other agents to incorporate insights without blocking processing. Event-driven communication triggers agent coordination when specific thresholds or conditions are met. Priority-based message routing ensures critical insights (high-value referral opportunities) receive immediate attention.

In an embodiment, billing integration agent 1910 may implement automated account creation through SOAP web services.

FIG. 20 illustrates a distributed coordination architecture between AI communication agents 516 to operate as a unified affinity-based user acquisition service, according to an embodiment of the invention. The AI communication agents may operate as a unified affinity-based user acquisition service while maintaining independent computational contexts and fault isolation.

In an embodiment, the distributed AI agent coordination framework comprises multiple specialized coordination layers that work in concert to enable seamless affinity-based user acquisition processing. The framework addresses the complex challenges of coordinating multiple AI agents performing interdependent tasks while maintaining system reliability, consistency, and performance at scale.

Each AI communication agent functions as an independent actor within the distributed system, maintaining complete isolation of computational context and state information. Affinity analysis agent 1902, relationship mapping agent 1904, outreach and engagement agent 1906, conversion optimization agent 1908, and billing integration agent 1910 (not shown in FIG. 20) each operate within dedicated actor instances that communicate exclusively through asynchronous message passing.

The actor model implementation provides several advantages for the affinity-based user acquisition system. First, it ensures relationship continuity where failure in one agent cannot directly impact the operation of other agents, maintaining system resilience during high-volume processing periods. Second, it enables independent scaling of individual agents based on their specific computational requirements and workload patterns. Third, it facilitates concurrent processing of multiple affinity-based user acquisition workflows without resource contention or state corruption.

Each actor maintains a dedicated mailbox queue that serves as the exclusive interface for receiving messages from other system components. The mailbox implementation utilizes lock-free data structures optimized for high-throughput message processing with minimal latency overhead. Messages are processed sequentially within each actor to maintain consistency while enabling parallel processing across the agent ecosystem.

The coordination framework implements a comprehensive event sourcing architecture that maintains an immutable log 2002 of all interactions and state changes within the affinity-based user acquisition system. Every action performed by any AI communication agent may generate corresponding domain events that are persisted in the event store, creating a complete audit trail of all affinity-based user acquisition activities.

Event sourcing provides several key benefits for the affinity-based user acquisition system. It enables precise reconstruction of system state at any point in time, facilitating debugging and analysis of affinity-based coefficient optimization processes. It supports event replay capabilities for testing new affinity-based user acquisition strategies against historical data. It enables temporal queries for analyzing relationship evolution and affinity-based propagation patterns over time.

The event store utilizes append-only semantics with cryptographic hashing to ensure event immutability and detect any unauthorized modifications. Events are partitioned by user aggregates and temporal windows to optimize query performance and enable efficient event replay operations. The system implements event snapshots at configurable intervals to accelerate state reconstruction for long-running affinity-based user acquisition processes.

The framework implements Command Query Responsibility Segregation (CQRS) pattern to optimize the affinity-based user acquisition system for both command execution and query operations. Command side 2004 handles all state-changing operations including relationship analysis, referral generation, and user provisioning, while the query side maintains optimized read models for affinity-based coefficient monitoring, pattern analysis, and performance reporting. Command operations utilize strongly consistent write models that ensure data integrity during critical affinity-based user acquisition workflows. The command handlers implement business logic validation and coordinate with multiple AI agents to execute complex affinity-based user acquisition scenarios. Commands are processed asynchronously to maintain system responsiveness during high-volume periods.

Query side 2004 includes consistent read models optimized for specific affinity-based user acquisition analytics requirements. The read models include denormalized views for affinity-based coefficient calculation, relationship strength analysis, and conversion funnel optimization. Read model updates are driven by domain events from the command side, ensuring eventual consistency while maintaining query performance.

The coordination framework implements a multi-agent transaction coordinator 2008 to manage long-running affinity-based user acquisition workflows that span multiple AI communication agents. Each affinity-based user acquisition process is modeled as a saga comprising multiple compensable transactions that can be rolled back in case of partial failures.

Multi-agent transaction coordinator 2008 manages the execution of affinity-based user acquisition workflows by sending commands to appropriate AI agents and monitoring their responses. When an affinity-based user acquisition process involves multiple steps such as relationship analysis, referral generation, user outreach, and service provisioning, the saga ensures that either all steps complete successfully or appropriate compensation actions are taken to maintain system consistency. Compensation logic is implemented for each saga step to handle various failure scenarios. For example, if user provisioning fails after a referral offer has been sent, the compensation logic notifies the conversion optimization agent 1908 to update success metrics and schedules retry attempts with modified parameters. This approach ensures that affinity-based user acquisition processes maintain consistency even in the presence of network failures, service unavailability, or external system errors.

The framework implements sophisticated message routing capabilities that enable dynamic message distribution based on content, priority, and current system load. High-priority affinity-based user acquisition opportunities receive expedited processing through dedicated message channels, while routine pattern analysis operations utilize standard processing queues.

Message serialization utilizes efficient binary protocols optimized for the specific data types commonly exchanged between AI agents. Affinity compatibility scores, pattern analysis results, and affinity-based user acquisition coefficient calculations are serialized using protocol buffers to minimize network overhead and processing latency. The routing infrastructure implements automatic retry mechanisms with exponential backoff for handling transient failures. Dead letter queues capture messages that cannot be processed successfully, enabling manual intervention and system debugging. Message deduplication ensures that network-level retries do not result in duplicate processing of affinity-based user acquisition workflows.

The coordination framework includes comprehensive performance monitoring and optimization capabilities specifically designed for affinity-based user acquisition workloads. Real-time metrics track message processing latency, agent utilization, and affinity-based user acquisition coefficient calculation throughput. These metrics enable automatic performance tuning and capacity planning for affinity-based user acquisition operations.

FIG. 21 is a flow diagram of an example method 2100 for automated onboarding, according to an embodiment of the invention.

At step 2102, conversion optimization agent 1908 performs real-time tracking of responses using the event-driven architecture. Event-driven architecture monitors referral offers acceptance responses in real-time, triggering immediate provisioning workflows upon acceptance notification.

At step 2104, billing integration agent 1910 performs identity verification. Computer vision algorithms may perform document analysis with OCR for text extraction. Biometric verification may use facial recognition with liveness detection to prevent spoofing. Fraud detection models may analyze document authenticity features using ensemble methods.

At step 2106 a recommendation agent may implement collaborative filtering for plan suggestions based on similar subscriber preferences and content-based filtering using demographic and usage pattern features. Content-based filtering analyzes interest patterns and communication preferences to recommend optimal participation pathways. Multi-criteria decision analysis ranks options considering cost, features, and usage allowances.

At step 2108, remote device configuration may be enabled. Secure provisioning protocols (OMA-DM) configure devices remotely with security implementation using Public Key Infrastructure (PKI) for certificate management and AES encryption for configuration data protection. Security implementation uses robust encryption and authentication methods that protect both individual privacy and community integrity.

At step 2110, secure payment gateways may process initial payments with tokenization for PCI compliance. Integration with billing systems creates automated recurring billing setups and implements transaction management using two-phase commit protocols.

At step 2112, the new customer is added to pattern analysis pool. The newly activated customers join the subscriber base for future relationship analysis, enabling growth where each new customer becomes a potential referral source, creating exponential user acquisition scaling.

The automated self-provisioning workflow eliminates traditional onboarding friction through complete end-to-end automation, reducing customer drop-off rates that typically occur during manual processes using streamlined digital workflows. The system delivers immediate service activation within minutes compared to traditional week-long provisioning cycles, dramatically improving customer satisfaction and competitive positioning. Cost reduction benefits include elimination of customer service representatives, field technicians, and manual verification processes, reducing operational overhead while ensuring consistent, error-free provisioning experiences.

Enhanced security through intelligent verification systems provides appropriate protection while maintaining a welcoming atmosphere. The workflow scales seamlessly to accommodate growth periods, enabling communities to expand naturally while maintaining quality relationships and meaningful connections.

Further, enhanced security through AI-powered fraud detection and biometric verification provides superior protection compared to manual verification methods, while automated compliance checking ensures regulatory adherence across multiple authorities. The workflow scales seamlessly to handle variable demand without additional staffing, enabling service providers to process thousands of simultaneous activations during peak periods while maintaining service quality and security standards.

FIG. 22 is a flow diagram of an example method 2200 for affinity-based user acquisition coefficient monitoring and optimization, according to an embodiment of the invention.

At step 2202, after self-provisioning new customers are added to pattern analysis pool. The addition of new customers into the pattern analysis system expands the relationship network for future referral identification. Their affinity patterns begin contributing to network effect amplification.

At step 2204, immutable audit logging records multigenerational referral attribution, ensuring transparent and verifiable referral chain documentation for accurate affinity-based user acquisition coefficient calculation. An attribution tracking agent manages immutable audit logging using cryptographic verification protocols, and a validation agent ensures referral attribution accuracy across multi-generational referral networks.

At step 2206, real-time affinity-based user acquisition coefficient is computed. The system calculates affinity-based user acquisition coefficients using cohort analysis with configurable time windows.

> Affinity-based user acquisition coefficient=(Number of referrals offers per user)×(Conversion rate of referral offers). Values above 1.0 indicate affinity group growth potential.          Mathematical Formula:

An analytics processing agent may perform cohort analysis and affinity-based user acquisition coefficient calculations using configurable time windows. A statistical analysis agent may apply mathematical models to measure affinity-based user acquisition propagation effectiveness At step 2208, system evaluates whether calculated affinity-based user acquisition coefficients meet or exceed target thresholds. Conversion optimization agent 1908 analyzes affinity-based user acquisition coefficient performance against target thresholds.

When the calculated affinity-based user acquisition coefficients exceed the target thresholds, then at step 2210 target is achieved. When thresholds are met, the system has achieved sustainable growth, indicating successful network effect implementation. At step 2212 successful affinity-based user acquisition mechanics enable continuous exponential user acquisition with minimal additional marketing investment.

When the calculated affinity-based user acquisition coefficients are below the target thresholds, then at step 2214, system optimization is adjusted. If thresholds aren't met, machine learning algorithms may adjust referral identification accuracy, engagement timing, and conversion strategies through automated optimization and A/B testing frameworks. Strategy refinement agent may implement automated optimization adjustments when targets aren't achieved. Performance monitoring agents may track affinity-based user acquisition growth metrics and identify optimization opportunities The affinity-based user acquisition growth tracking system provides visibility into network effect performance through real-time affinity-based user acquisition coefficient calculation, enabling immediate strategy adjustments that maximize affinity group growth potential. The cryptographically verified attribution tracking ensures transparent, immutable referral recording that prevents fraud and enables accurate multi-generational reward distribution, building trust and encouraging continued participation in affinity-based user acquisition programs. Continuous optimization capabilities automatically adjust targeting algorithms, engagement strategies, and timing parameters based on performance data, creating self-improving affinity-based user acquisition mechanisms that become more effective over time.

FIG. 23 is a flow diagram of an example method 2300 for generating trust score for incoming communications and displaying actionable context for the user, according to an embodiment of the invention. The steps of method 2300 may be performed at communication management server 506 by trust score generator 547 in coordination with pattern analysis engine 536 and cross-network intelligence correlator 548.

At step 2302, communication management server 506 may receive an incoming communication directed toward a first-user device among a plurality of user devices. The incoming communication may be a voice message, an audio call, a text message, an email, or a video communication received via multimedia gateway 508. Upon receiving the incoming communication, the system initiates parallel processing workflows to ensure comprehensive trust assessment while maintaining real-time responsiveness.

At step 2304, pattern analysis engine 536 may analyze communication metadata to determine pattern legitimacy by comparing current communication patterns against established relationship fingerprints without accessing message content. This analysis includes extracting temporal patterns such as timing, frequency, and duration characteristics, channel preference patterns including the appropriateness of the current communication channel for the established relationship, and behavioral patterns reflecting interaction styles and engagement levels. Pattern analysis engine 536 compares extracted patterns, against established patterns stored in relationship fingerprints database 534 to determine legitimacy and consistency with historical communication behaviors.

Simultaneously at step 2306, pattern analysis engine 536 may validate the relationship context between the communicating parties using interaction graph 520 and relationship fingerprints stored in relationship fingerprints database 534. The relationship validation process determines relationship strength based on the depth and frequency of past interactions, evaluates connection paths through the interaction graph, and assesses alignment with expected relationship behaviors. This validation ensures that trust scores reflect both current communication patterns and established relationship dynamics.

Concurrently at step 2308, cross-network intelligence correlator 548 performs cross-network intelligence correlation to identify patterns that have been observed across different services and networks. Cross-network intelligence correlator 548 accesses aggregated patterns stored in pattern database 538 to compare current communication characteristics against validated patterns from the broader ecosystem. This cross-pollination analysis enables the system to recognize emerging threat patterns and validate legitimate communication behaviors based on collective intelligence while maintaining privacy through pattern-only analysis.

At step 2310, trust score generator 547 may perform multi-attribute trust assessment. Trust score generator 547 integrates cross-network intelligence correlation results with individual attribute scoring to generate dynamic trust level. Trust score generator 547 combines pattern legitimacy results from step 2304, relationship context validation from step 2306, and cross-network intelligence correlation from step 2308 to calculate individual trust attributes including engagement rate, reliability index, channel preference, temporal pattern, and behavioral pattern indicators, where each attribute score adapts based on pattern validation across multiple communication services.

At step 2312, trust score generator 547 may generate a comprehensive trust level/score using weighted combinations of the individual trust attributes. The weighting algorithm considers the relative importance of each attribute based on the specific communication context, relationship history, and user preferences 524. Trust score generator 547 normalizes each attribute to a standardized scale and combines the attributes into a comprehensive trust score that provides multi-dimensional trust context while maintaining interpretability for end users.

At step 2314, communication management server 506 displays the trust level and individual attribute assessments through a user interface and provides communication processing options. The display system presents information through intuitive visual indicators, numerical scores, or categorical labels that provide immediate context while maintaining privacy. The user interface implements progressive disclosure of information with the most important trust indicators visible immediately and more detailed attributes available through simple interaction, enabling users to make informed decisions about engagement without overwhelming them with complex technical details.

FIG. 24 illustrates different attributes that are considered while generating a multi-attribute trust score, according to an embodiment of the invention. Trust attributes 2402 represent the core components that capture different dimensions of communication relationships and provide nuanced trust assessment capabilities that go beyond simple binary classifications.

In an embodiment, engagement rating assessment 2402 component may analyze communication frequency, interaction duration, and bidirectional engagement metrics to determine the level and quality of engagement between communicating parties. Engagement rating assessment 2402 processes historical interaction data from interaction graph 520 to calculate metrics including average communication frequency, typical interaction duration, response consistency, and mutual engagement indicators. This assessment is indicative of how actively the parties have communicated in the past and provides context for interpreting the current communication within the broader relationship dynamic. The engagement rate is calculated using the formula: Engagement Rate=(Total Interactions×Average Duration× Reciprocity Factor)/Time Period, where Reciprocity Factor measures bidirectional engagement quality on a scale of 0.1 to 1.0.

In an embodiment, reliability index measurement 2406 component may evaluate the consistency and dependability of communication patterns between parties by analyzing factors such as predictable timing, consistent channel usage, and reliable response behaviors. Reliability index measurement 2406 tracks temporal consistency patterns, channel preference stability, and response time reliability to generate scores that indicate the predictability and trustworthiness of the communication relationship. High reliability scores suggest established, consistent communication patterns, while lower scores may indicate new relationships or evolving communication dynamics. The reliability index is calculated as: Reliability Index=(Temporal Consistency×Channel Consistency×Response Consistency)/3, where each consistency factor is measured on a 0-100 scale.

In an embodiment, temporal pattern analysis 2408 component processes timing-related characteristics of communications including preferred contact hours, response timing patterns, communication frequency trends, and temporal consistency indicators. Temporal pattern analysis 2408 examines historical timing data to identify when communications typically occur, how quickly parties respond to each other, and whether current communication timing aligns with established patterns. This analysis enables the system to detect unusual timing that might indicate fraudulent communications or legitimate changes in communication circumstances. Temporal patterns are scored using statistical analysis of historical timing data with standard deviation calculations to identify pattern consistency.

In an embodiment, behavioral pattern classification 2410 component analyzes interaction styles and engagement behaviors characteristic of the communication relationship, including formal versus informal communication styles, brief versus detailed exchanges, and active versus passive engagement patterns. Behavioral pattern classification 2410 processes communication metadata to identify consistent behavioral characteristics that define how parties interact with each other, enabling recognition of authentic communication styles and detection of potential impersonation attempts. Behavioral patterns are classified using machine learning algorithms that analyze metadata characteristics including communication length, response timing, and interaction complexity.

In an embodiment, channel preference evaluation 2412 component determines preferred communication methods and channel usage patterns for the relationship, analyzing historical channel selection data to identify primary and secondary communication preferences. Channel preference evaluation 2412 tracks how parties typically choose between voice calls, text messages, emails, and other communication channels, providing context for whether the current communication channel aligns with established preferences or represents an unusual deviation that might warrant additional scrutiny. Channel preference scores are calculated as: Channel Preference Score=(Current Channel Usage Frequency/Total Communications)×Channel Appropriateness Factor, where Channel Appropriateness Factor considers context such as time of day and relationship type.

All trust attributes 2402 are generated through privacy-preserving analysis that focuses exclusively on metadata patterns without accessing communication content, ensuring that valuable trust context can be provided while maintaining complete privacy for all parties involved in the communication relationship.

During operation, individual trust attributes 2402 generated by these specialized components are integrated with cross-network intelligence correlation results from cross-network intelligence correlator 548 and relationship context validation from interaction graph 520 to generate the overall trust level score. Trust score generator 547 combines the engagement rating, reliability index, temporal patterns, behavioral patterns, and channel preferences with validated cross-pollination patterns and established relationship fingerprints to calculate dynamic trust levels that adapt based on both individual relationship characteristics and collective intelligence from the broader communication ecosystem. This integration ensures that trust level calculations reflect not only the specific relationship dynamics captured by individual attributes but also the broader security insights available through cross-network pattern validation, creating comprehensive trust assessments that leverage both relationship-specific data and ecosystem-wide intelligence while maintaining complete privacy through metadata-only analysis.

FIG. 25 depicts a flow diagram of an example method 2500 for cross-pollination pattern analysis, according to an embodiment of the invention. Cross-pollination pattern analysis enables identification and validation of communication patterns across different services and networks, according to an embodiment of the invention. The steps of method 2500 may be performed by cross-network intelligence correlator 548 in coordination with pattern analysis engine 536 to create a self-strengthening security and trust framework.

Method 2500 begins with parallel analysis of communication patterns across multiple channels. Email patterns 2502, voice patterns 2504, and SMS patterns 2506 may be simultaneously processed by pattern analysis engine 536 to extract channel-specific characteristics while maintaining privacy through metadata-only analysis. Each channel provides unique pattern signatures including temporal characteristics, frequency patterns, interaction styles, and relationship-specific behaviors that contribute to a comprehensive understanding of communication relationships across the entire ecosystem.

At step 2508, cross-network intelligence correlator 548 may perform similarity analysis examining timing, frequency, response rate, style, and duration patterns across the different communication channels. This similarity analysis employs sophisticated algorithms including correlation analysis, pattern matching, and statistical comparison techniques to identify common characteristics that span multiple communication methods. The similarity analysis enables recognition of legitimate multi-channel relationships while detecting inconsistencies that might indicate fraudulent communications attempting to exploit different channels.

The similarity analysis utilizes cosine similarity calculations, Pearson correlation coefficients, and pattern matching algorithms to quantify relationships between patterns across channels. The system calculates a cross-channel similarity score using: Similarity Score=$\Sigma(Wi \times Ci)$ where Wi represents the weight of channel i and Ci represents the correlation coefficient between channels.

At step 2510, cross-network intelligence correlator 548 may conduct pattern correlation through cross-channel comparison to identify relationships and communication behaviors that exhibit consistency across different services and networks. Pattern correlation analysis validates that observed patterns represent genuine relationship characteristics rather than isolated incidents or potential spoofing attempts. This cross-channel validation significantly strengthens the reliability of trust assessments by leveraging the collective intelligence of the entire communication ecosystem. The correlation analysis uses advanced statistical methods including multivariate regression analysis and machine learning algorithms to identify meaningful pattern relationships.

At step 2512, cross-network intelligence correlator 548 may evaluate whether the identified patterns are legitimate by checking consistency with known relationship behaviors, absence of conflicting indicators, and alignment with expected communication evolution. When patterns are determined to be legitimate, the system proceeds to incorporate these validated patterns into relationship fingerprints and continues normal trust score generation. This validation process ensures that natural relationship evolution and changing communication preferences are appropriately recognized and accommodated. The legitimacy assessment uses a weighted scoring algorithm:

Legitimacy Score=(Consistency Weight×Pattern Consistency)+(Context Weight×Relationship Context)+(Deviation Weight×(1−Pattern Deviation)).

At step 2514, the system performs additional analysis to determine whether current patterns match known attack patterns stored in pattern database 538. Cross-network intelligence correlator 548 compares identified patterns against aggregated threat patterns that have been validated across the network using pattern matching algorithms including hash-based comparison, feature vector analysis, and machine learning classification models. The attack pattern matching utilizes a threat signature database that contains abstracted patterns of known malicious communications, enabling proactive identification of emerging threats before they become widespread. When patterns match known attack signatures, the system proceeds to step 2518 to block or redirect the incoming communication, providing immediate protection against recognized threats.

When patterns do not match known attack patterns but also do not qualify as legitimate, the system proceeds to step 2516 to modify multi-attribute trust values, adjusting trust scores to reflect the uncertainty while providing users with appropriate context for making informed decisions.

Cross-network intelligence correlator 548 provides adjustment factors to trust score generator 547 that modify engagement rate scores when cross-channel patterns show inconsistencies, adjust reliability index values when temporal patterns don't correlate across services, and update channel preference scores when communication methods deviate from validated cross-network behaviors. These modifications ensure that trust attributes reflect not only individual relationship characteristics but also collective intelligence from pattern validation across email, voice, and messaging services, creating dynamic trust levels that adapt based on ecosystem-wide security insights while maintaining the privacy-preserving metadata-only approach. This approach ensures that communications falling into uncertain categories receive appropriate handling without completely blocking potentially legitimate communications or providing false confidence in suspicious interactions.

The cross-pollination analysis results from method 2500 directly feed into step 2308 of FIG. 23, where cross-network intelligence correlator 548 (described in detail in FIG. 25), analyzes patterns across email, voice, and SMS channels through similarity analysis, pattern correlation, and legitimacy validation. The results of this cross-pollination analysis are provided to trust score generator 547 for trust attribute calculation.

When patterns are determined to be legitimate at step 2512, this validation strengthens individual trust attribute scores in FIG. 23's step 2310, particularly enhancing reliability index, and behavioral pattern scores based on cross-network consistency. When patterns match known attack signatures at step 2514, the system immediately reduces trust level scores and may override other positive attributes to ensure user safety.

FIG. 26 depicts the dashboard on a user interface displaying comprehensive trust score information that enables informed user decision-making while preserving privacy, according to an embodiment of the invention. The interface design 2618 presents multi-attribute trust assessments in an intuitive, actionable format that translates complex relationship analysis into practical user guidance.

The trust assessment 2614 section displays the multi-attribute trust score including trust level 2602 which provides an overall assessment of communication trustworthiness based on historical interactions, pattern consistency, and relationship context.

Trust level 2602 may be displayed as a numerical score (e.g., "Trust Level: 85"), categorical rating (e.g., "High Trust"), or visual indicator that immediately communicates the overall assessment to users that immediately communicates the overall assessment to users. The interface implements progressive disclosure principles, presenting essential trust information immediately while making detailed attribute information available through simple interactions such as tapping or hovering over specific elements.

Engagement rate 2604 measures the level and quality of engagement between parties, displayed as both a numerical score and contextual description such as "Active weekly communication" or "Occasional professional contact.

Reliability index 2606 assesses the consistency and dependability of communication patterns between parties, presented with indicators such as "Consistent patterns" or "Variable timing, helping users understand whether the current communication follows established, trustworthy patterns.

Channel preference 2608 may indicate preferred communication methods for the relationship, displayed with visual icons and descriptive text such as "Typically uses voice calls" or "Email communication expected," helping recipients understand whether the current communication channel aligns with established patterns.

Temporal pattern 2610 may provide information about timing patterns of the relationship, presented as "Business hours contact" or "Weekend communication unusual, helping users identify whether the current communication follows established temporal patterns or occurs at unusual times that might indicate changing circumstances or potential security concerns. Behavioral pattern 2612 may capture interaction styles and engagement behaviors characteristic of the relationship, displayed as "Formal communication style" or "Brief, direct interactions" helping users understand the expected communication context.

The controls 2616 section may provide actionable options including approve, reject, redirect, and automated response capabilities that enable users to quickly respond to incoming communications based on the trust assessment information. Controls 2616 may be dynamically configured based on the trust scores and relationship context, presenting the most appropriate options for each specific communication scenario. High-trust communications might present streamlined approval options with prominent "Answer" buttons, while low-trust communications provide enhanced security options including "Block," "Verify," or "Redirect to Voicemail" with appropriate visual emphasis.

The user interface implements progressive disclosure principles, presenting essential trust information immediately while making detailed attribute information available through simple interactions. This approach ensures that users can quickly make decisions based on primary trust indicators while having access to comprehensive analysis when needed for more complex evaluation scenarios.

FIGS. 27A, 27B, and 27C depict dashboards on a user interface displaying trust score across different communication scenarios, illustrating how multi-attribute trust assessments provide actionable context for various relationship and trust levels, according to embodiments of the invention.

FIG. 27A depicts dashboard 2702A representing a high-trust communication scenario displaying "Dr. Martinez (known contact)" with a trust level of 95 (high), indicating a well-established, highly trusted relationship. The interface shows "Regular weekly pattern" indicating consistent temporal behaviors, "Expected timing" confirming that the communication occurs within normal timing parameters, and "Answer with confidence" providing clear actionable guidance. The available actions [ANSWER] [REJECT/

MESSAGE] reflect the high confidence level, with answering being the prominently recommended option based on the strong trust indicators and established relationship patterns.

FIG. 27B depicts dashboard 2702A representing a medium-trust scenario for "Regional Medical Center" with a trust level of 65 (Medium-High), representing a professional contact with some established patterns but requiring verification. The display shows "Regular weekly pattern" indicating some established communication patterns that provide moderate confidence in the relationship authenticity, and "Professional match" suggesting that the communication aligns with expected professional relationship characteristics. The guidance "New contact-verify purpose" provides appropriate caution for a relationship that shows positive indicators but lacks the deep history of established personal relationships. Available actions [ANSWER] [REDIRECT] offer balanced options that enable engagement while maintaining appropriate professional boundaries.

FIG. 27C depicts dashboard 2703C representing a low-trust scenario for an "Unknown caller" with a trust level of 25 (Low), indicating minimal relationship history and potentially suspicious characteristics. The interface displays "Suspicious timing pattern" warning that the communication occurs outside normal parameters, "Known fraud pattern match" indicating that the communication characteristics align with previously identified threat patterns stored in pattern database 538, and "Likely Unwanted—Be cautious" providing clear guidance about the elevated risk. Available actions [BLOCK] [VERIFY] [VOICEMAIL] emphasize protective measures while still providing options for verification if the user suspects the communication might be legitimate despite the low trust indicators.

These scenarios demonstrate how the trust score system adapts its display and recommendations based on comprehensive multi-attribute analysis, providing users with contextually appropriate information and options that enable informed decision-making across the full spectrum of communication trust levels while maintaining privacy and relationship confidentiality.

The skilled person will be aware of a range of possible modifications of the various embodiments described above. Accordingly, the present invention is defined by the claims and their equivalents.

What is claimed is:

1. A system for automated affinity-based user acquisition service for service providers, the system comprising:
   a communication management server comprising one or more processors, a memory, and a plurality of programming instructions stored in the memory, the plurality of programming instructions when executed by the one or more processors causes the one or more processors to:
   receive an incoming communication directed towards a first user-device among a plurality of user devices;
   analyze, by a pattern analysis engine, metadata associated with the incoming communication to identify current communication patterns across temporal, channel, and behavioral domains without accessing communication content;
   compare the current communication patterns against relationship fingerprints stored in a relationship fingerprints database to determine pattern legitimacy;
   responsive to determining that the current communication patterns are legitimate,
   validate relationship context between communicating parties using interaction graph analysis and historical communication data;

perform cross-network intelligence correlation to identify and validate the current communication patterns, wherein the current communication patterns are compared against aggregated patterns stored in a pattern database across voice, email and messaging services;

generate, based on the pattern legitimacy, relationship context validation, and the cross-network intelligence correlation, a multi-attribute trust assessment for the incoming call, wherein the multi-attribute trust assessment comprises generation of individual trust attribute scores and a trust level, wherein the individual trust attribute comprises an engagement rate, a reliability index, a channel preference, a temporal pattern, and a behavioral pattern; and display a trust context derived from the multi-attribute trust assessment through a user interface of the first user device, wherein the trust context comprises simplified trust information that is actionable; and provide communication processing actions for the incoming communication.

2. The system of claim 1, wherein the plurality of programming instructions, when executed by the one or more processors, causes the one or more processors to:

integrate the individual trust attribute scores and results from the cross-network intelligence to generate the trust level for the incoming communication.

3. The system of claim 1, wherein to perform cross-network intelligence correlation, the plurality of programming instructions, when executed by the one or more processors, causes the one or more processors to:

perform similarity analysis across email patterns, voice patterns, and SMS patterns;

conduct pattern correlation through cross-channel comparison; and validate the current communication patterns by checking consistency of the patterns with known legitimate patterns.

4. The system of claim 1, wherein the user interface implements progressive disclosure of trust information with important trust indicators visible immediately and detailed trust attributes available through user interaction.

5. The system of claim 1, wherein to validate relationship context, the plurality of programming instructions, when executed by the one or more processors, causes the one or more processors to:

wherein validating relationship context comprises:

determine relationship strength between the communicating parties based on depth and frequency of past interactions;

evaluate connection paths through the interaction graph; and assess alignment with expected relationship behaviors using historical communication data.

6. The system of claim 1, wherein the cross-network intelligence correlation enables recognition of emerging threat patterns and validation of legitimate communication behaviors based on collective intelligence while maintaining privacy through pattern-only analysis.

7. The system of claim 1, wherein the pattern legitimacy analysis, relationship fingerprint generation, and the cross-network intelligence correlation are performed without accessing communication content.

8. The system of claim 1, wherein the actionable trust context translates complex multi-attribute trust assessment into practical user guidance and provides communication processing options tailored to specific trust assessment results.

9. The system of claim 1, wherein the individual trust attributes are extracted by pattern analysis engine from the communication metadata.

10. The system of claim 1, wherein the individual trust attribute scores are modified based on cross-network intelligence correlation results, wherein consistent patterns result in increasing trust levels.

* * * * *